(12) United States Patent
Stoutenburg et al.

(10) Patent No.: US 6,886,742 B2
(45) Date of Patent: *May 3, 2005

(54) SYSTEMS AND METHODS FOR DEPLOYING A POINT-OF SALE DEVICE

(75) Inventors: Earney Stoutenburg, Parker, CO (US); Cassandra J. Mollett, Houston, TX (US); James Price, Alpharetta, GA (US); Charles A. Fillinger, Boca Raton, FL (US); Eric M. Nelson, Waterloo, NE (US); Dean A. Seifert, Parker, CO (US); Jeffrey Singleton, Lake Ronkonkoma, NY (US)

(73) Assignee: First Data Corporation, Englewood, CO (US)

( * ) Notice: Subject to any disclaimer, the term of this patent is extended or adjusted under 35 U.S.C. 154(b) by 43 days.

This patent is subject to a terminal disclaimer.

(21) Appl. No.: 10/116,733

(22) Filed: Apr. 3, 2002

(65) Prior Publication Data

US 2002/0166891 A1 Nov. 14, 2002

Related U.S. Application Data

(63) Continuation-in-part of application No. 09/634,901, filed on Aug. 9, 2000, now Pat. No. 6,547,132.
(60) Provisional application No. 60/147,899, filed on Aug. 9, 1999.

(51) Int. Cl.[7] .............................................. G06F 17/60
(52) U.S. Cl. ......................................... 235/379; 705/16
(58) Field of Search ................................ 235/379, 380, 235/382; 705/16, 17, 18

(56) References Cited

U.S. PATENT DOCUMENTS

| 3,599,151 A | 8/1971 | Harr |
|---|---|---|
| 3,833,395 A | 9/1974 | Gosnell |
| 4,321,672 A | * 3/1982 | Braun et al. ................... 705/42 |
| 4,562,340 A | 12/1985 | Tateisi et al. |

(Continued)

FOREIGN PATENT DOCUMENTS

| EP | 0481135 A1 | 4/1992 |
|---|---|---|
| EP | 0949596 A2 | 10/1999 |
| EP | 1077436 A2 | 2/2001 |
| WO | WO 00/46725 A1 | 8/2000 |
| WO | WO 00/67177 A2 | 11/2000 |
| WO | WO 01/04816 A1 | 1/2001 |
| WO | WO 02/05195 A1 | 1/2002 |

OTHER PUBLICATIONS http://www.vfi-finance.com/tranz330.htm, Tranz 330 Fast, Low–Cost Transaction Automation At The Point Of Service, VeriFone Finance, Jan. 1999, pp. 1–3, especially pp. 1–2.

Business Wire, *"E–Commerce, Email and E–greeting Cards Combine in New Web Site Designed by Interactive Bureau"*, Sep. 14, 1999 (abstract), [online] [retrieved on May 1, 2002], retrieved from PROQUEST Database, 2 pages.

(Continued)

*Primary Examiner*—Thien M. Le
*Assistant Examiner*—Lisa M. Caputo
(74) *Attorney, Agent, or Firm*—Townsend and Townsend and Crew LLP

(57) ABSTRACT

Systems and methods including one or more point-of-sale devices for effectuating value transfers. In particular implementations, various point-of-sale devices are in communication with various transaction systems. Thus, a transaction can be effectuated from one point-of-sale device to another utilizing one or more of the communicably coupled transaction systems. The transaction systems can include, but are not limited to, money transfer systems, fraud detection systems, check acceptance systems.

42 Claims, 29 Drawing Sheets

U.S. PATENT DOCUMENTS

| | | | |
|---|---|---|---|
| 4,562,341 A | | 12/1985 | Ohmae et al. |
| 4,630,200 A | | 12/1986 | Ohmae et al. |
| 4,678,895 A | | 7/1987 | Tateisi et al. |
| 4,722,554 A | | 2/1988 | Pettit |
| 4,812,628 A | * | 3/1989 | Boston et al. ............... 235/380 |
| 4,961,142 A | | 10/1990 | Elliott et al. |
| 5,119,293 A | | 6/1992 | Hammond |
| 5,175,682 A | | 12/1992 | Higashiyama et al. |
| 5,220,501 A | | 6/1993 | Lawlor et al. |
| 5,367,452 A | | 11/1994 | Gallery et al. |
| 5,408,077 A | | 4/1995 | Campo et al. |
| 5,426,594 A | | 6/1995 | Wright et al. |
| 5,464,971 A | * | 11/1995 | Sutcliffe et al. ............ 235/379 |
| 5,484,988 A | | 1/1996 | Hills et al. |
| 5,491,325 A | | 2/1996 | Huang et al. |
| 5,504,677 A | | 4/1996 | Pollin |
| 5,510,979 A | | 4/1996 | Moderi et al. |
| 5,555,496 A | | 9/1996 | Tackbary et al. |
| 5,577,109 A | * | 11/1996 | Stimson et al. .......... 379/114.2 |
| 5,622,388 A | | 4/1997 | Alcordo |
| 5,650,604 A | * | 7/1997 | Marcous et al. ............ 235/379 |
| 5,657,201 A | | 8/1997 | Kochis |
| 5,677,955 A | | 10/1997 | Doggett et al. |
| 5,679,940 A | | 10/1997 | Templeton et al. |
| 5,699,528 A | | 12/1997 | Hogan |
| 5,757,917 A | | 5/1998 | Rose et al. |
| 5,794,207 A | | 8/1998 | Walker et al. |
| 5,815,657 A | | 9/1998 | Williams et al. |
| 5,826,241 A | | 10/1998 | Stein et al. |
| 5,828,875 A | | 10/1998 | Halvarsson et al. |
| 5,832,463 A | | 11/1998 | Funk |
| 5,893,080 A | | 4/1999 | McGurl et al. |
| 5,910,988 A | | 6/1999 | Ballard |
| 5,949,044 A | | 9/1999 | Walker et al. |
| 5,960,412 A | | 9/1999 | Tackbary et al. |
| 5,987,426 A | | 11/1999 | Goodwin, III |
| 6,029,150 A | | 2/2000 | Kravitz |
| 6,030,000 A | | 2/2000 | Diamond |
| 6,032,133 A | | 2/2000 | Hilt et al. |
| 6,032,137 A | | 2/2000 | Ballard |
| 6,039,245 A | | 3/2000 | Symonds et al. |
| 6,058,417 A | | 5/2000 | Hess et al. |
| 6,064,990 A | | 5/2000 | Goldsmith |
| 6,070,798 A | | 6/2000 | Nethery |
| 6,097,834 A | | 8/2000 | Krouse et al. |
| 6,106,020 A | | 8/2000 | Leef et al. |
| 6,119,106 A | | 9/2000 | Mersky et al. |
| 6,122,625 A | | 9/2000 | Rosen |
| 6,164,528 A | | 12/2000 | Hills et al. |
| 6,175,823 B1 | | 1/2001 | Van Dusen |
| 6,193,152 B1 | * | 2/2001 | Fernando et al. ........... 235/380 |
| 6,199,761 B1 | | 3/2001 | Drexler |
| 6,246,996 B1 | | 6/2001 | Stein et al. |
| 6,305,604 B1 | | 10/2001 | Ono |
| 6,308,887 B1 | | 10/2001 | Korman et al. |
| 6,327,575 B1 | | 12/2001 | Katz |
| 6,360,254 B1 | | 3/2002 | Linden et al. |
| 6,367,693 B1 | | 4/2002 | Novogrod |
| 6,484,936 B1 | | 11/2002 | Nicoll et al. |
| 6,539,363 B1 | | 3/2003 | Allgeier et al. |
| 2001/0051876 A1 | | 12/2001 | Seigel et al. |

OTHER PUBLICATIONS

PR Newswire, *"GiftSpot.com Simplifies Gift–Giving on the Internet,"* Oct. 20, 1999 (abstract), [online] [retrieved on May 1, 2002], retrieved from PROQUEST Database, 5 pages.

x.com, *Do More with Your Money*, downloaded from website http://www.x.com., Feb. 7, 2000, 5 pages.

DOTBANK, *The Way to Send and Receive Money on the Internet*, downloaded from website http://www.dotbank.com, Feb. 7, 2000, 6 pages.

Idealab Company, *PayMe.com*, downloaded from website http://ssi.idealab.com on Feb. 16, 2000, 7 pages.

Confinity, Inc., *PayPal.com, How PayPal.com Works*, downloaded from website http://www.paypal.com on Feb. 7, 2000, 7 pages.

* cited by examiner

SYSTEMS AND METHODS FOR DEPLOYING A POINT-OF SALE DEVICE

CROSS-REFERENCES TO RELATED APPLICATIONS

This application is a continuation-in-part application of U.S. patent application Ser. No. 09/634,901, entitled "POINT OF SALE PAYMENT TERMINAL," filed Aug. 9, 2000 by Randy J. Templeton et al., now U.S. Pat. No. 6,547,132, which is a nonprovisional of U.S. Prov. App. No. 60/147,899, entitled "INTEGRATED POINT OF SALE DEVICE," filed Aug. 9, 1999 by Randy Templeton et al., the entire disclosures of both are herein incorporated by reference for all purposes.

Further, this application is related to U.S. patent application Ser. No. 10/116,689, entitled "Systems and Methods for Performing Transactions At A Point-of-Sale", U.S. patent application Ser. No. 10/116,686, entitled "Systems and Methods for Utilizing a Point-of-Sale System", now U.S. Pat. No. 6,827,260 and U.S. patent application Ser. No. 10/116,735, entitled "Systems and Methods for Configuring a Point-of-Sale System", all of which are incorporated herein by reference for all purposes and filed on a date even herewith.

BACKGROUND OF THE INVENTION

This invention relates to point-of-sale devices and to point-of-sale transactions. More particularly, this invention relates to an integrated point-of-sale device capable of facilitating transactions associated with one or more transaction systems.

In the sale of goods by a merchant to a customer, point-of-sale devices are used by the merchant to complete a transaction. For example, a common cash register can be used to tally the cost of items purchased, accept cash payments, and return the proper amount of change. In some cases, such a register can be used in conjunction with a credit card reader. More particularly, the merchant can ring up a total amount due on the register, pass the credit card through a card reader to debit the customer account, and in turn the register recognizes the payment by credit card. While devices for completing such transactions exist, the functionality of such devices is quite limited. Furthermore, such devices are typically limited to accessing records maintained by a merchant. Thus, for example, it can be impossible for a merchant to determine if a credit card offered for payment is a stolen card. In some cases, obtaining additional functionality to, for example, determine if a credit card is stolen, can be achieved by installing equipment in addition to the cash register. This additional equipment typically must be individually installed, configured and maintained. Such an approach is costly and inefficient.

Furthermore, such an approach of using stand alone devices requires a merchant to become the interface between each of the devices which requires additional, costly training. Yet further, a number of functions useful to both merchants and customers cannot be facilitated using systems and methods known in the current art.

For the foregoing reasons, there is a need for a point-of-sale payment terminal and methods of using such that overcome the limitations of the current art. Hence, among a number of other advantages apparent from the following description, the present invention provides systems and methods for addressing the aforementioned limitations of the current art.

BRIEF SUMMARY OF THE INVENTION

Among other things, the present invention includes systems and methods utilizing one or more point-of-sale devices for effectuating value transfers. Various implementations of such systems and methods are disclosed herein. As more fully described in the detailed description, the systems can include one or more point-of-sale devices communicably coupled to a variety of transaction systems. Thus, transaction methods can be implemented for effectuating one or more transactions from a point-of-sale-device utilizing one or more communicably coupled transaction systems. In one particular aspect, a transaction can be effectuated from one point-of-sale device to another utilizing the communicably coupled transaction systems. Such transaction systems can include, but are not limited to, money transfer systems, fraud detection systems, check acceptance systems, and the like.

As will be appreciated by reading the detailed description, such systems can be configured in a variety of ways and incorporate a variety of different point-of-sale device configurations. Further, such systems can utilize a common point-of-sale-device configured to work in a variety of different circumstances.

In one embodiment of the present invention, a system for effectuating a value transfer is provided. The system includes a point-of-sale device in communication with two transaction systems via communication networks. In particular instances, the point-of-sale device is in communication with both transaction systems across the same communication network.

In various cases, the point-of-sale device includes a base unit and a peripheral unit, both with touch screen displays. In some other cases, the point-of-sale devices include some combination of a document imager, a magnetic ink character recognition reader, a slip printer, a roll printer, and/or a paper transport mechanism. In particular instances, the point-of sale device includes all of such components, while in others only a subset of such components are included. In an instance, both a slip printer and a roll printer are included and share a common paper transport mechanism.

Such systems are useful in relation to a great variety of transaction systems. In one particular embodiment, at least two transaction systems are accessible via a point-of-sale device in the system. The two transaction systems can be a money transfer system accessible using a point-of-sale device communicably coupled to a telephone network or the Internet, and a stored value card system accessible via a telephone network.

In some cases, one or more transaction systems are accessible by a point-of-sale device upon agreement between a merchant operating the point-of-sale device and a service supplier. The service supplier can provide a transaction system, such as, for example, a fraud detection, money transfer, check acceptance, or other transaction system. Further, the service supplier can be a third party that is neither the merchant nor a supplier of the point-of sale device. Thus, a merchant can obtain a point-of-sale device, affiliate with the service supplier, and thus access and/or sell services of the service supplier using the point-of-sale device.

An one aspect, the system further includes a third transaction system in communication with the point-of-sale device via a communication network. In one particular case, the third transaction system is a check acceptance system. Again, a variety of transaction systems can be combined into the system in accordance with the present invention. Thus, for example, three transaction systems including a money transfer system, a stored value card system, and a check acceptance system can be combined.

Yet another embodiment of the of the present invention provides a system for effectuating a value transfer from one or more point-of-sale devices. The system includes a plurality of point-of-sale devices in communication with a point-of-sale control system. Such a control system can be used to update one or more of the point-of-sale devices. Further, at least a subset of the point-of-sale devices are in communication with a transaction system, and another subset of the point-of-sale devices is in communication with another transaction system.

In particular instances of the embodiments, the point-of-sale devices are configurable by a transaction system and/or a point-of-sale control system. Thus, a point-of-sale device can be configured to access one or more transaction systems. Such configuration can be performed by the point-of-sale control system, or in some cases, by a transaction system to which access is desired. In one particular embodiment, the one or more of the point-of-sale devices is configurable by each of the point-of-sale control system, the first transaction system, and the second transaction system.

In some instances of the system, a first subset of the point-of-sale devices is in communication with both of the transaction systems, and a second subset is in communication with one of the transaction systems, but not the other. In particular cases, both subsets include the same point-of-sale devices, although the point-of-sale devices are configured for operation in relation to a different group of transaction systems.

In yet another embodiment of the present invention, another system for effectuating a value transfer is provided. The system includes at least two point-of-sale devices in communication with a communication network. In addition, the system includes a check acceptance system in communication with the two point-of-sale devices. In various instances, the system also includes a transaction system in communication with the two point-of-sale devices.

Such a transaction system can be of a number of different types. For example, the transaction system can include a money transfer system, or other such transaction system. In various instances, the two point-of-sale devices can include similar or even identical components, but are configured differently. Such different configurations can include configuring one point-of-sale device for accessing a group of one or more transaction systems, and configuring another point-of-sale device for accessing a different group of transaction systems.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

I. Overview

Figure 1:
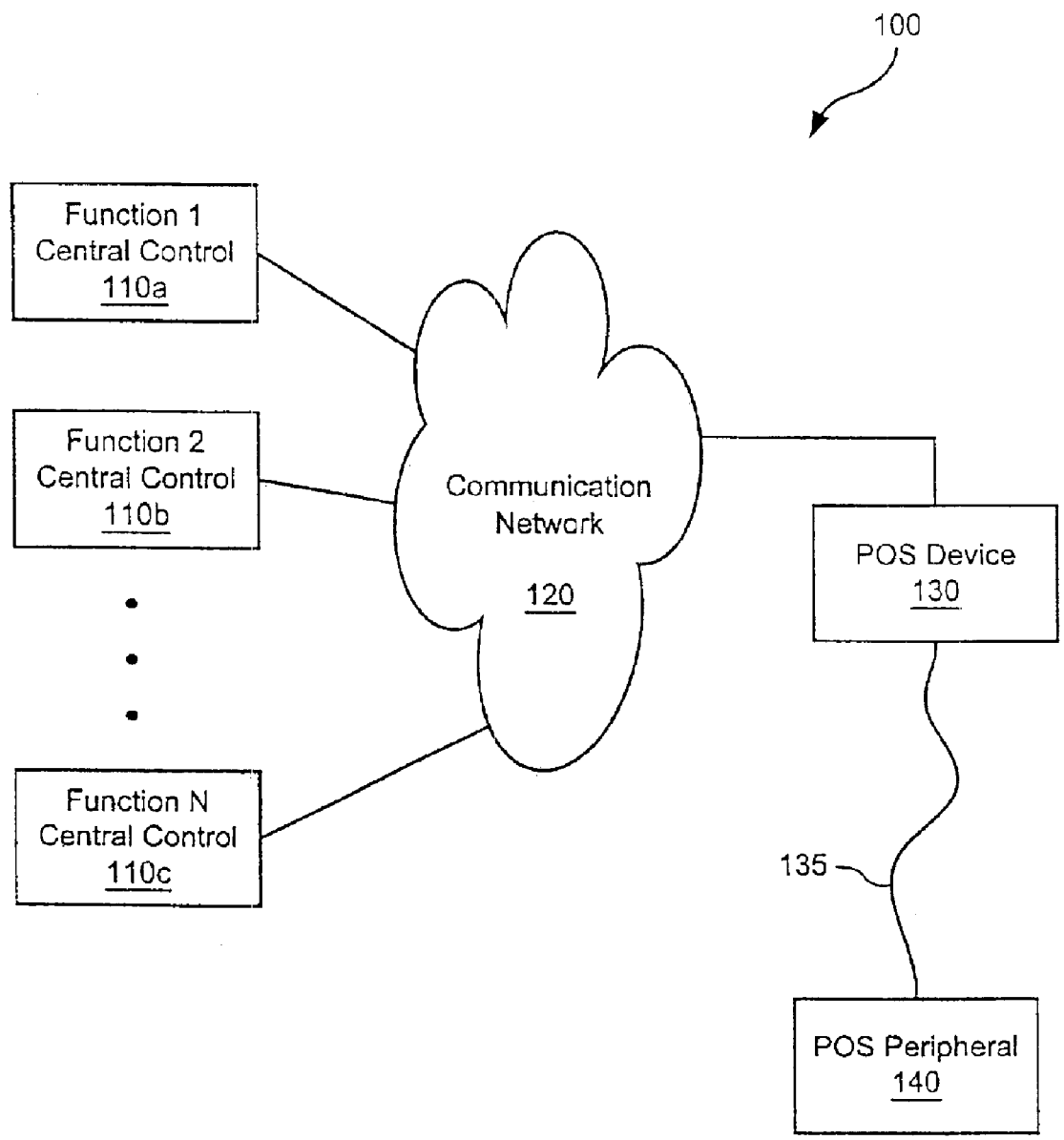
FIG. 1 illustrates a multi-function transfer system in accordance with an embodiment of the present invention.

Various embodiments of the present invention are directed to a common Point-of-Sale ("POS") system configured to facilitate a variety of transaction types to customers in a convenient fashion. In some embodiments, the POS system comprises an integrated POS device while, in other embodiments, the POS system comprises a base unit and a peripheral unit. In such embodiments, certain features of the system are distributed between a POS base terminal and a POS peripheral terminal instead of being common to the integrated device as they are in those embodiments that use the integrated device.

For example, components that may form part of the POS base terminal include, but are not limited to, a display, a keypad, a magnetic-stripe card reader, an integrated roll printer, an integrated slip printer, other types of printers, a magnetic-ink character-recognition ("MICR") reader, a smart card reader, a document imager, connection and/or communication ports including Ethernet and USB communications, a modem, a microphone, a speaker, a touch-screen, a card issuer, an operating system, software, and circuit cards, such as, sound cards and/or I/O cards. In addition, interfaces may be provided for connection with an external monitor and/or keyboard. In different embodiments, the POS base terminal comprises all or some of such components. Such components permit the POS base terminal to be used by merchants to process multiple types of electronic-payment and other transactions, including credit transactions, debit transactions, check transactions, money-transfer transactions, money-order sales, bill payments, management of customer-loyalty programs, issuance of coupons, acceptance of coupons, issuance of stored value cards, fraud detection associated with a variety of transaction types, and other such functions.

In particular embodiments, a bi-directional printer is included with the POS device. Such a bi-directional printer is capable of printing from left to right, from right to left, and vertically in one or both directions. Such a bi-directional printing capability is useful for a number of reasons. For example, such a printer can be used to frank a check. When the check is inserted in the slip printer and/or imager vertically, it is scanned by the imager and MICR reader for content. Such a process can be accomplished once on insertion of the check into POS device 130 and then again on the exit. Then, in some cases, the slip printer prints the pay line of the check, which can include a 90 degree rotation of the print head. Once the printing is complete, the check is turned over by the clerk and placed back in slip printer and/or imager for franking the back of the check. Such franking of the back of the check can include receipt information, such as, a merchant number, a store name, a time stamp, a dollar amount, and the like.

Further, in some embodiments, the imager is capable of bi-directional imaging including up and down vertically and both directions horizontally. In one particular embodiment, such bi-directional imaging is accomplished using two imaging sources, one for horizontal and one for vertical.

Components that may form part of the POS peripheral terminal can include, but are not limited to, a display, an electronic signature capture, a magnetic-stripe card reader, a smart card reader/writer, a PIN pad, and a security system. In different embodiments, the POS peripheral terminal comprises all or some of such components. Such components permit the POS peripheral terminal to be an interactive tool that allows customers to select their preferred transaction methods, view line-item details of transactions, and be provided with web-enabled electronic services, such as advertising (e.g., textual, graphics and/or video advertising) and coupons. As will be recognized from the discussion below, the POS peripheral terminal can include components in addition to those previously listed, only a subset of those previously listed, or some combination of a subset of the previously listed components and additional components.

Some embodiments of the present invention include systems and methods for using POS devices in relation to various central systems. Such central systems can include electronic-payment systems, money transfer systems, credit transaction systems, check transaction and verification systems, money order sales, stored value systems, management systems associated with customer-loyalty programs, coupon processing systems, fraud detection systems, lottery ticket sales systems, and a number of other such transaction systems.

In particular embodiments, a common POS device is used to access a variety of transaction systems. Further, in some of the embodiments, the transaction systems are developed and maintained by parties apart from those developing and maintaining the POS devices. In some embodiments, the POS devices include a number of components that can be individually enabled and disabled by the transaction systems depending upon, for example, a particular merchant's affiliation with various transaction systems.

Some embodiments include interaction of a customer with one or more transaction systems during an interaction with a POS device. In some instances, transactions initiated by the customer and/or the merchant on behalf of the customer are consummated without requiring the customer or merchant to indicate the transaction system which is selected to process the transaction. Further, the customer may initiate a single transaction requiring the involvement of multiple transaction systems, in which case the POS device automatically selects the proper transaction systems and subsequently facilitates completion of the desired transaction.

II. Exemplary Systems

Referring to FIG. 1, a multi-function transfer system 100 in accordance with an embodiment of the present invention is illustrated. Transfer system 100 includes a POS device 130 in communication with one or more function central controls 110 via a communication network 120. Further, POS device 130 is communicably coupled to POS peripheral 140. As will be evident from the proceeding discussion, transfer system 100 can include any number of POS devices 130, POS peripherals 140, and/or function central controls 110 in accordance with the various embodiments of the present invention.

Communication network 120 can be any network capable of transmitting and receiving information in relation to POS device 130. For example, communication network 120 can comprise a TCP/IP compliant virtual private network ("VPN"), the Internet, a local area network ("LAN"), a wide area network ("WAN"), a telephone network, a cellular telephone network, an optical network, a wireless network, or any other similar communication network. In particular embodiments, transaction network 120 provides message based communications between POS devices 130 and function central controls 110.

In some embodiments, communication network 120 is a combination of a variety of network types. For example, in one embodiment, communication network comprises the Internet for communicating between POS device 130 and function central control 110a, a Virtual Private Network ("VPN") for communicating between POS device 130 and function central control 110b, and a dial-up network for communicating between POS device 130 and function central control 110c. In light of this document, one of ordinary skill in the art will recognize a number of other network types and/or combinations thereof that are capable of facilitating communications between POS device 130 and various function central controls 110.

Each of function central controls 110 can be any system capable of processing transactions effectuated in relation to POS devices 130. For example, function central controls 110 can be a money or value transfer system, a fraud detection system, a bad check detection system, a phone or stored value card sales system, a bill payment system, a bill presentation system, a check acceptance system, a payroll system, a check acceptance system, and the like. In one particular embodiment of the present invention, transfer system 100 includes more than twenty-thousand POS devices 130 with associated POS peripherals 140, and four function central controls 110. The function central controls 110 are a money transfer system, a fraud detection system, a phone card system, and a check acceptance system. Upon reading this document, one of ordinary skill in the art will recognize many types of function central controls useful in relation to the present invention. Similarly, one of ordinary skill in the art will recognize many possible combinations of such function central controls 110 deployed in relation to POS devices 130 and POS peripherals 140 in accordance with the present invention.

POS device 130 is an integration of two or more components for facilitating customer access to one or more function central controls 110. In some embodiments, POS device 130 is an intelligent, counter top, merchant activated POS device targeted for use in a variety of retail environments. Some of the retail environments include capability to transfer money, consummate retail purchases; provide stored value cards including, but not limited to, phone cards and/or gift cards; perform fraud detection and surveillance; and the like. In some embodiments, POS device 130 operates as a single self contained device, while in other embodiments, POS device 130 operates in conjunction with one or more POS peripherals 140.

In some embodiments, POS peripheral 140 is a secure device which can interface with POS device 130, a Personal Computer ("PC"), an Electronic Cash Register ("ECR"), a Personal Digital Assistant ("PDA"), or other such devices. POS peripheral 140 can provide functionality which is used by a consumer in a retail environment, such as Personal Identification Number ("PIN") entry, clear text entry, signature capture, and the like. In various embodiments, POS peripheral 140 can be used as a stand alone unit capable of operation apart from POS device 130 or other such base devices.

Either separate or in conjunction, POS peripheral 140 and POS device 130 can support a variety of functions together with a range of transactional services offered through a retailer maintaining POS device 130 and/or POS peripheral 140. Such transactional services can include, but are not limited to, money transfers, money orders, and/or checking and check guarantee services, and the like. In addition, the transactional services can be provided by one or more third party suppliers maintaining function central controls 110 accessible via POS device 130 and/or POS peripheral 140. For example, money orders may be requested and printed by POS device 130 and/or POS peripheral 140 through access to a first supplier's transaction system (e.g., function central control 110), while check guarantee services are provided by POS device 130 and/or POS peripheral 140 through access to a second supplier's transaction system (e.g., function central control 110).

In some embodiments, POS peripheral 140 provides the identical functionality provided by POS device 130, albeit in a form accessible to a customer. Thus, for example, POS device 130 may be tailored for operation by a merchant, while the same functionality is implemented in POS peripheral 140 and tailored for operation by a customer. In particular embodiments, POS device 130 is mounted near a cash register at a check out stand in a retail outlet, while POS peripheral 140 is mounted on the check out stand and accessible to a customer. In this way, both the merchant and the customer can interact with similar devices to effectuate a transaction.

In other embodiments, POS device 130 includes a number of components while POS peripheral 140 includes only a subset of such components. Thus, for example, a customer is capable of effectuating a limited number of transactions, or only a portion of other transactions via POS peripheral 140, whereas the merchant is capable of effectuating all transactions via POS device 130.

In yet other embodiments, POS device 130 includes some components and POS peripheral 140 includes a complimentary set of components. Thus, for example, functions useful for gathering information from a customer in relation to a transaction are deployed as part of POS peripheral 140, while components used by a merchant in relation to a transaction are deployed as part of POS device 130.

In some embodiments, POS peripheral 140 is communicably coupled to POS device 130 via a cable 135. In other embodiments, POS peripheral 140 is communicably coupled to POS device 130 via a Radio Frequency ("RF") or line-of-sight connection. While the preceding discussion identifies a variety of interconnects between POS device 130 and POS peripheral 140, one of ordinary skill in the art will recognize a number of other types of interconnection capable of communicably coupling POS device 130 to POS peripheral 140. Furthermore, it should be recognized that more than one POS peripheral 140 can be associated with a single POS device 130. Alternatively, in some embodiments, POS device 130 is implemented without an associated POS peripheral 140.

A. Functional Hardware

Figure 2:
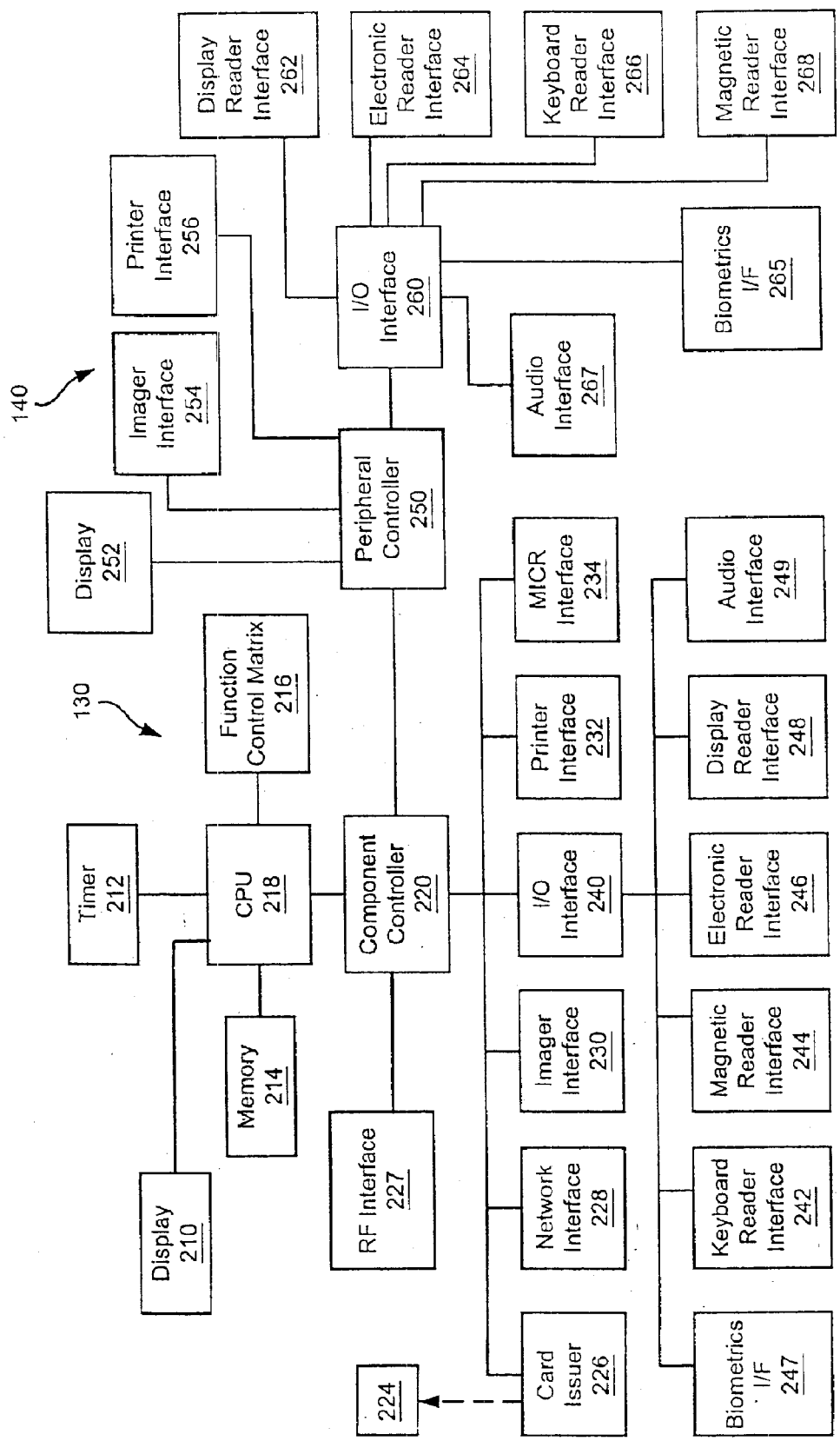
FIG. 2 is a logical block diagram of a point-of-sale device in accordance with an embodiment of the present invention.

Referring now to FIG. 2, a logical block diagram of one embodiment of POS device 130 and POS peripheral 140 is illustrated. POS device 130 includes a Central Processing Unit ("CPU") 218 electrically coupled to a memory 214, a timer 212, a component controller 220, and a function control matrix 216. Further, CPU 218 is communicably coupled to a display 210 via a graphics controller (not shown).

Component controller 220 provides an interface to the variety of components associated with POS device 130 including a peripheral controller 250 that controls access to POS peripheral 140. More particularly, component controller 220 provides an interface to a card issuer 226, a network interface 228, an imager interface 230, a printer interface 232, and a Magnetic-Ink Character-Recognition ("MICR") interface 234. In addition, component controller 220 provides an interface to an Input/Output ("I/O") interface 240 that in turn provides access to and from a variety of I/O interfaces. Specifically, I/O interface 240 provides for access via a keyboard interface 242, a magnetic reader interface 244, an electronic reader interface 246, a biometrics interface 247, a Radio Frequency ("RF") interface 227, a display reader interface 248, and an audio interface 249.

Peripheral controller 250 provides for control of POS peripheral 140 under direction of CPU 218 and component controller 220. More particularly, peripheral controller 250 provides for access to a display 252, an imager interface 254, a printer interface 256, and access to and from an I/O interface 260. I/O interface 260 provides access to an audio interface 267, a biometrics interface 265, a keyboard reader interface 266, an electronic reader interface 264, a magnetic reader interface 268, and a display reader interface 262.

CPU 218 can be any microprocessor capable of controlling the various functions of POS device 130 described herein. In some embodiments, CPU 218 is a thirty-two bit Reduced Instruction Set Computer ("RISC") processor. In one particular embodiment, CPU 218 is a Motorola 68302 processor. In other embodiments, CPU 218 is a pair of 32-bit processors one tasked to control the various components associated with POS device 130 and POS peripheral 140, and the other processor tasked with operating the various software applications executed in relation to POS device 130 and POS peripheral 140. In some embodiments, various of the blocks illustrated in FIG. 2 are implemented within CPU 218, while others of the blocks are implemented in logic apart from CPU 218. One particular embodiment of POS device 130 and POS peripheral 140 is discussed below with reference to FIG. 3, where the division between CPU 218 and logic implementing other functions is more fully described.

Display 210 can be any type of display capable of presenting information relevant to a transaction to a user. For example, in some embodiments, display 210 is a backlit graphic Liquid Crystal Display ("LCD") of the chip on glass type, having eight lines by twenty characters, or one-hundred, twenty-eight by sixty-four pixels. Such a display can be either color or monochromatic. In some embodiments, the display is a Film Compensated Super Twisted Nematic ("FTSN") LCD. In one particular embodiment, display 210 is a touch-screen, one-quarter VGA monochrome display with 16 levels of gray scale. In such an embodiment, display reader interface 248 provides an interface for receiving input via the touch-screen.

Display 210 may have a number of features and/or characteristics chosen to satisfy particular needs. For example, one embodiment uses a monochrome backlit display measuring four and one-half inches by three and four-tenths inches. In the embodiment, display 210 further provides three-hundred, twenty pixels by two-hundred forty pixels of resolution at 16 levels of gray scale. Display 210 can further include Cold Cathode Fluorescent Lamp ("CCFL") back lighting with an automatic shutoff feature. Further, contrast adjustment with automatic temperature compensation and a hardened Mylar anti-glare covering can be provided. This hardened covering acts as protection for the touch-screen and is located physically above the touch-screen. In addition, angle adjustment to reduce glare can be provided as part of display 210. The automatic contrast control for the LCD can be provided to compensate for changes in contrast as a result of temperature changes and is chosen to provide adequate contrast adjustment across the full operating temperature range of POS device 130. In addition, a user can adjust the contrast of the LCD by means of Operating System ("OS") functions or through appropriately written application software. As further discussed below, such a display can be mounted in POS device 130 in either a portrait or landscape orientation.

In other embodiments, display 210 is a 256-level color passive display support. Such a display can support animation and smooth scrolling. For example, in a monochrome deployment, display 210 can update at twelve frames per second, while in a passive color deployment, display 210 can update at four frames per second. In some embodiments, display 210 has an expected life of 30,000 hours power on to half intensity.

As mentioned, display 210 can be associated with a touch-screen, where input from the touch-screen is available to POS device 130 via display reader interface 248. In an embodiment, the touch-screen unit is positioned over the LCD of display 210 and has an active area roughly equivalent to the LCD. The touch-screen can be implemented using a four-wire touch-screen technology and exhibit a minimum touch duration of thirty milliseconds and a minimum inter-touch interval of one-hundred milliseconds. Furthermore, the touch-screen can be operable with either a finger or a stylus under approximately thirty-five to fifty-five grams of minimum pressure. Such a touch-screen can have an expected life of approximately one-million key depressions. In embodiments including a touch-screen, the display presentation associated with the touch-screen can be especially tailored to the particular input required. Thus, for example, where the entry of only numbers is required, the display presentation can be limited to numbers from zero to nine. Thus, one benefit of using a touch-screen is that it may reduce operator error by limiting its display to what is required at a particular sequence within a transaction. In addition, such a touch-screen can be split to show both transaction-oriented prompts and promotional graphics and messaging.

In some embodiments, the touch-screen and LCD can be brought into calibration with one another either through an OS function, or through an appropriately written software application. Such calibration includes assuring that a particular point on the LCD is aligned with the corresponding point on the touch-screen. In various embodiments, such calibration is performed upon installation of POS device 130, or when POS device 130 is moved to an alternate location. In other embodiments, the calibration is performed as POS device 130 is manufactured and the touch-screen and LCD of display 210 are associated with one another.

In some embodiments, keyboard interface 242 interfaces a keypad to POS device 130. Such a keypad can include sixteen programmable keys. In various embodiments, a keypad is not provided, but rather, the functionality of such a keypad implemented via a touch-screen as previously described.

In various embodiments, magnetic reader interface 244 interfaces a magnetic-stripe reader to POS device 130. Such a magnetic-stripe reader can decode International Organization for Standardization ("ISO") tracks 1, 2, 3 information from a magnetic-stripe on the same side of a card. Either alternatively, or in addition, the magnetic-stripe reader can decode Japanese Industrial Standard ("JIS") information located on a magnetic-stripe on the card side opposite the ISO tracks 1, 2, 3. Such JIS information can also conform to a physical standard for the location of the magnetic-stripe on the card which is in a different location from ISO standard stripes. Alternatively, or in addition, the magnetic-stripe reader can be compliant with standards promulgated by the American National Standards Institute ("ANSI"), American Association of Motor Vehicle Administrators ("AAMVA"), and Commercial Drivers License ("CDL").

In some cases, data are read from two tracks on both insertion and removal of a card from the magnetic-stripe reader. However, the magnetic-stripe reader can be capable of reading any combination of three tracks from a variety of magnetic-stripe cards. In some embodiments a hardware and software configuration of components of POS device 130 performed during manufacture determines which tracks of a magnetic-stripe card can be read by POS device 130. In other embodiments, software configuration done after manufacture, controls which tracks of a card are read. In particular embodiments, the magnetic-stripe reader is integrated into POS device 130, while in other embodiments, the magnetic-stripe reader is offered as an add-on device communicable to POS device 130 via an I/O port of POS device 130.

In some embodiments, the magnetic-stripe reader is capable of reading a card swiped in either of two directions. Further, the magnetic-stripe reader can be oriented either horizontally or vertically in relation to POS device 130. Such magnetic-stripe readers can have a head life of approximately one million reads and operate with a swipe speed in the range of approximately five to fifty inches per second.

In some embodiments, electronic reader interface 246 provides POS device 130 with access to data from a smart card reader. A smart card is typically a credit card sized card that includes at least some electrical processing capability. A smart card, because of the processing power, provides more security compared to a traditional credit or debit card. In an embodiment, the smart card reader is ISO 1, 2, 3 compliant offering Europay/MasterCard/Visa ("EMV") level 1 approval. The smart card reader is a non-locking device with friction contacts, an expected life of fifty-thousand card insertion/withdrawal cycles, support for three-volt and five-volt cards at both single and double clock frequency standards, and support for baud rates up to four times greater than the nominal speed. In some embodiments, a smart card reader is integrated within POS device 130 and/or POS peripheral 140, or provided as an option communicable to POS device 130 via either a serial or parallel port of POS device 130 or POS peripheral 140.

Embodiments that include biometrics interface 247 can be capable of receiving a finger-print, or other body element for authentication purposes. Thus, a person cashing a check can use a finger-print in place of a signature to consummate a transaction. Of course, other metrics beyond finger-prints can be used in accordance with embodiments of the present invention.

Embodiments that include an RF interface 227 can be enabled to accept customer input via transponders associated with the customers. An RF interface can be associated with either or both of POS device 130 and/or POS peripheral 140. Such RF interfaces can operate either on Radio Frequencies or Light, such as, infra-red. Using RE interface 227, BLUE-TOOTH® technology can be supported in relation to the functionality of POS device 130 and/or POS peripheral 140. As one example, a Key FOB/transponder can be used by a customer to facility rapid checkout using POS device 130. In some cases, the customer can be automatically identified, including account identification, and the account debited for the amount of any given transaction. In particular instances, POS device 130 and/or POS peripheral may be part of a vending machine and RF interface 227 used to identify the customer, and trigger a vend from the machine.

In various embodiments, audio interface 249 provides for input and output of audio data from POS device 130. Audio interface 249 is coupled to a speaker and a microphone. A person with impaired sight can thus operate POS device 130 without use of visual I/O, such as display 210 and/or tactile devices, such as keyboards and touch screens. In an embodiment, audio interface 249 includes a digital to analog ("D/A") converter to convert data from a digital format accessible by CPU 218 to an analog format presentable through the speaker. In addition, audio interface 249 includes an analog to digital ("A/D") converter for converting sound data received via the microphone to digital data manipulable by CPU 218. In some instances, volume control is provided and controlled by audio interface 249. In other instances, volume control is not provided, but rather a static, acceptable volume range is chosen.

In addition, the speaker coupled to audio interface 249 can be coupled to a modem attached to network interface 228 for listening to modem tones, alarm beeps, and the like. In such an implementation, volume control is desirable as is the ability to turn the speaker on and off. Such control can be added as an external analog control, or implemented via analog interface 249 where the control is provided via OS functions or a software application running on CPU 218.

In some embodiments, printer interface 232 provides POS device 130 with access to one or more printers capable of printing various documents, such as, receipts, checks, and/or money orders. In particular embodiments, the printers are either or both of roll printers and slip printers.

A roll printer can be integrated into POS device 130 and be deployed as both logically and physically a separate from an integrated slip printer as further described below. The roll printer can have the following characteristics: thermal printer technology using thermal paper, minimum fifteen lines per second or three inches per second, print head life of approximately fifty kilometers of paper, paper width of three inches, paper roll diameter of three inches and paper length of two-hundred, thirty-five feet, use of a drop-in paper roll that does not require threading, no spindle required for the paper roll, a metal tear bar, printing at two-hundred dots per inch ("dpi") for logos, bar codes, customer signatures, and the like. Further, the printer can include full graphics capability, thirty-two character, country specific font, ninety-six character ASCII font, one-hundred, twenty-eight character international font, all printable in double wide/high characters and in reverse. The printer can further include "paper-out" and "cover-open" sensors with outputs available to the OS and/or software running on CPU 218. The print density can be adjustable by means of an OS function or through a software application. In some embodiments, a paper-feed button is not provided and the only means of advancing the paper roll is by means of software operating on CPU 218.

Either in addition to the roll printer or alone, a slip printer can be integrated into POS device 130. Such a slip printer can include a mechanism for detecting if the print cartridge is installed and reporting this information to software via printer interface 232. This slip printer can incorporate ink jet technology, using indelible ink, and providing a minimum of ninety-six dpi. The slip printer can further provide graphics printing capability and a selection of font sizes. A print speed of six full lines of mono-color printing is possible and intelligent shuttle control is provided to minimize shuttle movement between print lines. As previously discussed, in some embodiments, the slip printer is capable of bi-directional printing.

In some embodiments, a Magnetic Ink Character Recognition ("MICR") reader is integrated with POS device 130 and accessible via MICR interface 234. Such a MICR reader facilitates reading magnetically printed account information from both business and personal documents including, but not limited to checks. Such a MICR reader provides POS device 130 with the ability to read the MICR line in either direction, under control of software operating on CPU 218. In particular embodiments, the MICR reader is motorized and automatically recognizes and reads E13B and CMC7 code line formats. Both business and personal checks can be processed, up to checks three and eight-tenths inches by eight and three-quarters inches. The MICR reader can read checks both magnetically and optically using information derived from the document imager as further described below. In some embodiments, software running on CPU 218 controls all access of the merchant to the MICR received via the touch-screen display and/or the keyboard. Logic associated with MICR interface 234 is capable of extracting the various fields on the MICR line. Such logic can be implemented in either hardware or software with the parsing algorithms associated therewith that can be updated by modifying either the software after manufacture and installation of POS device 130.

In some embodiments, a document imager is integrated with POS device 130 and accessible to POS device 130 via imager interface 130. Such a document imager can support both signature and block text scanning at three-hundred dpi or greater. The imager can further provide a read rate of approximately twelve inches per second and be capable of providing image data to POS device 130 via imager interface 230 within four seconds of reading a document. In some embodiments, the document imager is further capable of capturing an image of both the front and back of a presented document, while in other embodiments, the document imager only captures an image of one side of a presented document. Various calls associated with either or both of the OS and software running on CPU 218 can support transfer of raw image data from the document imager to POS device 130. Software running on CPU 218 can crop, enlarge, analyze and otherwise manipulate the received image data. The imager can image documents up to four inches wide and eight and three-quarters inches long. One available output from the imager is a Tagged Image File Format ("TIFF") provided in black and white.

In embodiments of POS device 130 integrating two or more of a slip printer, a roll printer, a MICR reader, and a document imager, a single paper transport mechanism can be utilized to support all or a combination of the aforementioned components. Such a shared paper transport mechanism is designed to allow easy clearance of paper jams and changing of ink cartridges. This can be done by providing a merchant with access to the paper path and cartridge, while limiting the merchant's access to sensitive electronics. The paper transport mechanism can be opened by manipulating a physical latch button on the side of POS device 130. With POS device 130 in the open position, a "cover-open" status is reported to CPU 218. Further, when the cover of POS device 130 is open, either the OS or software running on CPU 218 can disable MICR reading, document imaging and printing via either the slip printer or the roll printer.

The paper transport can also be capable of handling documents that exhibit a fold, crease or otherwise are not completely flat. In some embodiments, the paper transport does not include a feed tray and therefore, documents are fed one at a time into a receiving mechanism. In particular embodiments, the receiving mechanism is designed to receive documents up to four and one-quarter inches wide and a length of fourteen inches. Further, the paper can move bi-directionally through the paper transport under software control.

POS device 130 further comprises a variety of network interfaces accessible via network interface 228. In one particular embodiment, POS device 130 includes an Ethernet interface, a slow bus interface, a USB interface, an RS-232 interface, a PCMCIA interface associated with two PCMCIA slots integrated with POS device 130, and/or a dial-up modem interface. It should be recognized by one of ordinary skill in the art that other interface types can be used in place of or in addition to the aforementioned interfaces.

Where an Ethernet interface is provided, it can be designed to support either or both of Asymmetric Digital Subscriber Line ("ADSL") technology or another technology used in relation to a network in a merchant's location. Such an interface can be 10BaseT and provided via an RJ45 connector accessible on POS device 130. In particular embodiments, Ethernet connectivity is provided via a PCMCIA card inserted into a slot on POS device 130.

Some embodiments of POS device 130 further include card issuer 226 capable of issuing stored value cards 224. Such stored value cards can be gift certificates, phone cards, debit cards, and the like.

In various embodiments, POS device 130 and/or POS peripheral 140 includes a bar code reader associated with a bar code reader interface. Such a bar code reader can be used to identify a product or person and transfer that information to a central database. Further, in some embodiments, bar codes can be printed on issued items, such as, for example, receipts and the like. Thus, a customer can be issued a receipt with a bar code that can be in turn associated with a product or service that was sold to the customer. This information can be maintained on a central database accessible by one or more POS devices 130.

Various embodiments of POS device 130 further include a dial-up modem. Such a dial-up modem can be a V.90 modem operating at fifty-six kilobits per second and capable of supporting any of the following modem standards: V.21, V.22, V.22bis, V.32bis, V.34, V.90, V.92 Bell 103, Bell 212A, Hypercom quick connect on V.22 and Bell 212A, and/or Synchronous V.22 and Bell 212A mode. The dial-up modem is associated with an RJ11 modular jack integrated with POS device 130. In addition, a separate pass through telephone port can be provided to allow for voice access and/or monitoring of modem communication on a shared telephone line.

In addition, POS device 130 can include two or more USB connectors and associated controls. In particular embodiments, network interface 228 includes logic to support one or more USB version 2.0 compliant communication ports with or without root hub support. Such USB communications can be used to attach devices external to POS device 130 and/or to communicate with devices integrated with POS device 130, such as, for example, display 210, a MICR reader, a printer, and/or peripheral controller 250.

Various embodiments further include one or more RS232 Ports providing connectivity to various external peripherals. Such RS232 ports include RJ12 connectors integrated with POS device 130 and provide a baud rate of approximately thirty-eight and four-tenths kilobits per second.

Memory 214 can be any type of storage accessible to CPU 218. In one particular embodiment, memory 214 includes four to eight MegaBytes of Dynamic Random Access Memory ("DRAM") or Static Random Access Memory ("SRAM"). In addition, some embodiments include another eight MegaBytes of flash memory installed via a PCMCIA slot.

Timer 212 can be any type of timer capable of incremental time stamping of transactions and occurrences related to POS device 130. In one embodiment, timer 212 is provided as part of CPU 218 and is capable of providing Month/Day/Year and Hours/Minutes/Seconds. In some embodiments, a backup battery is associated with timer 212 such that, in the event of a power failure, timer 212 remains constant and accurate.

Function control matrix 216 can be provided to select which components associated with POS device 130 are accessible to a merchant. Thus, for example, a POS device 130 with significant functionality may be provided to a retailer, but only portions of the functionality are accessible. In particular embodiments, function control matrix 216 can be accessed by one or more of function central controls 110 to enable and/or disable components provided with POS device 130. This can be done via communication network 120 and network interface 228. Thus, for example, where a function central control 110 is a money transfer system, a retailer may be required to pay a service fee to the money transfer system and in turn, the money transfer system accesses POS device 130 by, for example, the Internet and modifies function central matrix 216 to allow for access to components useful in relation to the money transfer system. More particularly, where the money transfer system requires use of a slip printer, a card issuer, and a magnetic reader, the interfaces associated with those components can be enabled by the money transfer system. In some embodiments, the components are only enabled for use for transactions between POS device 130 and a function central control 110 that has previously enabled use of the components.

Thus, in some embodiments of the present invention, a single POS device 130 can be developed and sold to a variety of end users. Each of the end users can in turn control the functionality of POS device 130 by selecting which of the various function central controls 110 to access. This allows for reduced manufacturing costs as only a single configurable model of POS device 130 need be produced. In some instances, two models are produced, where one model excludes various costly functions that are only needed by a limited number of end users.

Alternatively, a single POS device 130 can be developed and sold to a number of entities providing function central controls 110, who in turn can market such POS devices 130 to retailers of services associated with the particular function central control 110. When a retailer has already obtained a POS device 130 for accessing one function central control 110, it need not obtain an additional POS device 130 to access an additional function central control 110, but rather only need request the other function central control to enable itself on POS device 130 by properly accessing and encoding function control matrix 216. Again, two or more POS devices 130 can be developed for different function central controls 110 and/or merchants, if that is in fact desirable.

In one exemplary embodiment of the present invention, POS device 130 includes: a touch-screen, one-quarter VGA monochrome display with sixteen levels of gray scale, a sixteen button keypad, eight MegaBytes of DRAM memory, a thirty-two bit RISC processor with an associated Application Specific Integrated Circuit ("ASIC"), an integrated magnetic-stripe reader, an integrated smart card reader, an integrated roll printer, an integrated slip printer, an integrated MICR reader, an integrated document imager, an integrated modem, and various USB, RS232, PCMCIA, USB and Ethernet interfaces. Further POS device 130 is IP addressable and exists in a case approximately eleven inches long by six inches high by six inches wide.

In some embodiments, a variety of statistics can be measured and stored within memory 214. Such statistics can include, but are not limited to, number of smart card insertions, number of MSR card swipes, number of touch-screen key depressions, number of keypad key depressions, number of display backlighting minutes, POS device 130 device power on time, number of flash memory writes, number of dots printed by the slip and roll printers, number of check reads by the MICR reader, number of check read errors, number of communication errors, number of modem connect attempts, length of paper moved past the roll printer thermal print head, length of paper moved past the imager and/or MICR reader, and the like. Such information can be accessed by one or more central controls 110 via communication network 120 and used to determine potential future failures and the like. This facilitates preventative maintenance and avoids unnecessary down time and customer displeasure.

An OS and various software applications can be chosen to provide functionality to POS device 130. For example, in some embodiments, POS device 130 is addressable with an Internet protocol and includes a browser application. In such embodiments, CPU 218 includes software adapted to support such functionality. In instances where a POS device 130 and a POS peripheral 140 are provided, Internet functions can be provided by CPU 218 to both POS peripheral 140 and POS device 130.

In some embodiments, CPU 218 executes software to support network management. In particular, this capacity allows software to be downloaded to a plurality of such systems to provide new applications and/or updates to existing applications. For example, in one embodiment, OS and software application upgrades are distributed and maintained through communication to POS device 130 via communication network 120.

Peripheral controller 250 is associated with POS device 130 and controls access to and from POS peripheral 140. In some embodiments, peripheral controller 250 includes a CPU similar to CPU 218, while in other embodiments, peripheral controller 250 is implemented in Integrated Circuit ("IC") logic, such as a gate array, or a combination of software operating on CPU 218 and IC logic. POS peripheral 140 can include a variety of functions similar to those discussed in relation to POS device 130. For example, POS peripheral 140 can include a display 252 similar to display 210, one or more printers associated with printer interface 256 similar to printers discussed in relation to printer interface 232, and a document imager associated with an imager interface 254 and similar to that discussed in relation to imager interface 230. Further, an I/O interface 260 can provide access to similar interfaces included on POS device 130. More particularly, audio interface 267 is similar to audio interface 249, biometrics interface 265 is similar to biometrics interface 247, keyboard reader interface 266 is similar to keyboard interface 242, electronic reader interface 264 is similar to electronic reader interface 246, magnetic reader interface 268 is similar to magnetic reader interface 244, and display reader interface 262 is similar to display reader interface 248. It should be recognized that various embodiments may comprise more or fewer than the aforementioned components. In embodiments where the aforementioned components are available with POS peripheral 140, the components can provide the additional functionality described below with reference to the particular components.

In particular embodiments, display 252 includes palm-rejection capabilities and increased durability provided by capacitive touch technology that make it especially suitable for signature capture functions. In some embodiments, display 252 supports electronic signature capture to facilitate processing of electronic forms of payment. In such embodiments, display 252 comprises a digitizer having at least eight-bit A/D conversion detail. The resolution of the digitizer is preferably at least three-hundred dpi. In such embodiments, the display 252 further comprises a hard writing surface to prevent screen damage in the event that a customer mistakenly uses a pen or pencil, rather than an electrostatic writing stylus used for signature entry.

Figure 3A:
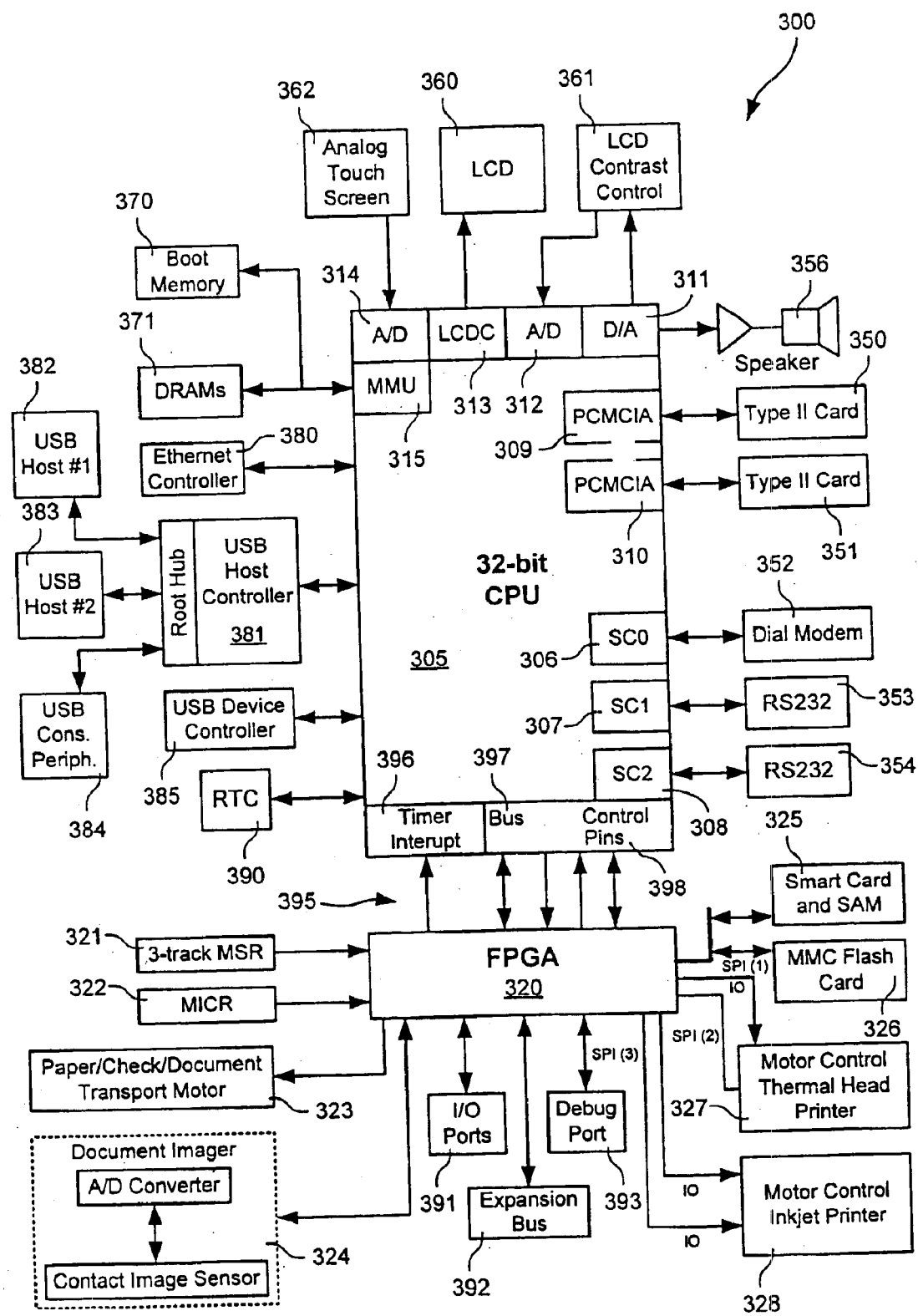
FIGS. 3a–3b are a schematic diagrams of components included in one embodiment of a point-of-sale device in accordance with the present invention.

FIG. 3 illustrates a schematic diagram 300 of one embodiment of components associated with POS device 130 and used to implement various of the logical elements discussed in relation to FIG. 2. The embodiment includes a CPU 305 directly controlling a number of components and associated with a Field Programmable Gate Array ("FPGA") 320 programmed to handle a number of other components.

CPU 305 includes an A/D converter 314 for accessing analog data from a touch-screen 362 and converting it to digital data compatible with CPU 305. In addition, an A/D converter 312 and a D/A converter 311 are provided for contrast control of an LCD 360 via LCD contrast control logic 361. LCD control logic 313 is also included within CPU 305 to format and control output to LCD 360. A memory management unit 315 is included within CPU 305 to provide control of accesses to and from a boot memory 370 and a main memory 371. Further, CPU 305 provides interfaces and controls to a variety of communication mechanisms including a USB device controller 385, and a USB host controller 381 supporting communications with USB hosts 382 and 383, as well as, a USB peripheral 384. CPU 305 is further coupled to an Ethernet controller 380, a dial-up modem 352 via a serial communication port 306, and RS232 connectors 353 and 354 via serial communication ports 307 and 308, respectively.

In addition, D/A and A/D converters 311 and 312, respectively, are coupled to a speaker 356 and a microphone (not shown) to allow access to POS device 130 by those that are hearing impaired and/or monitoring of tones associated with dial-up modem 352. A real time clock 390 is associated with CPU 305 to provide time stamping capability. As previously discussed, the real time clock can be attached to a backup battery such that time is maintained even when power to POS device 130 is lost. CPU 305 also provides a PCMCIA interface 309, 310 to two PCMCIA card slots 350 and 351.

FPGA 320 is coupled to CPU 305 via a bus 395 including a timer interrupt 396, one or more data lines 397 and control pins 398. FPGA 320 includes interfaces to a magnetic card reader 321, a MICR reader 322, a paper transport motor 323, a document imager 324, a smart card and SAM reader 325, a flash memory card 326, and motor controls for a slip printer 328 and a roll printer 327. In addition, various I/O ports 391, an expansion bus 392 and a debug port 393 are provided.

Figure 3B:
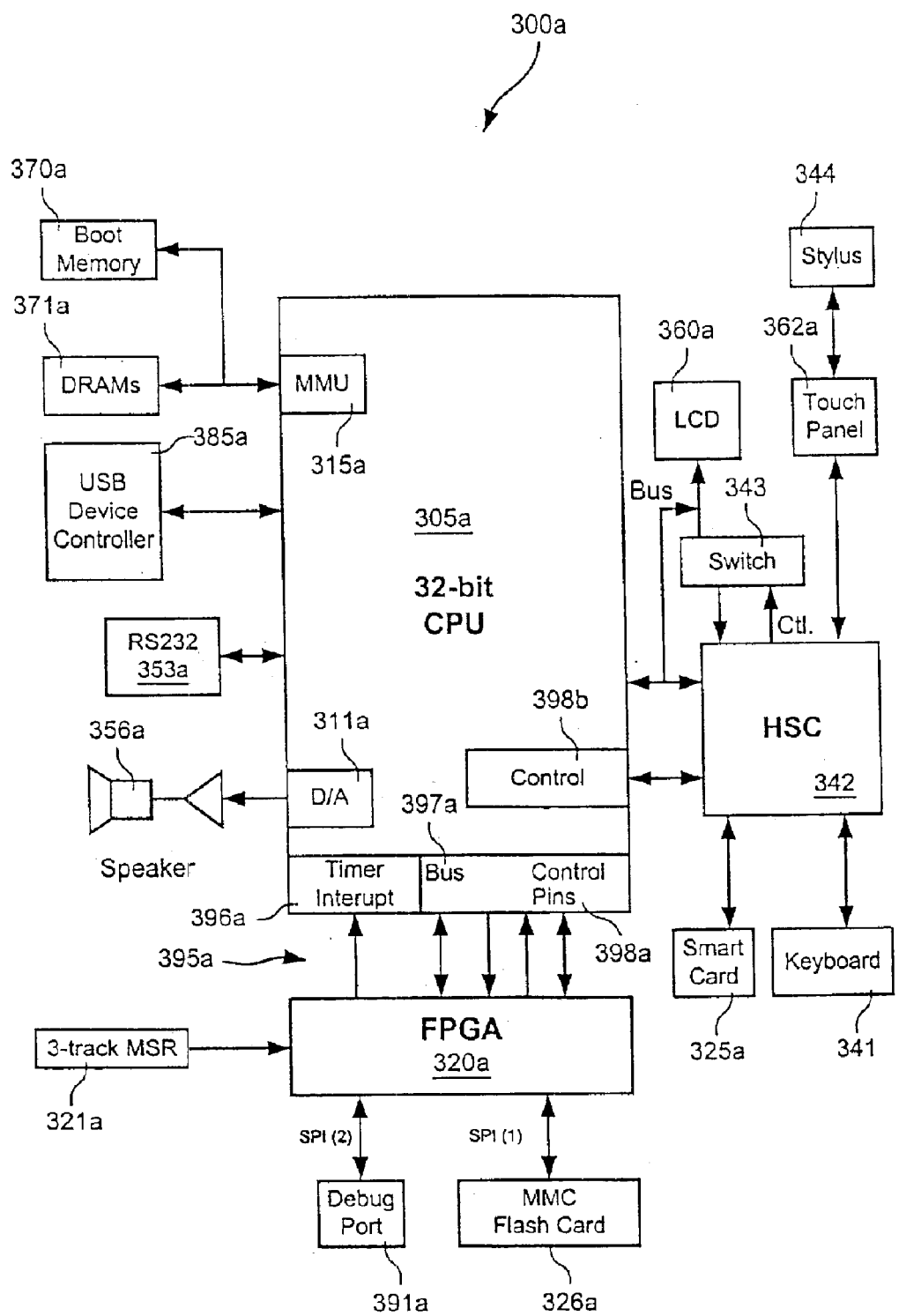

FIG. 3B illustrates another embodiment of schematic diagram 300 (i.e., schematic diagram 300a) including similar components designated with the same number as that of schematic diagram 300, but with lower case letters associated with the numbers. In addition to that described in relation to schematic diagram 300, schematic diagram 300a includes a controller 342, a keyboard 341, a switch 343, and a stylus 344 for use in relation to a touch panel 562a. Each of the other elements are as described in relation to the corresponding numbered element in schematic diagram 300.

B. Packaging Hardware

FIGS. 4A–4F show perspective views of mechanical layouts of POS device 130 and POS peripheral 140 in accordance with various embodiments of the present invention. The illustrated embodiments show combinations of different features that may be included in specific embodiments, although it will be appreciated that additional embodiments will derive from further combinations of features, and perhaps also the addition or absence of certain features.

One feature that may be varied among different embodiments is the mode in which the base unit engages in external communications. In some embodiments, communication is achieved with ports to support such standard communication protocols as RS232, RJ11, USB, and PCMCIA Type-II connections. Similarly, such protocols may also be used for communication between POS device 130 and POS peripheral 140. In other embodiments, POS device 130 communicates with POS peripheral 140 through transmission and receipt of infrared signals. Further, in some embodiments, POS device 130 can be configured as a docking station adapted for docking a correspondingly configured POS peripheral 140.

In embodiments configured for docking POS peripherals 140 with POS devices 130, the system may be configured so that POS peripheral 140 is either "dedicated" or "shared." In embodiments where POS peripheral 140 is "shared," it is used commonly as an independent unit for customer functions and as part of the merchant's unit when docked with POS device 130. In embodiments where POS peripheral 140 is "dedicated," one POS peripheral 140 is used exclusively for customer functions and another POS peripheral 140 is docked with the POS device 130 and used for merchant functions. The different embodiments have their respective advantages. Using dedicated POS peripherals 140 may be more productive since the need to move the POS peripheral to and from POS device 130 is eliminated, but sharing the POS peripheral 140 may be less costly.

Other features that may vary in different embodiments affect how the system is used more directly. For example, in some embodiments, POS device 130 is adapted to be positioned on a horizontal surface, such as a merchant's counter, while in other embodiments it is adapted to be mounted on a wall. Such wall mounting permits a greater fraction of the counter space to remain unobstructed. In one embodiment, POS device 130 is adapted for either type of mounting to accommodate the merchant's preference. Also, in some embodiments, the displays of POS device 130 and POS peripheral 140 may be provided in a landscape or portrait orientation. A landscape orientation will generally facilitate the display of Internet content to a customer and be easier to use for accepting a customer signature. A portrait orientation is often simpler in embodiments where a docking POS device 130 is sized to be hand held. Additionally, some embodiments may include a keypad on POS peripheral 140 while others do not. Those embodiments without a keypad generally permit POS peripheral 140 to be more compact, even while devoting more space to the display to provide enhanced internet functions.

Figure 4A:
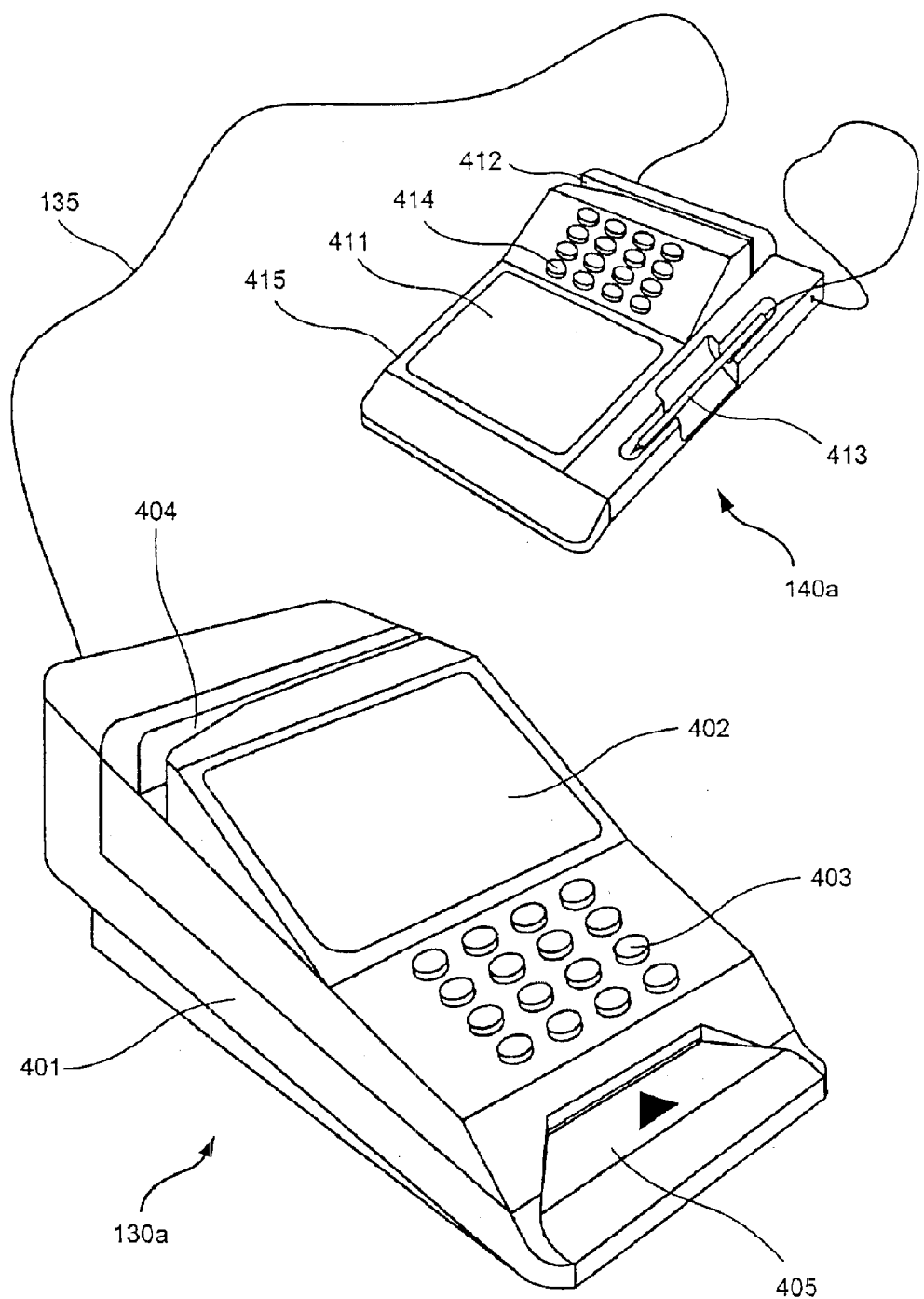
FIGS. 4A–4F show perspective views of mechanical layouts of point-of-sale devices in accordance with various embodiments of the present invention.
Figure 4B:
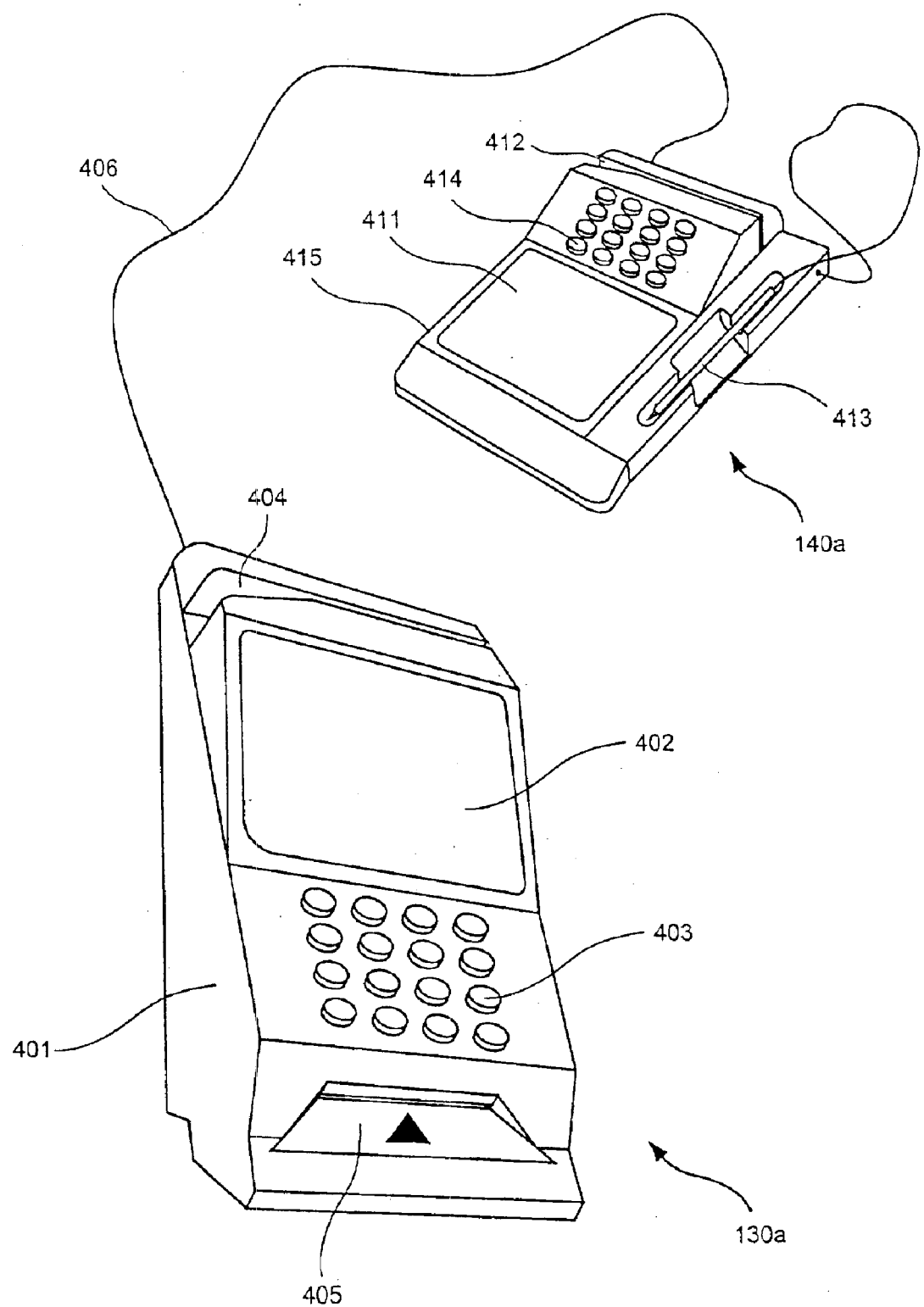

Referring now to FIGS. 4A–4F, examples of different approaches in which components of POS device 130 and POS peripheral 140 can be mechanically combined is illustrated. FIGS. 4A and 4B show an embodiment in which a POS device 130a and a POS peripheral 140a are physically connected by cable 406. FIG. 4A shows POS device 130a positioned horizontally, such as on a counter, and FIG. 4B shows POS device 130a mounted on a wall. POS device 130a comprises a housing 401 for containing certain internal components. Further, POS device 130a comprises a display 402 and a keypad 403 that may be used for the display and entry of data. Display 402 may be monochromatic, although in alternative embodiments a color display is provided. Keypad 403 is illustrated as having sixteen keys, although another number of keys as suitable for specific applications may be used. A magnetic-stripe reader 404, which in one embodiment is bi-directional, is also provided on POS device 130a for reading magnetic-stripes that may be included, for example, on credit and debit cards.

POS device 130a additionally includes a slot 405 for inserting documents, such as checks and/or money orders, which may then be examined by devices internal to housing 401. Such internal devices may include an imaging device, which may include optical character recognition as part of its functionality. In addition, a MICR reader may be provided for reading a string of magnetic-ink characters on the document. Other devices that may be integrated with POS device 130a include a receipt printer, slip printer, and magnetic-stripe card writer. Where such devices are included, printed materials can be retrieved via slot 405. Within housing 401, a modem may be included, such as a wireless modem or an integrated 56 kbit/s V.90 modem. POS device 130a also generally includes internal memory, which may contain software to enable Internet IP addressing, browser support, network management tools, couponing, and advertising, among other software functions. An Ethernet connection, such as a 10BaseT connection, may be included to provide networking capabilities with POS device 130a.

In the embodiment shown in FIGS. 4A and 4B, POS peripheral 140a includes a display 411 that is landscape oriented and includes a keypad 414 to be used generally for entry of a personal identification number ("PIN") by a customer, although it may be used in other applications also. Display 411 may be monochrome or color. A magnetic-stripe reader 412, can be configured for bi-directional reading, is provided, as is a smart card reader/writer 413. These components are contained by a housing 415 that also includes ports, such as RJ11, USB, serial, PCMCIA Type-II, or other ports, for providing external interface connections.

Figure 4C:
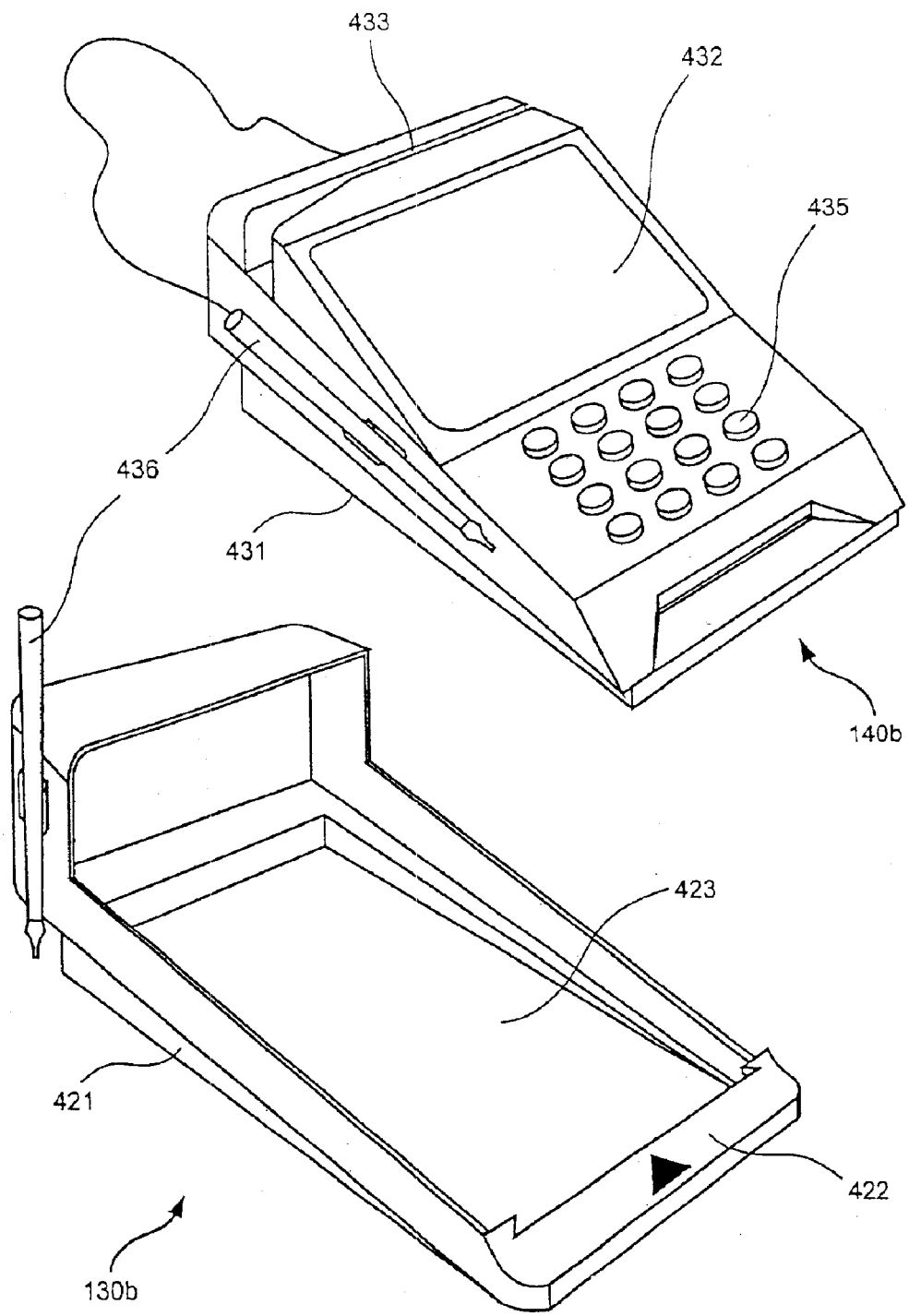
Figure 4D:
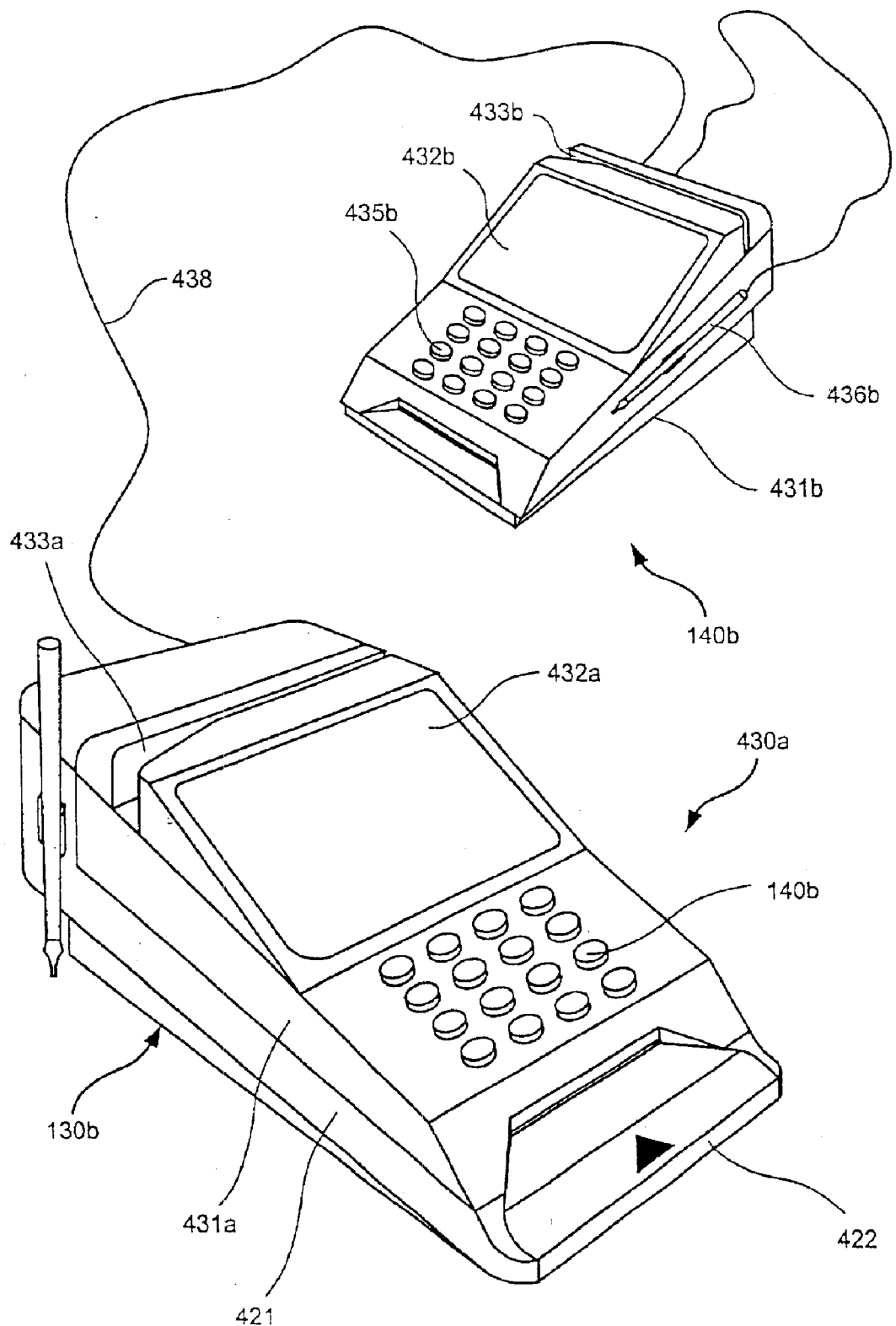

FIGS. 4C and 4D show related embodiments in which a POS device 130b is configured for docking with a POS peripheral 140b. In FIG. 4C, the embodiment shows a shared configuration in which a single POS peripheral 140b functions for customer and merchant functions. Conversely, FIG. 4D shows a dedicated configuration in which two POS peripherals 140b are used. In either case, POS peripheral 140b comprises a housing 431, a display 432, a magnetic-stripe reader 433, and a keypad 435 similar to those described for FIGS. 4A and 4B. In addition, an electrostatic writing stylus 436 is shown in a position that minimizes interference when the display 432 or keypad 435 is being used. The electrostatic writing stylus 436 may be housed in a spring-loaded holder to allow it to deflect when struck.

POS device 130b includes a housing 421 and a slot 422 to allow document access to such devices as an imager, MICR reader, slip printer and receipt printer. Housing 421 may also contain components similar to those described with respect to FIGS. 4A and 4B, including a modem, an Ethernet connection, memory, and software to support IP addressing, browser functions, network management tools, couponing, and advertising. POS device 130b also includes a docking port 423 to permit POS peripheral 140b to be docked as shown in FIG. 4D, and for the functionality of the components of POS peripheral 140b to be accessible with POS device 130b. In addition to providing the capability for connections such as RJ11, USB, serial, PCMCIA Type-II, or other such connections, remote communications, such as through infrared-signal transmissions, are supported. In one embodiment, a security cable 438 is provided to tether housings 421 and 431 of POS device 130b and POS peripherals 140b.

Figure 4E:
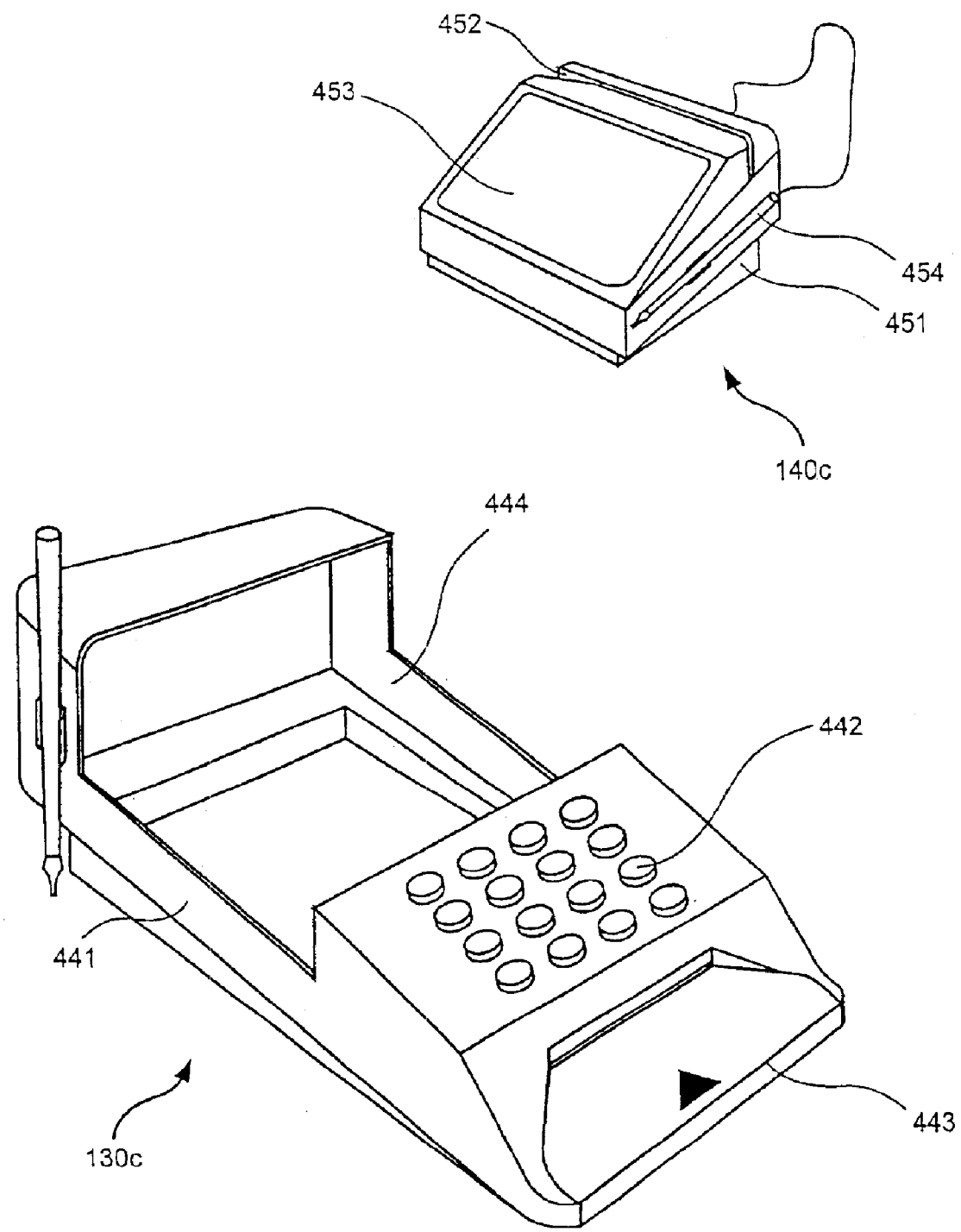
Figure 4F:
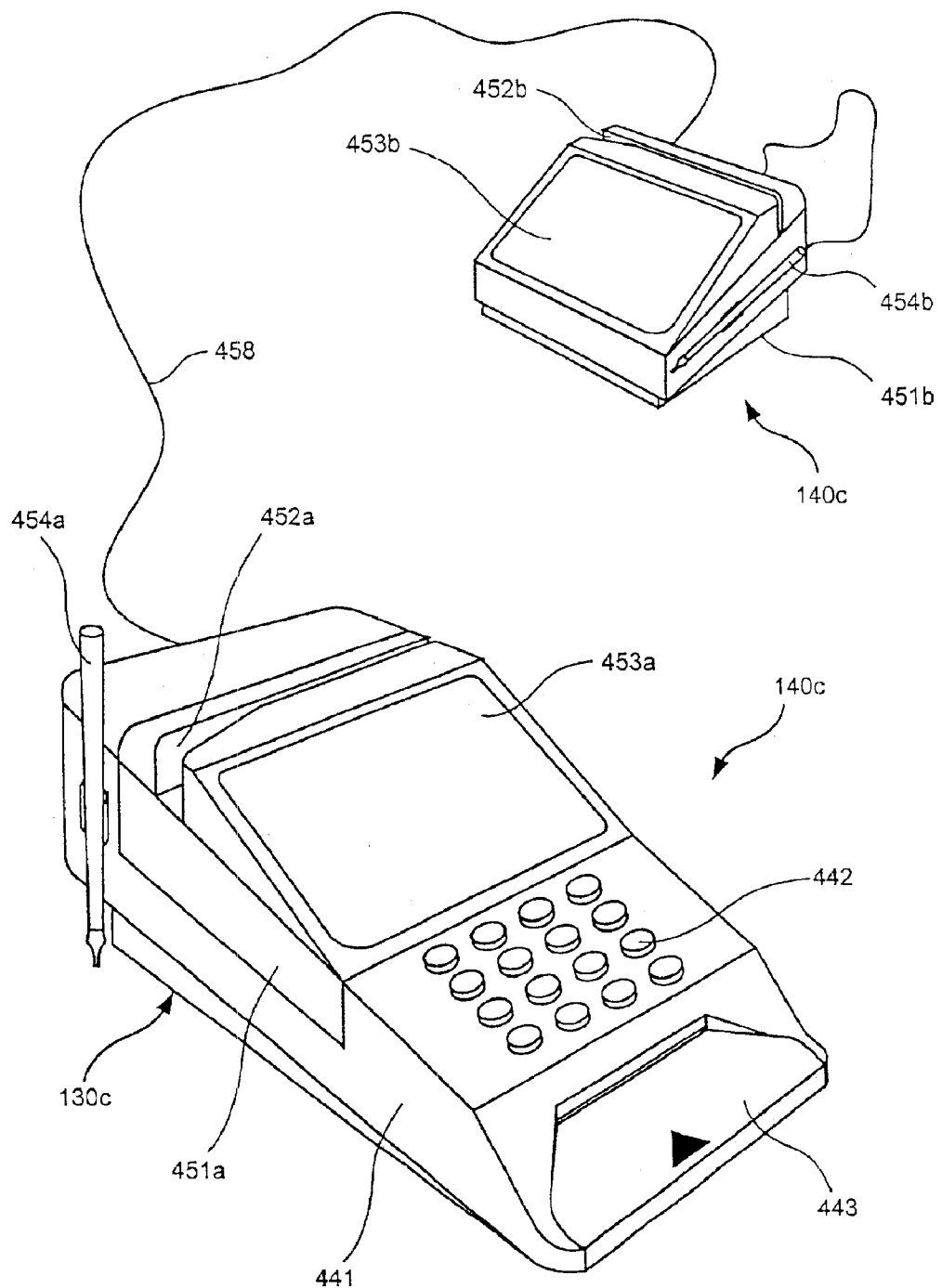

The embodiments shown in FIGS. 4E and 4F are similar to those of FIGS. 4C and 4D except that keypad functions are supported directly by a POS device 130c, rather than by a POS peripheral 140c. As shown, POS peripheral 140c includes a housing 451 and a number of devices, including a magnetic-stripe reader 452, a display 453, and a smart-card reader 454. In the embodiments of FIGS. 4C–4F, displays associated with POS peripherals 140 are shown in a portrait orientation. While such an orientation is useful in those embodiments that dock with a POS device 130 to accommodate the orientation of merchant forms and to simplify allowing POS device 130 to be hand held, a landscape orientation may alternatively be used without loss of functionality.

POS device 130c includes a housing 441, a keypad 442, and a slot 443 for providing documents to be accessed by such devices as an imager, MICR reader, slip printer and receipt printer. As in the other embodiments, POS device 130c may also include a modem, an Ethernet connection, memory, and software to support IP addressing, browser functions, network management tools, couponing, and advertising. POS device 130c also includes a docking port 444 to permit POS peripheral 140c to be docked as shown in FIG. 4F, and for the functionality of the components of POS peripheral 140c to be accessible with POS device 130c. In addition to providing the capability for connections such as RJ11, USB, serial, PCMCIA Type-II, or other such connections, remote communications, such as through infrared-signal transmissions, are supported. In one embodiment, a security cable 458 is provided to tether housings 441 and 451 of POS device 130c and POS peripherals 440 and 450.

III. Exemplary Methods

POS devices 130 and/or POS peripherals 140, whether embodied as integrated devices or as base unit devices with optional peripherals, may be used in numerous varied applications. In some such applications, POS devices 130 and, in some cases, POS peripherals 140 are physically provided by a merchant, where the term "merchant" is intended to be understood broadly as any individual, entity, or group of individuals or entities that provides goods and/or services to customers. In these applications, a customer executes a transaction using a POS device 130 or POS peripheral 140, and the transaction may or may not involve the merchant as part of the transaction, either directly or indirectly. The following description describes some transactions that may be performed using system 100, although various other transactions will be evident to those of skill in the art after reading this disclosure.

The transactions can involve access to one or more function central controls 110 offered and controlled by any of the merchant, the provider of POS devices 130, and/or third parties. The following describes a variety of function central controls useful in relation to system 100. It should be recognized that each of the following function central controls 110 can be combined with other function central controls 110 to implement a number of different systems 100 in accordance with the present inventions. Further, it should be recognized that function central controls in addition to those discussed below can be implemented as part of systems 100.

A. A Stored Value Card System

One example of a function central control 110 useful in relation to system 100 is a virtual stored value card used to access a value record. Such a card is more fully disclosed in U.S. patent application Ser. No. 09/971,303, entitled "Stored Value Cards and Method for Their Use", and filed Oct. 3, 2001, the entirety of which is incorporated herein by reference for all purposes. The application discloses the issuance of one or more physical stored value cards associated with a virtual stored value card and one or more value records. The physical stored value card can be used to withdraw value and/or make purchases via a POS device 130. For example, the physical stored value card can be used to purchase an item from a merchant, whereupon the POS device determines the function central control 110 associated with the physical card; and transmits information about the physical card, such as its identification number, to the function central control 110 that was determined to handle a value record associated with the physical card. Function central control 110 then accesses a database that identifies both the physical stored value card and the virtual stored value card associated with the accessed value record. The value balance associated with that record is then debited for the transaction amount, such that the stored value associated with the virtual stored value card is also reduced.

Figure 5A:
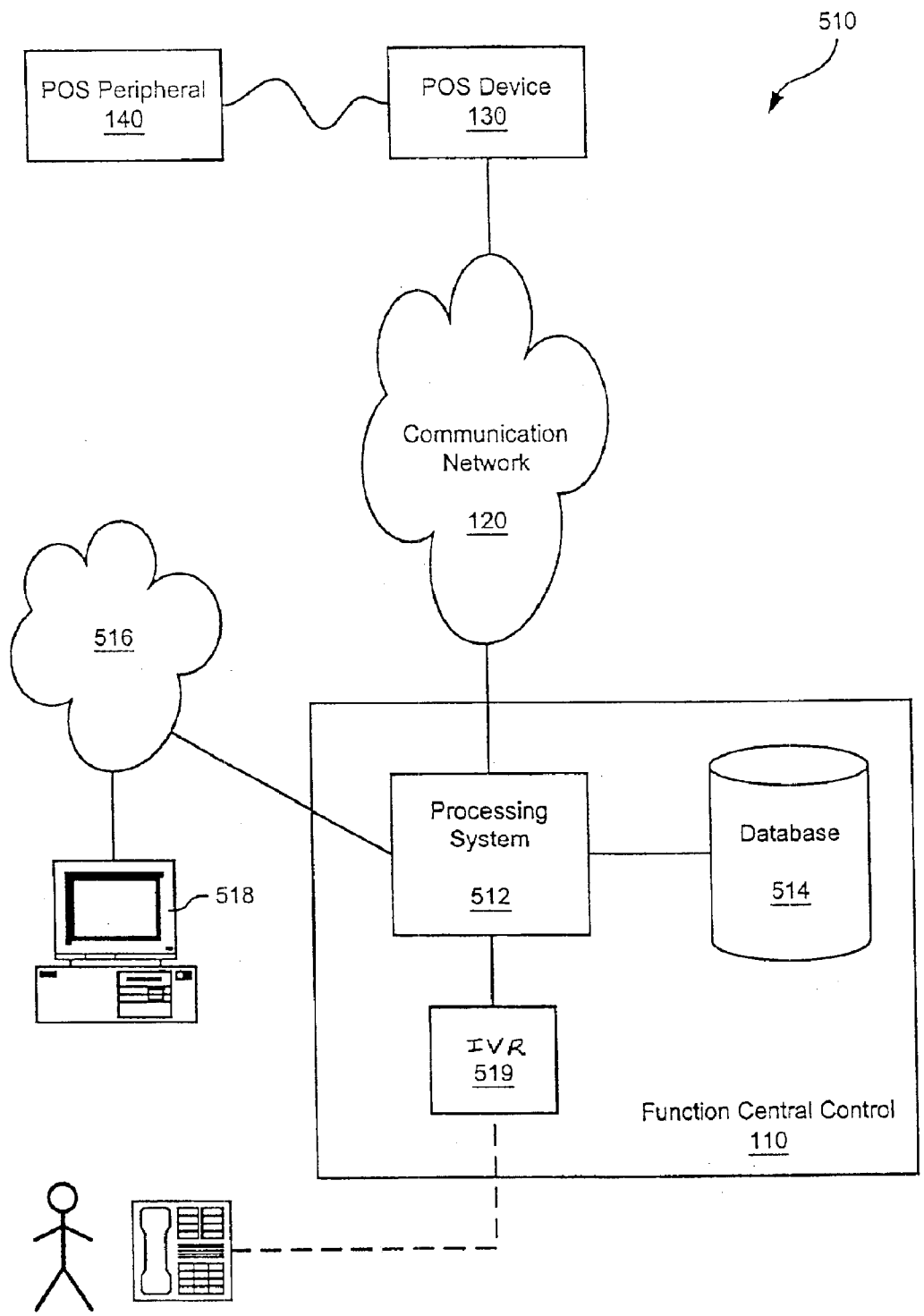
FIG. 5A illustrates a stored value card system operating as on of the function central controls of FIG. 1 and in accordance with some embodiments of the present invention.

FIG. 5A illustrates an embodiment of a function central control 110 used in relation to physical stored value cards. Referring now to FIG. 5A, one embodiment of a stored value card system 510 that may be used to issue and/or accept such cards is described. System 510 comprises a function central control 110 including a processing system 512, an associated database 514, and an Interactive Voice Response ("IVR") unit 519. Database 514 can be a relational database, such as an Oracle database, that contains records on various stored value records. This information may include, for example, types of cards (physical or virtual), identifiers, PINs, record balances, minimums and maximums, merchant information, and the like. Processing system 512 may be a Sun Microsystems workstation, and works in cooperation with database 514 to permit information to be updated, to permit cards to be issued, to permit transactions to occur, and the like.

Processing system 512 may receive information from a variety of sources. For example, processing system 512 may be accessed through the Internet 516 by any type of computer 518 as is known in the art. Additionally, processing system 512 may be accessed through communication network 120 using POS device 130. Other ways to access processing system 512 include the use of IVR 519, through a customer service representative.

Once an appropriate connection is made, a virtual and/or physical stored value card may be issued. As one example, a customer may use POS device 130 to request a stored value card issued by either the merchant maintaining POS device 130, or any other issuer for which the merchant offers stored value cards. Thus, for example, a customer may purchase a gift card from one retailer for use in purchasing goods and services provided by a third party. Information, such as payment type, requested value and the like may be gathered by POS device 130 and then transmitted to processing system 512. Other information can include name, address and phone number of the requesting customer. In some embodiments, this information can be gathered by swiping a credit card through a magnetic reader associated with POS device 130, wherein the information is automatically gleaned from the credit card. Other methods of gathering the information are also possible, for example, the information may be gleaned from a smart cart inserted into POS device 130 and the information read via electronic reader interface 264, POS device 130 may include a bar code reader attached to, for example, electronic reader interface 264, that can read a bar code from a driver's license that provides similar information, or a number of other ways of gathering information. One of ordinary skill in the art will recognize other possibilities for garnering information related to providing a stored value card in accordance with the present invention.

In addition to information provided by a requesting customer via POS peripheral 140, a merchant may enter additional information related to providing stored value card 224 via interfaces associated with POS device 130. For example, the merchant may enter an amount tendered from the requesting customer that is to be added to the value record. Additionally, the merchant may enter the number of the next available physical stored value card. The merchant can enter this information via a keypad on POS device 130 and communicating through keyboard interface 242, a magnetic reader communicating through magnetic reader interface 244, and/or a touch-screen communicating through display reader interface 248. Also, it should be recognized that, in some embodiments, either the merchant or the requesting customer can enter all information associated with providing stored value card 224 via any of the interfaces 242, 244, 246, 248, 262, 264, 266, 268, or any combination thereof. Yet further, it should be recognized that, in various embodiments, the entire process can be done without the intervention of a merchant.

The information received at POS device 130 and/or POS peripheral 140 is transferred via network interface 228 and communication network 120 to processing system 512. After processing system 512 receives the necessary information to open a stored value record, techniques such as those set forth in the aforementioned U.S. Patent Application can be used to initiate the value record.

Processing system 512 then communicates whether the value record has been successfully opened to POS device 130 via communication network 120. If the value record was successfully opened, POS device 130 activates and produces stored value card 224 (or selects an appropriate stock card) via card issuer 226. In some instances, the recipient of stored value card 224 must contact IVR 519, a customer service representative or access a web site associated with system 510, or the like to provide information before stored value card 224 is activated. This provides the ability for the recipient to send stored value card 224 to another person without exposing stored value card to potential use before it is known that the other person received the card. Further, in some embodiments, POS device 130 prints a transaction receipt via printer interface 232, or such a receipt is printed by POS peripheral 140 via printer interface 256.

In some embodiments, stored value card 224 comprises some type of media that is capable of storing an identifier, such as an identification number, in human readable form, on a magnetic-stripe, in a bar code, or the like. Also, a PIN may also be stored on card 224, in some instances in a manner that is inaccessible without tampering with any packaging or defacing the card itself. Stored value card 224 may optionally be used to make purchases online simply by providing the identifier and PIN. It may also be used in a physical store simply by swiping card 224 through a point of sale device, such as POS device 130 or POS peripheral 130.

In addition to authorizing issuance of a physical stored value card, processing system 512 "issues" a virtual stored value card and initiates an account record associated with the stored value cards on database 514. The virtual stored value card can be provided to a customer via email to an email address provided by the customer. Such virtual cards can include both a unique identifier and a PIN.

Figure 5B:
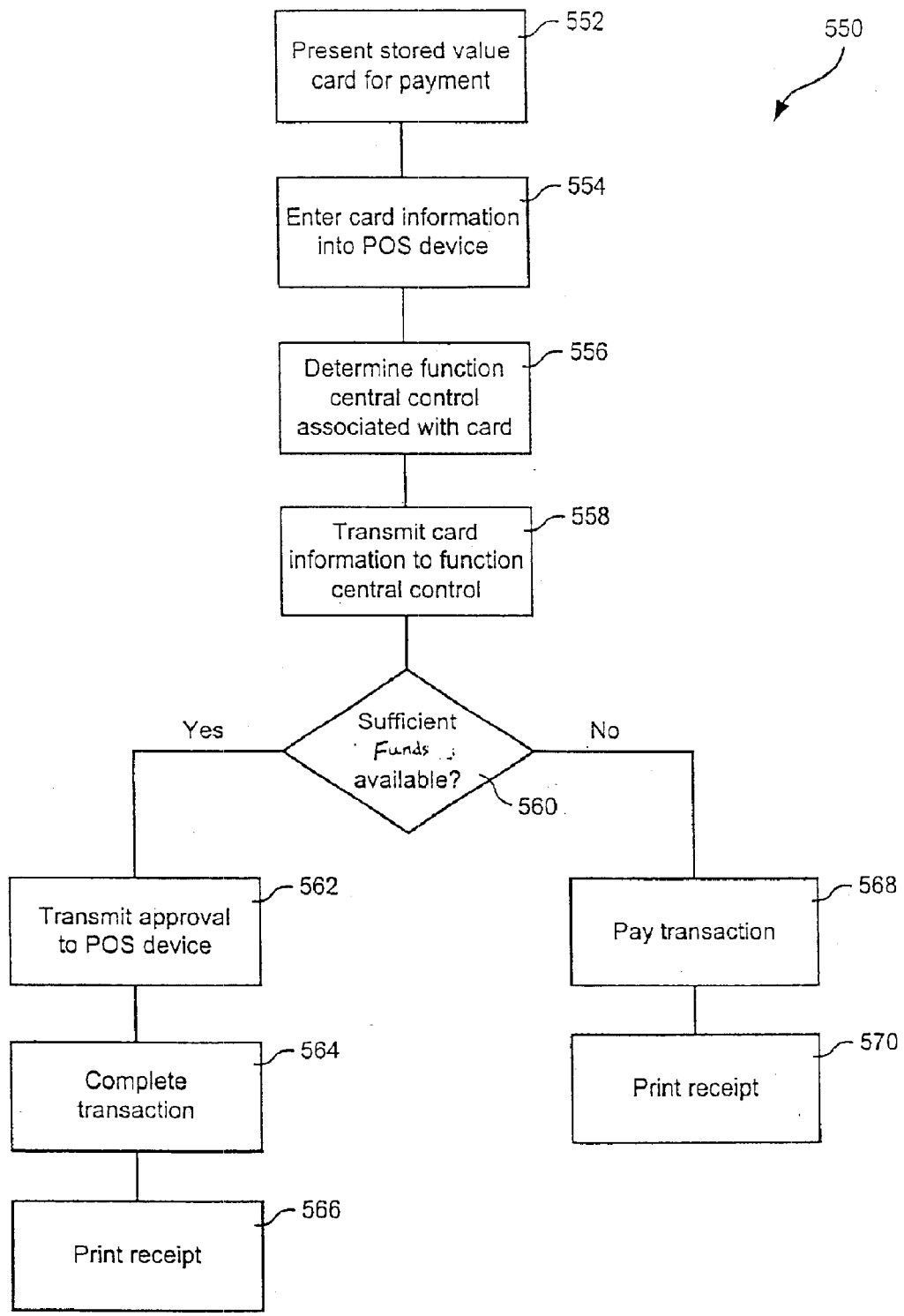
FIG. 5B is a flow diagram illustrating one method of accessing the stored value card system of FIG. 5A using a point-of-sale device in accordance with an embodiment of the present invention.

As illustrated in a flow diagram 550 of FIG. 5B, upon receiving the stored value card, a customer can either present the physical card or the virtual card to a merchant to consummate a particular transaction (block 552). Information about the card is entered into POS device 130 by, for example, swiping the physical stored value card through a magnetic card reader integrated into POS peripheral 140 (block 554). POS device 130 then determines a function central control 110 to which the card pertains (block 556). This can be done by maintaining a list of function central controls 110 which are associated with POS device 130. From the list, the most appropriate function central control 110 can be selected, or the card denied because no suitable function central control 110 exists. In some instances, multiple function central controls 110 are suitable in which case an algorithm for determining which function central control to select can be employed. Such an algorithm may be based, for example, on which function central control 110 offers the most advantageous terms to the merchant operating POS device 130.

Once the proper function central control 110 is selected, the card information is transmitted to the function central control (block 558). In turn, processing system 512 determines if sufficient funds are available in the account associated with the stored value card to complete the transaction (block 560). If sufficient funds exist, such is communicated to POS device 130 via communication network 120 (block 562), processing system 512 debits the amount of the transaction from that account associated with the stored value card (block 564) and POS device 130 prints a receipt for the transaction (block 566) as seen in FIG. 5B.

If sufficient funds do not exist to complete the transaction (block 560), processing system 512 communicates the total amount remaining to POS device 130 (block 568), which in turn can print a receipt indicating the amount via the roll printer associated with POS device 130 (block 570). In some instances, the full amount remaining on the stored value card can be credited toward the purchase, and an additional amount to cover the difference tendered from the customer in another payment form. If this approach is taken, POS device 130 communicates a request to debit the full amount from the card to processing system 512, which in turn debits the full amount from the associated account. Further, POS device 130 prints a receipt indicating the amount debited from the card and the additionally tendered amount to complete the transaction.

Thus, POS device 130 provides the ability for a merchant maintaining a POS device 130 to become a retailer of stored value cards of one or more varieties. For example, the merchant can become a retailer for pre-paid phone cards, gift cards for a variety of retailers including, but not limited to restaurants and merchandisers, pre-paid credit cards useful in situations where a customer needs a credit card, but is not credit worthy, or in situations where the customer desires to send cash to another party, but is worried about the cash being lost in the mail.

i. Phone Card Example

Figure 5C:
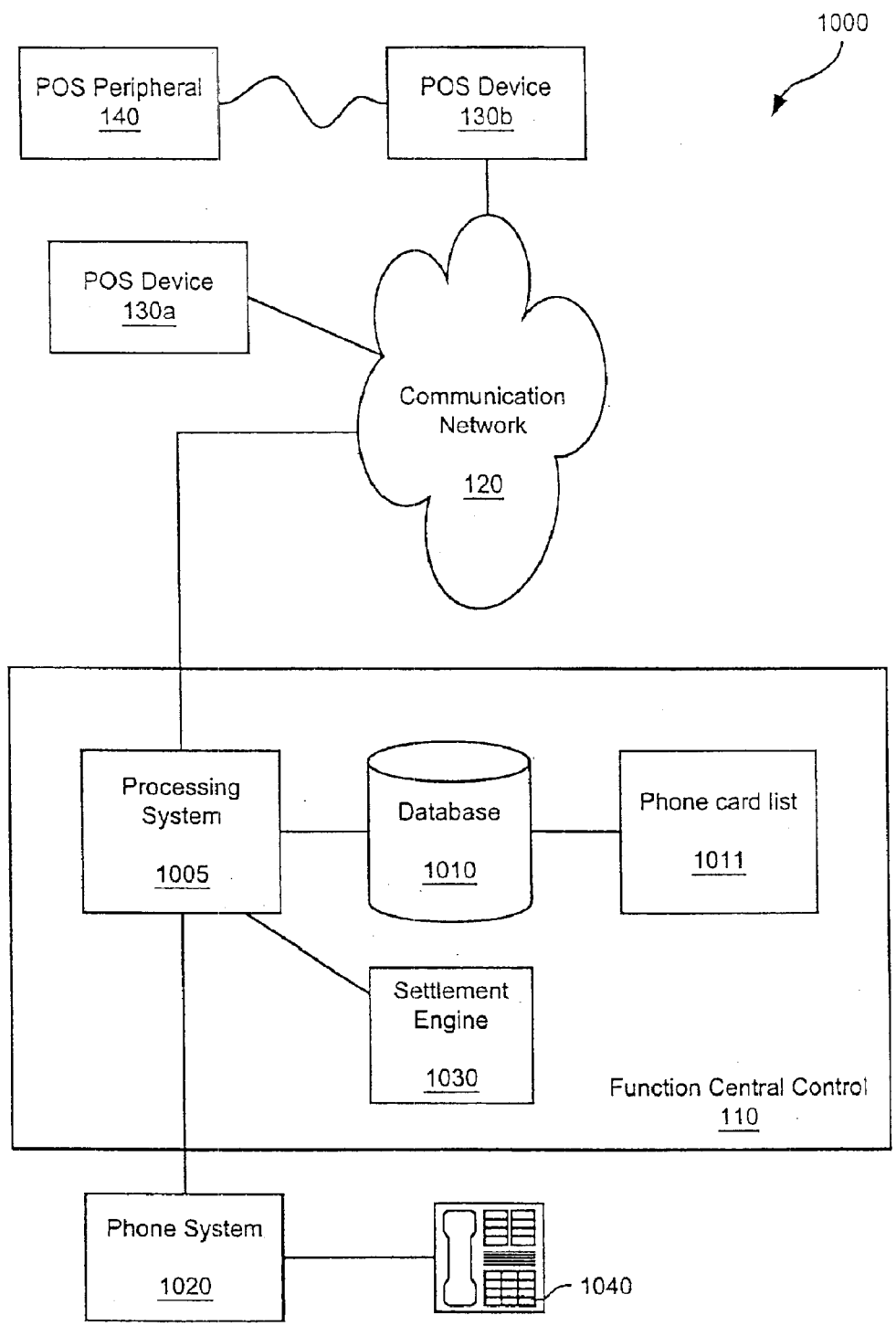
FIG. 5C illustrates a phone card system operating as on of the function central controls of FIG. 1 and in accordance with an embodiment of the present invention.

As a more particular example, an embodiment of a phone card system 1000 representing a subset of stored value card system 510 is illustrated in FIG. 5C. Phone card system 1000 includes a function central control 110 in communication with a phone system 1020. Further, function central control 110 is in communication with POS devices 130 and POS peripherals 140 via communication network 120. Phone system 1020 provides for communication between a plurality of phones 1040.

Central control function 110 includes a processing computer 1005, a settlement engine 1030, and a database 1010 maintaining a phone card list 1011. Processing computer 1005, in conjunction with settlement engine 1030 and database 1010 maintain an accounting of phone card use.

In some embodiments, access to phone card system 1000 is pre-programmed as part of POS device 130. In such embodiments, the components necessary to complete transactions associated with phone card system 1000 are enabled as part of manufacturing POS device 130. In other embodiments, the software necessary to complete transactions associated with phone card system 1000 is downloaded to POS device 130 and the necessary components are enabled by a representative of function central control 110 who visits the merchant and updates POS device 130 to access phone card system 1000. In yet other embodiments, POS device 130 is dynamically configured via communication network 120 to perform functions in relation to phone card system 1000.

Figure 5D:
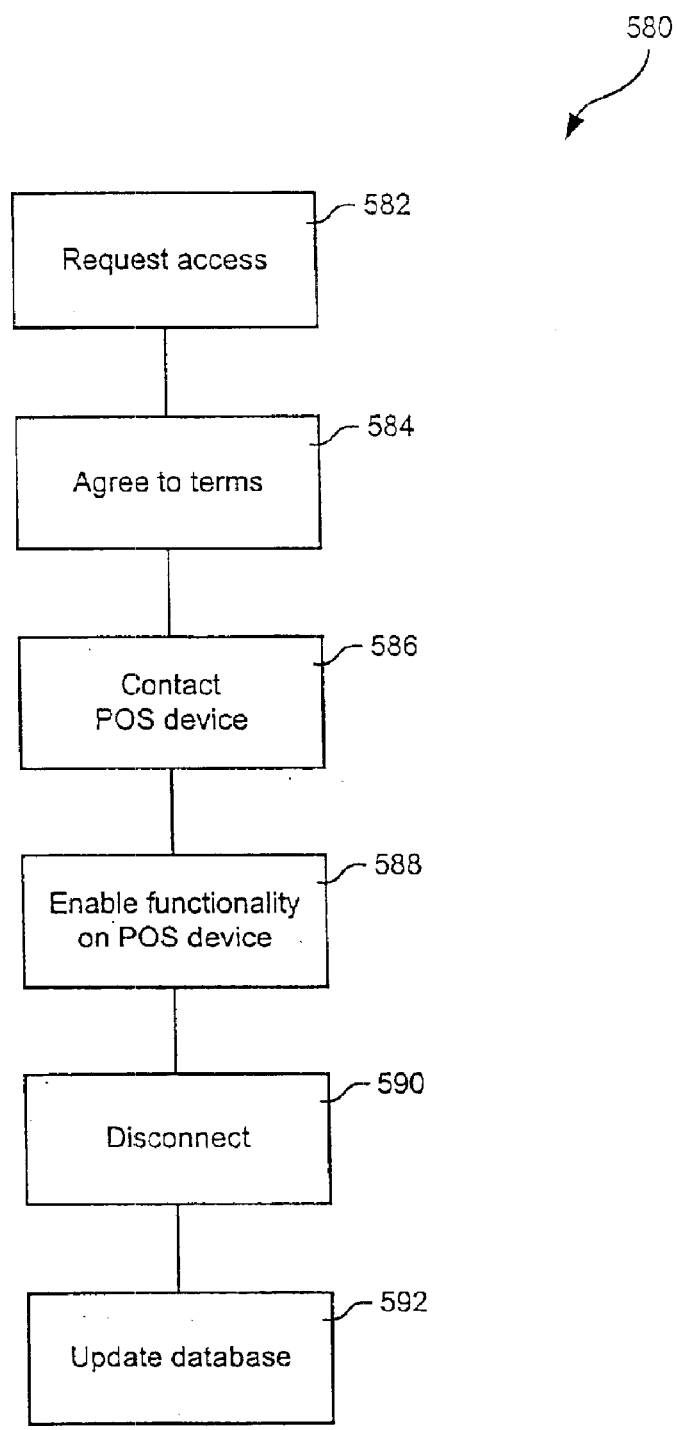
FIG. 5D is a flow diagram illustrating one method of enabling a point-of-sale device to access the phone card system of FIG. 5C in accordance with embodiments of the present invention.

Referring to FIG. 5D, a flow diagram 580 illustrating enablement of POS device 130 in accordance with embodiments of the present invention are described. Initially, a merchant associated with POS device 130 contacts a management person associated with phone card system 1000 to request use of the system (block 582). In some embodiments, this is accomplished by voice communication using telephones (not shown). In other embodiments, the request for access is accomplished using POS device 130 communicating with function central control 110 via communication network 120.

Upon requesting access (block 582), the merchant is presented with terms that govern access and use of phone card system 1000 (block 584). In some instances the terms are very simple and do not require anything of the merchant. In other instances, the terms require payment from the merchant on a one time and/or transactional basis. For example, the terms may require a merchant to share a small percentage of profits reaped through the merchants sale of stored value cards using phone card system 1000. In light of this disclosure, one of ordinary skill in the art will recognize a number of different business relationships that can be entered into before allowing the merchant to access phone card system 1000. For example, in exchange for phone cards, the merchant may be paid a one time annual fee, or a fee based on the value of phone cards sold.

After the merchant has agreed to the terms for accessing phone card system 1000, processing computer 1005 contacts POS device 130 via communication network 120 (block 586). In one particular embodiment, such contact is accomplished using a VPN already in existence between function central control 110 and POS device 130. After contact with POS device 130 is established, processing computer 1005 writes memory 114 of POS device 130, such that phone card system 1000 is identified to POS device 130 as an additionally accessible function central control (block 588). Further, processing computer 1005 indicates the components within POS device 130 and/or POS peripheral 140 that should be enabled whenever phone card system 1000 is accessed by POS device 130. Such information is used by function control matrix 116 to permit access to and from the various components of POS device 130. In some embodiments, enablement of a component by any function central control 110 causes the component to be functional regardless which function central control 110 is being accessed. In other embodiments, components are only enabled when a function central control 110 that enabled the component is being accessed.

In addition, software applications for execution on CPU 218 can be downloaded to POS device 130 from processing computer 1005. This function can also be performed at later dates when POS device 130 accesses phone card system 1000 using outdated software. In this way, phone card system 1000 can assure that POS device 130 always maintains a copy of the most recent software.

After phone card system 1000 is identified to POS device 130 and components necessary to complete transactions with phone card system 1000 are enabled (block 588), function central control 110 disconnects from POS device 130 (block 590) and updates information associated with the merchant and newly configured POS device 130 to database 1010 (block 592). Such information can be used to allow future access by POS device 130, control billing for access where the terms of access provide for billing, statistically monitor the use of POS device 130 to determine which promotional materials to be delivered via POS device from function central control 110, and the like.

With POS device 130 configured to access phone card system 1000, it need not be done again, unless for some reason access to phone card system 1000 is later discontinued. In some embodiments, where POS device is configured to allow access to a particular function central control 110, such as in this case, phone card system 1000, the access is automatic when a particular transaction is requested via POS device 130. Thus, for example, when a check is presented for cashing as discussed below, POS device 130 automatically accesses function central control 110 via communication network 120 to complete the transaction.

Figure 5E:
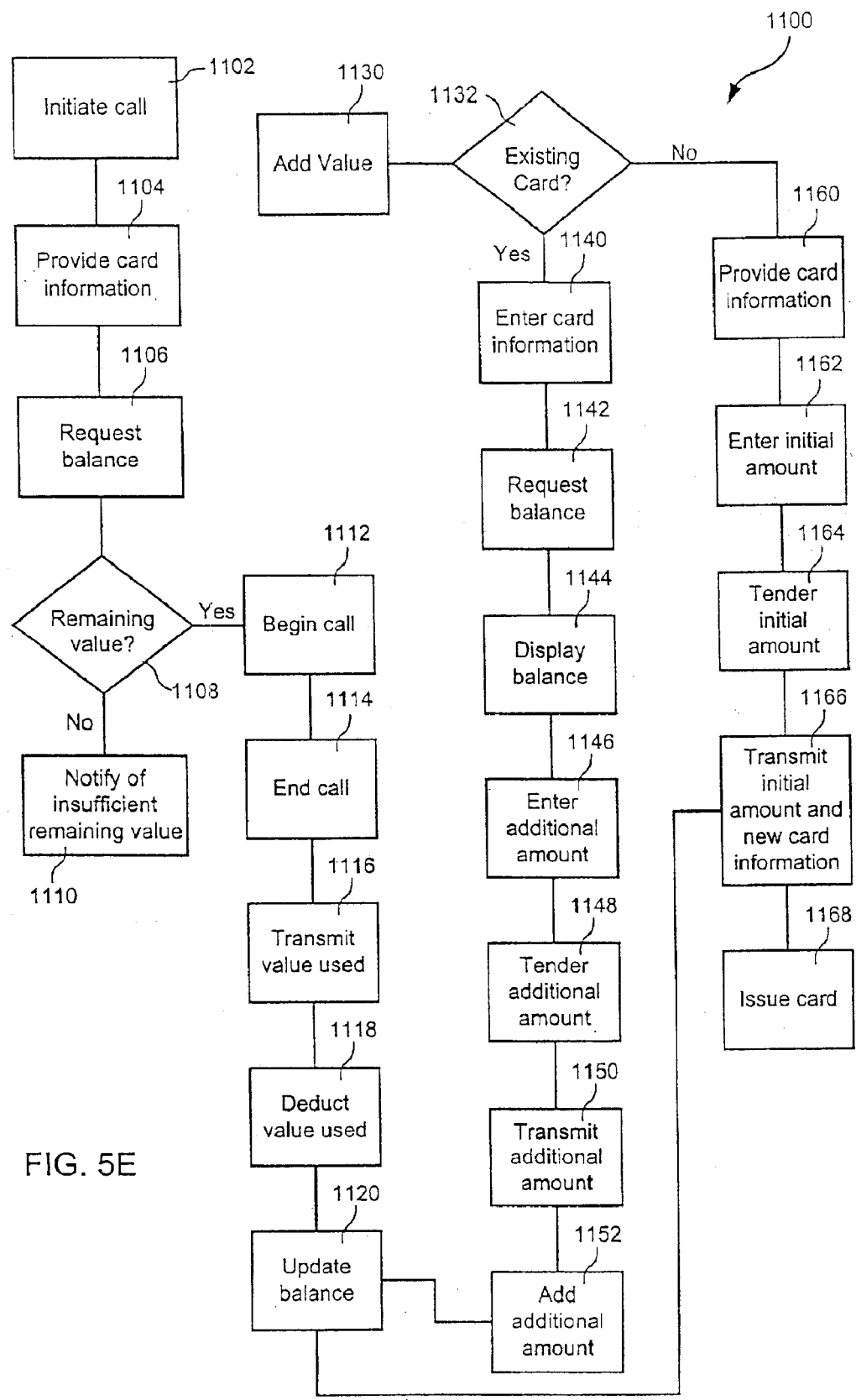
FIG. 5E is a flow diagram illustrating a method for issuing and using phone cards in accordance with the present invention.

Referring to FIG. 5E, a flow diagram 1100 illustrating an embodiment of a method for issuing and using phone cards in accordance with the present invention is described. Following flow diagram 1100, value can be added to an existing or new card (block 1130). The value can be added by tendering the amount to be added to the merchant associated with POS device 130. The merchant can then enter the value into POS device 130 via a keypad, or a touch screen integrated into POS device 130. Alternatively, the value can be tendered by swiping a credit card, a smart card, or a debit card through respective readers integrated with POS device 130. This can also be done by the customer using readers integrated with POS peripheral 140. As yet another alternative, the amount to be added can be tendered by a check that is processed in accordance with the check processing system discussed below. Yet further, the amount can be tendered via an automatic bank withdrawal in accordance with the value transfer system discussed below. Thus, one of ordinary skill will recognize that multiple function central controls 110 can be involved in processing a single transaction. Furthermore, from reading this document, it will be evident that a number of function central controls 110 can be formed together to create a transfer system, such as system 100.

After the amount is tendered (block 1130), a key on POS device 130 is depressed to indicate that the amount is to be added to an existing phone card or to a new phone card (block 1132). If the amount is to be added to an existing card, the card is swiped through a card reader associated with POS device 130 or POS peripheral 140. From this, the card information is provided to POS device 130 (block 1140). Alternatively, the number of the card can be keyed into POS device 130 via either a keypad or a touch-screen display. This card information is transferred from POS device 130 to processing computer 1005 of function central control 110 via communication network 120. In the illustrated embodiment, the card information is accompanied by a balance request (block 1142).

Processing computer 1005 matches the card information with the associated value account maintained as phone card list 1011 on database 1010. From phone card list 1011, processing computer 1005 determines the balance remaining on the card in both the number of minutes remaining and the cash value of the minutes. This balance information is transferred to POS device 130 via communication network 120, which in turn displays the information via either or both of POS device 130 and/or POS peripheral 140 (block 1144). In some embodiments, information about purchasing additional minutes including, but not limited to, costs, any discounts or special offers, and/or additional offers from the suppliers of function central control 110 can be displayed in addition to the balance information. Either the customer, via POS peripheral 140, or the merchant, via POS device 130, can then enter the amount to be added to the card in either minutes or cash value (block 1146). The amount entered can be keyed in either by a keypad or a touch-screen and can be an individually determined amount, or a pre-selected amount. Thus, for example, a customer may enter the amount of nine dollars, or the customer may respond to a special offer by a hot key on a touch-screen offering a particular number of minutes for a pre-set dollar amount.

After selecting the desired amount, the merchant tenders payment from the customer for the selected amount and indicates the tendered payment to POS device 130 (block 1148). The amount can be tendered in any number of forms including, but not limited to, cash, check, credit card, debit card, and/or smart card transaction all of which can be facilitated via POS device 130 and/or POS peripheral 140. With the amount tendered, the merchant indicates completion of the transaction to POS device 130, which in turn transfers the information about the completed transaction to processing computer 1005 via communication network 120 (block 1150).

Processing computer 1005 then adds the additional amount to the value account associated with the card (block 1152) and updates the value account on phone card list 1011 to reflect the added value (block 1120).

It should be recognized that a reversed transaction is also possible using an existing card. In such a reversed transaction, the existing card is presented via POS device 130 and value maintained on the stored value card in the form of minutes and/or cash can be accessed to either complete a purchase of an item from a merchant or for withdrawal. In such a transaction, processing computer 1005 determines the value associated with the card, and the value is displayed to the customer. The customer then determines an amount for withdrawal or to be applied to a purchase, and that amount is deducted by processing computer 1005 from the value account associated with the card. The merchant then tenders the value, or tenders an item purchased in exchange for the value in which case the merchant retains the value as payment.

From the description in this document, it should be apparent that many other value transfers relating to stored value cards can be facilitated in accordance with the present invention. For example, the stored value card could be associated with a frequent flyer account. Such an account could be accessed to add frequent flyer miles and/or to use frequent flyer miles in exchange for goods, services, or cash. One of ordinary skill in the art will recognize a great number of other applications possible in relation to the present invention.

Value can also be added to a new card, where it is determined that an existing card either does not exist or that the customer simply wants to open a new account (block 1132). In such a situation, information for identifying the stored value card and associated value account is entered via POS device 130 and/or POS peripheral 140. Such information can include, a name, address, and phone number of the customer, as well as a card number associated with a card to be issued (see block 1168). Information about the customer can be obtained from swiping a credit, debit, or smart card associated with the customer and including the customer's identification information through readers on either POS device 130 or POS peripheral 140. In addition to obtaining customer information, swiping the cards can also be used to tender any amount necessary to pay for the transaction (see block 1164). Alternatively, a driver's license or other form of identification can be read by either a magnetic-stripe reader or bar code scanner associated with POS device 130. In other embodiments, the information obtained is minimal to provide a customer with privacy. Thus, for example, in some embodiments, only the number of the dispensed card is obtained as further discussed below.

After obtaining the information to be associated with the new card, the initial amount to be added to the card is indicated via POS device 130 or POS peripheral 140 (block 1162). As before, such an amount can be selected by the customer and entered either by the customer via POS peripheral, or communicated to a merchant who then enters the amount via POS device 130. Alternatively, a predetermined amount for a particular number of minutes can be selected either via a touch-screen or keypad associated with either POS device 130 or POS peripheral 140.

Next, the amount selected is tendered from the customer to the merchant as previously described (block 1164). Then, either the merchant indicates that the amount has been tendered or, in situations where an electronic payment form is used, the customer can approve the transaction by electronic signature, depressing a particular key, and or using the various biometrics devices associated with POS device 130. With this done, POS device 130 knows the amount has been tendered.

The initial amount tendered (block 1164), information to be associated with the card (block 1160), and the card number of the newly issued card are transmitted to function central control 110 via communication network 120 (block 1166). In some embodiments, the card number is determined by a card issuer 226 that is associated with POS device 130. Such a process can include the card issuer maintaining a list of cards to be issued and providing the number of the next card to be issued. In other embodiments, the card number can be input by the merchant who obtains a new card, and either keys the card number into POS device 130 or swipes the card though a magnetic-stripe reader associated with POS device 130.

Upon transfer of the card information to function central control 110, processing computer 1005 creates a new value account associated with the new card including various information about the customer and the card number (block 1120). In addition, the new value account can be marked as active and a PIN for accessing the new value account using the card can either be mailed to the customer at a provided address, or provided immediately to the customer via POS device 130. Where the PIN is provided to the customer via POS device 130, it is transferred to POS device 130 via communication network 120, and a receipt printed and provided to the customer using a roll printer associated with POS device 130. In some embodiments, the receipt includes the amount of the transaction, and the PIN.

In addition, the new card is issued (block 1168). Such issuance can be by the merchant handing the card to the customer from a stock of cards, or by direct issuance from a card issuer 226 associated with POS device 130. Indeed, in some embodiments, such direct issuance can include writing the magnetic-stripe of the card and/or customizing the card by card issuer 226.

Using a phone card issued as previously discussed, a user can initiate and complete telephone calls. To do so, a user can call phone system 1020 using telephone 1040 (block 1102). Phone system 1020 can then query the user for the card number, PIN, and desired telephone number to contact (block 1104). Using this information, phone system 1020 can contact function central control 110 to determine a balance available on the card and authorize a transaction using the card based on the received card number and PIN (block 1106). If the value account associated with the card lacks sufficient value to complete the requested call or the PIN and card number do not match such that use of the card is not authorized (block 1108), the user is notified of the failure (block 1110).

Alternatively, if the card is authorized and sufficient value remains (block 1108), phone system 1112 proceeds to complete the desired call (block 1112). Once the call has ended (block 1114), or at incremental points during the call, the value used can be transmitted to function central control 110 (block 1116). Settlement engine 1030 then calculates the amount of value used and deducts it from the value account associated with the card (block 1118). In some embodiments, settlement engine 1030 continuously monitors the call and can issue a call termination when insufficient funds remain in the value account to continue with the call. With the call completed, processing computer 1005 updates the value account based on information from settlement engine 1030 to reflect the balance remaining after deducting the cost of the call.

It should be recognized that a great number of other uses of the present invention are possible in relation with stored value cards. Further, it should be recognized that the preceding stored value card examples are merely illustrative and that a number of modifications to the examples are possible. For example, such stored value card processes can be used in conjunction with a value transfer system, where the value transfer system effectuates payment for a purchased stored value card. Alternatively, such a value transfer system can be used to transfer value from a value account associated with a stored value card to one or more destinations. Thus, it should be recognized that while the examples of stored value cards are described in relation to a single function central control 110, it is possible to complete transactions where multiple function central controls 110 are accessed via POS device 130 and/or POS peripheral 140. Thus, for example, a customer may complete a transaction involving both a function central control 110 for a value transfer system and a function central control 110 associated with a stored value card without knowing that they are dealing with anyone other than a merchant maintaining POS device 130.

Further, it should be recognized that an additional function central control 110 associated with a fraud detection system and another function central control 110 governing control of all POS devices 130 can also be utilized in relation to the previously discussed systems. For example, a function central control 110 governing control of all POS devices 130 can communicate with other function central controls and perform the update functionality described in relation to FIG. 5D. Based on this disclosure, one of ordinary skill in the art will recognize a number of other possibilities of functions provided by the aforementioned function central controls 110 and/or additional function central controls 110.

B. A Value Transfer System

Another such function central control 110 can be a value transfer system as disclosed in U.S. patent application Ser. No. 10/040,568, entitled "Systems and Methods of Introducing and Receiving Information Across a Computer Network", and filed Jan. 4, 2002, the entirety of which is incorporated herein by reference for all purposes. Such a value transfer system provides various equipment and techniques for moving money or other types of value. The value transfer system utilizes various input and output interfaces to facilitate such transfers. In accordance with embodiments of the present invention, these input and output interfaces can be POS devices 130 and/or POS peripherals 140. POS devices 130 and peripherals 140 can be accessed by both the sender and the recipient. Access to the value transfer system can be provided using methods similar to those previously discussed in relation to FIG. 5D.

Using the value transfer system, a wide variety of payment instruments can be used to tender payment for a number of different transactions. For instance, payment may be tendered in cash to a merchant operating POS device 130, or to a cash acceptance mechanism (not shown) associated with POS device 130. Alternatively, payment can be accepted by credit card, debit card, and/or stored value cards introduced to POS device 130 via magnetic reader interface 244 or to POS peripheral 140 via magnetic reader interface 268. Yet another alternative provides for providing payment via a check read by MICR 234, or by an Automated Clearing House ("ACH") transfer from a bank account by entering account information via keyboard interface 242 or via keyboard reader interface 266. It should be recognized by one of ordinary skill in the art that other methods and mechanisms can be used in accordance with the present invention to provide payment into the value transfer system.

The provided payment can be transferred via the value transfer system to a recipient at the same or different POS device 130 from that which the payment was received. Thus, a recipient may receive the provided payment as cash from a merchant operating POS device 130, or from a cash dispenser (not shown) associated with POS device 130. Alternatively, the recipient can be paid by check issued from POS device 130 via printer interface 232, or from POS peripheral 140 via printer interface 256. Similarly, the recipient may be paid by a money order produced using either of the aforementioned printer interfaces. As a further alternative, the recipient can be paid by loading the transferred payment to a stored value card using either magnetic reader interface 244 or magnetic reader interface 268, or by issuing a new stored value card 224 via card issuer 226. One of ordinary skill in the art will recognize a variety of other methods and mechanisms for transferring the value to the recipient in accordance with the present invention.

Figure 6:
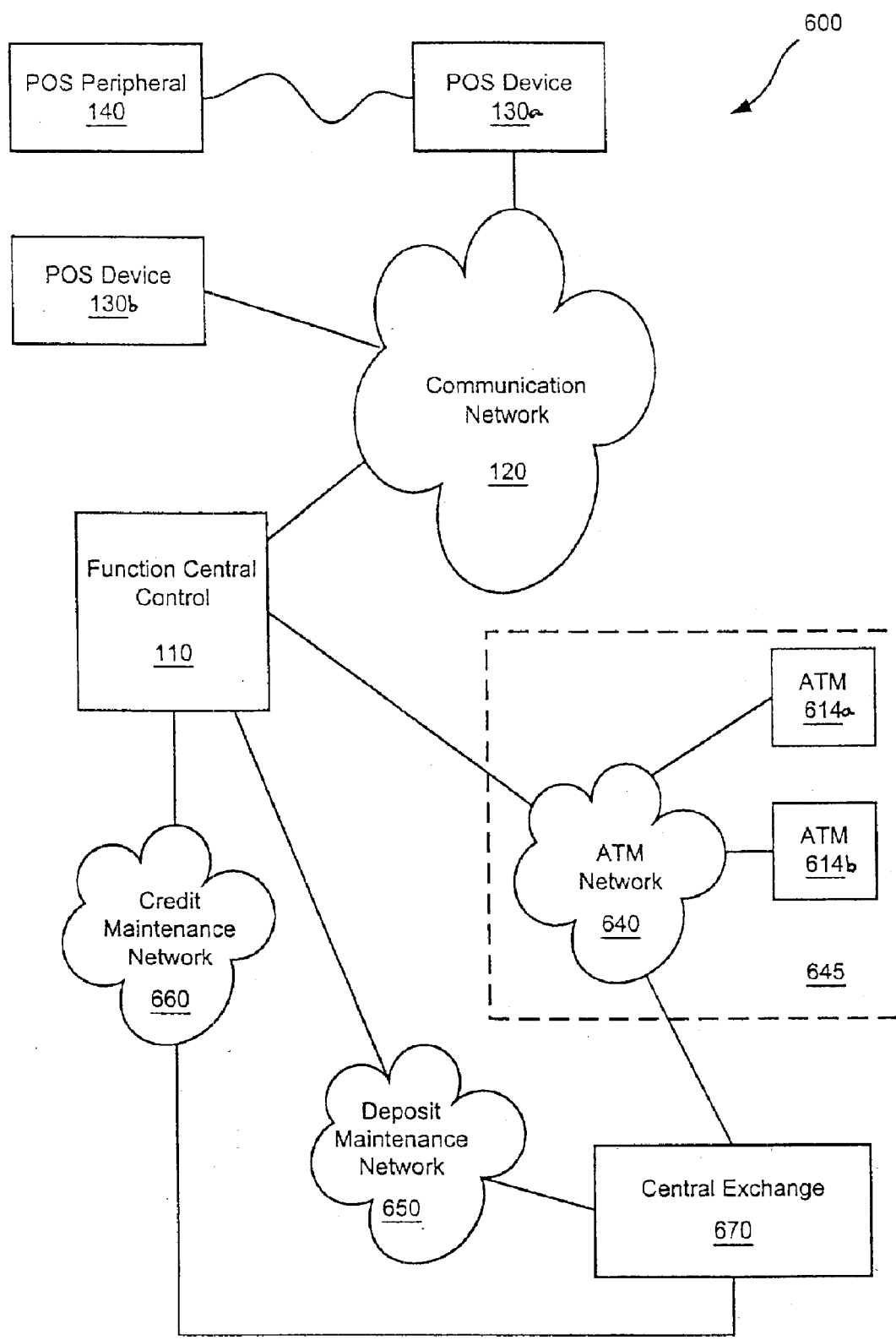
FIG. 6 illustrates an embodiment of a value transfer system used in relation to a point-of-sale device in accordance with embodiments of the present invention.

FIG. 6 illustrates an exemplary value transfer system 600. While FIG. 6 illustrates an exemplary money transfer mechanism, one of ordinary skill in the art will recognize other money transfer mechanisms to which the present invention may be applied or used in conjunction with POS device 130. Referring to FIG. 6, value transfer system 600 is comprised of a function central control 110, an automatic teller system ("ATM") system 645, a deposit maintenance network 650, a credit maintenance network 660 and a central exchange 670. Function central control 110 is communicably coupled to ATM system 645 via an ATM network 640, deposit maintenance network 650 and credit maintenance network 660. In general, function central control 110 unifies a variety of transfer systems while supporting a variety of mechanisms for introducing and receiving information to and/or from value transfer system 600.

As previously illustrated in FIG. 1, function central control 110 is communicably coupled to one or more POS devices 130 and POS peripherals 140 via communication network 120. In some embodiments, communication network 120 is a TCP/IP compliant VPN. In addition to facilitating communication between POS device 130 and function central control 110, communication network 120 can also facilitate communication between function central control 110 and a variety of input and/or output interfaces as described in the aforementioned patent application. Thus, in accordance with various embodiments of the present invention, POS device 130 can be used in relation to transferring value to or from a kiosk, an ATM, an agent, a bank account, and the like.

Using value transfer system 600, value can be transferred from any of a number of points. For example, value can be transferred from POS device 130 to itself or any other terminal or POS device 130, from any POS device 130 to a deposit account via deposit maintenance network 650 or credit maintenance network 660, and/or from any POS device 130 to any ATM 614 via ATM network 640. Many other transfers to/from ATMs 614, deposit accounts, terminals, and/or credit accounts can be accomplished using value transfer system 100.

Figure 7:
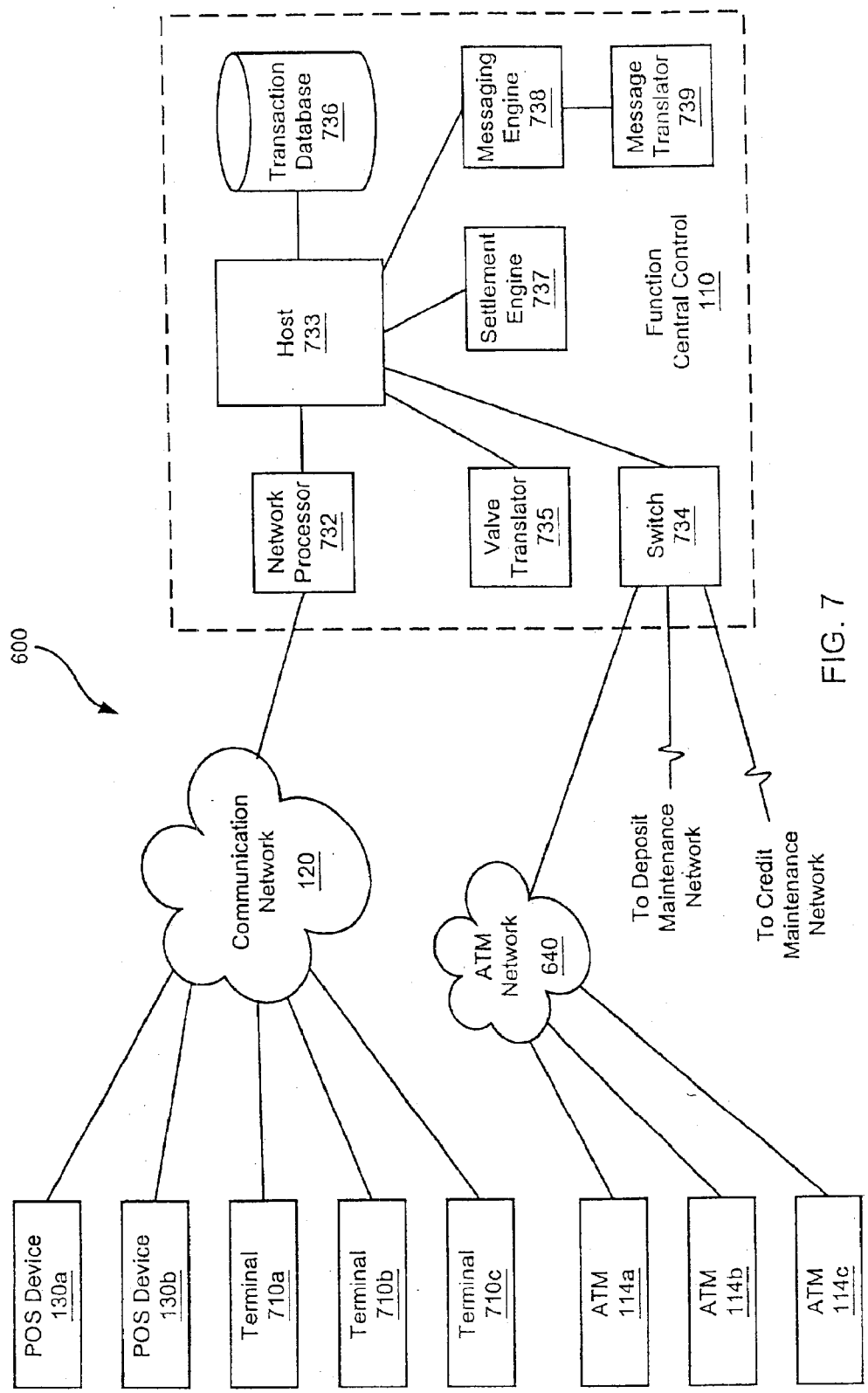
FIG. 7 illustrates a function central control, associated with the value transfer system of FIG. 6, and in accordance with an embodiment of the present invention.

Referring to FIG. 7, function central control 110 associated with value transfer system 600 is illustrated. Function central control 110 includes a network processor 732 to process data received and transmitted via communication network 120. Data to/from network processor 732 is available to a host 733 that may communicate with one or more of a value translator 735, a transaction database 736, a settlement engine 737 and a messaging engine 738 to perform functions associated with transferring value via value transfer system 600. In turn, messaging engine 738 may communicate with a message translator 739. Messages received and/or provided by function central control 110 may include information on the sender, information on the recipient, identification information associated with a terminal 710 or POS device 730, the type and amount of value transferred, a desired location to transfer the value, and the like. In some cases, a value translator 735 may be used to change the type of value. For example, value translator 735 may do a foreign currency conversion, or may transfer from one type of value to another, e.g. frequent flyer miles to United States' Dollars. All information that is processed may conveniently be stored in transaction database 736.

Settlement engine 737 may be used to facilitate the crediting and debiting of various accounts during a transfer. For example, if a sender requests that funds from a credit card account be used in the transfer, settlement engine 737 is used to contact credit maintenance network 660 to charge the card and to manage the fees involved in the transaction. Such fees may be those charged by the credit organization as well as internal fees that are a part of the money transfer transaction. Settlement engine 737 may be used in a similar manner when crediting or debiting checking accounts, stored value accounts, customer loyalty points and the like.

In some cases, the sender may also wish to send a message with the value. Such a message may be a simple greeting, business or legal terms, and the like. Messaging engine 738 is employed to convert the message to the proper format depending on the type of output device that is to be used with receiving the money. For example, the output device may be a printer that physically prints the message onto some type of media. Alternatively, the message may be temporarily displayed on a display screen, such as on a kiosk, ATM machine, point of sale device, an e-mail, a web page or the like. The sender or recipient may also indicate that the message needs to be translated to a different language. In such cases, message translator 739 may be used to translate the message into the other language. This may be accomplished by simply doing a word look up for each corresponding word in the other language. More complex language translation capabilities may also be used.

Once a value transfer is properly processed, data indicating the transfer is sent by a switch 734 to the appropriate network as shown. This may be to ATM network 640, deposit maintenance network 650 and/or credit maintenance network 660 to complete the transaction.

Thus, using POS device 130, a number of value transfers can be effectuated. For example, Electronic Bank Transfers ("EBT") can be completed to pay for merchandise, or even make a bank deposit via a POS device 130 located at a merchant's location. Based on this discussion, one of ordinary skill in the art will recognize a myriad of transaction types that can be accomplished in accordance with the present invention. For example, systems and methods as those disclosed in U.S. patent application Ser. No. 09/990, 702, entitled "Electronic Identifier Payment Systems and Methods" can be used in relation to the present invention. The aforementioned U.S. Patent Application was filed on Nov. 9, 2001 and the entirety thereof is incorporated herein by reference for all purposes. Additionally, U.S. patent application Ser. No. 10/007,701 of the same title, filed on Dec. 7, 2001, and incorporated herein by reference for all purposes can similarly be use. Further examples of the variety of transactions possible using systems and methods of the present invention are discussed in the following sections.

i. Mass Pay and Payroll Example

Using value transfer system 600 in relation to POS devices 130, a large number of services can be implemented in accordance with the present invention. For example, many businesses such as credit unions, banks and trucking companies need to transfer money to traveling employees or clients in distant locations for various reasons including, but not limited to, payroll, cash advances, balance transfers and emergency money. Such transactions can be facilitated by depositing a sum of money in a bank account and directing division of the money to one or more recipients. The intended recipients are then provided with identification information to access the funds that have been transferred to them. The intended recipients can then enter a location where a POS device 130 is located, enter the identification information via keyboard interface 242, or another suitable interface, and receive the transferred funds. The identification number indicates which function central control 110 is selected to complete the particular transaction. For example, function central control 110 may be maintained by a bank where the funds for disbursement were initially deposited. Based on the identification information, POS device 130 can automatically contact the indicated function central control 110, and complete the desired transaction.

The funds can be received in any number of ways. For example, the funds can be received by loading them (using magnetic reader interface 244 or electronic reader interface 246) to an existing stored value card already in possession of the recipient. Alternatively, a new stored value card can be issued via card issuer 226, and the recipient can use the card to make purchases via the same or other POS devices 130, or the recipient can withdrawal the funds at an ATM 114. Further, the funds can be dispersed in cash by a cash disbursement mechanism (not shown), or as a check printed by either printer interface 232 or printer interface 256.

ii. Convenience Pay

Additionally, a convenience pay system can be implemented using value transfer system 600 in relation to POS devices 130 in accordance with the present invention. Such a convenience pay system allows a customer to enter a location with a POS device 130 and effectuate bill payments to one or more creditors. To do so, the customer enters the account information associated with a particular bill. For example, the customer could enter the account information related to a utility bill, car payment, a house payment, a credit card payment, or the like. Then, the customer can enter the amount of the payment. The amount of the payment can then be tendered by a merchant operating POS device 130, or by swiping some sort of payment card, or entering payment information into POS device 130 and/or POS peripheral 140 via one or more interfaces associated therewith.

POS device 130 then contacts the function central control 110 associated with the account to be paid and indicates that the payment has been tendered. The tendered payment can be provided directly to the function central control 110 in the event of an electronic transfer, or from an account of the merchant operating POS device 130, or paid later by billing the merchant. In the event that the merchant's account is debited or the merchant is later billed, the merchant collects the payment from the customer. Thus, for example, where the customer pays in cash, the merchant collects the cash and indicates to function central control 110 that the amount has been tendered. Function central control then knows to debit the merchant for the amount and credit the customer's account. With the transaction complete, a receipt is printed via a roll printer integrated with POS device 130 indicating the payment amount, and the accounts credited and debited. In some embodiments, a receipt is printed for the customer with information relevant to the customer and another receipt is printed for the merchant with information relevant to the merchant.

In some embodiments, a customer can pay a number of bills in a single transaction. In such cases, the various accounts and payments are entered into POS device 130. The total amount of payments can be aggregated by POS device 130 including transaction fees, if any, and an amount to cover the aggregated payments tendered from the customer. In some embodiments, only a single function central control 110 is contacted to complete the payment transaction. Thus, for example, all of the payment information can be transmitted from POS device 130 to network processor 732 and host 733. Host 733 then disgregates all of the payment information, and debits and credits the proper credit accounts via deposit maintenance network 650 and/or credit maintenance network 660.

In other embodiments, a variety of function central controls 110 associated with each of the various accounts is contacted directly by POS device 130. Thus, for example, where a utility payment and a car payment are made in a single transaction, POS device 130 determines which function central control 110 is associated with the utility payment and which function central control 110 is associated with the car payment. Then, POS device 130 contacts the function central control 110 associated with the car payment to complete that transaction and subsequently, or in parallel, contacts the function central control 110 associated with the utility payment to complete that transaction. With the transaction completed, a receipt indicating the amounts credited to the various accounts is printed via a printer integral to POS device 130.

iii. Quick Collection

Similarly, a quick collection system can be implemented using value transfer system 600 in relation to POS devices 130 in accordance with the present invention. More particularly, businesses and/or financial institutions can allow debtors to make payments. The debtor can go to a location where a POS device 130 is located, enter their account information via keyboard interface 242 or keyboard reader interface 266, provide the funds either to a merchant associated with POS device 130 or directly to POS device 130. Funds can be provided directly to POS device 130 by using a cash receiving mechanism (not shown), swiping a credit card through magnetic reader interface 244 or magnetic reader interface 268, utilizing a smart card via electronic reader interface 246 or electronic reader interface 264, typing in bank account information via keyboard interface 242 or 266, typing in bank account information via display reader interface 248 or display reader interface 262, or by writing a check and providing the check MICR 234 and/or imager interface 230.

POS device 130 analyzes the payment information to identify a suitable function central control 110 to which the payment is to be directed. POS device 130 contacts the selected function central control 110, transmits the received payment information, and awaits confirmation that the payment has been accepted. Then, in some embodiments, the selected function central control transmits an acceptance of the tendered payment, along with an account balance reflecting the balance after deducting the recently tendered payment. POS device 130 can then print a receipt of the transaction indicating the received payment and/or the new account balance via printer interface 232 or printer interface 256.

Such a quick collection service can help a creditor business avoid "the check is in the mail" syndrome as, rather than waiting to see when and if the check arrives, a debtor can be directed to a location where a POS device 130 exists to make any required payment. Where such POS devices 130 are available in extensive locations, the transaction can be consummated in minimal time compared with the time it takes to receive a check in the mail.

C. An Encashment System

Another such function central control 110 provides for "encashment" of checks and/or money orders. As used herein, encashment is a process of providing payment for a negotiable instrument and avoiding multiple payouts for the same negotiable instrument. Encashment can be provided at a POS device 130 where a check is exchanged for payment. Alternatively, encashment can be provided at any number of terminals 710 capable of receiving a check and providing value in exchange.

Figure 8:
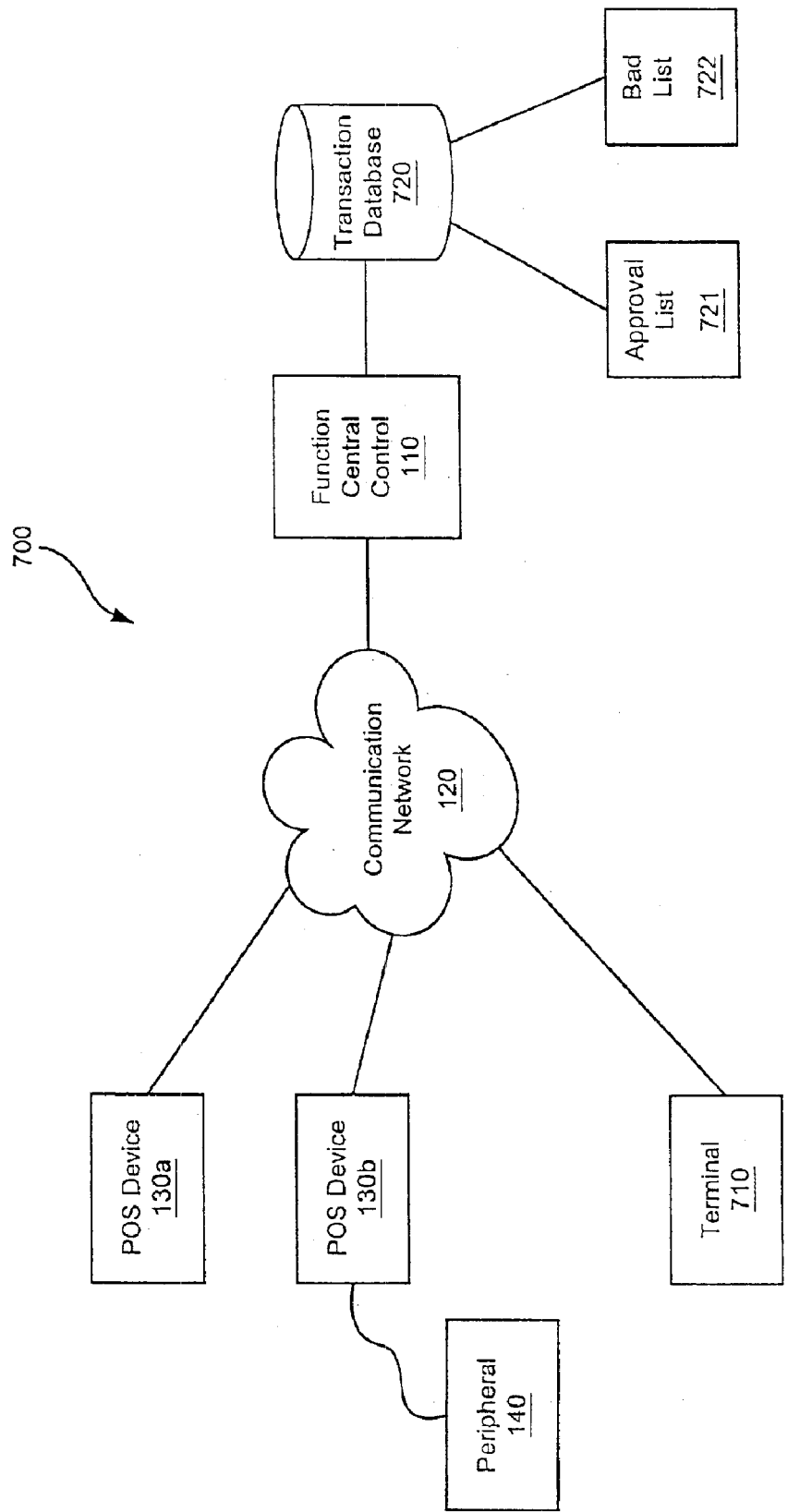
FIG. 8 illustrates an encashment system deployed in relation to point-of-sale devices and in accordance with an embodiment of the present invention.

FIG. 8 illustrates an encashment system 700 interacting with various POS devices 130, peripheral devices 140, and terminals 710 via communication network 120. In one embodiment of encashment system 700, communication network 120 is a dial-up network operating across a Plain Old Telephone System ("POTS"). Encashment system 700 includes a function control center 110 communicably coupled with a database 720. Database 720 comprises an approved check list 721 and a bad check list 722. In some embodiments, function control center 110 comprises a microprocessor based computer capable of receiving and sending communications via communication network 120, accessing database 720, and comparing information received from POS devices 130 and terminals 710 against information maintained on database 720.

Figure 9:
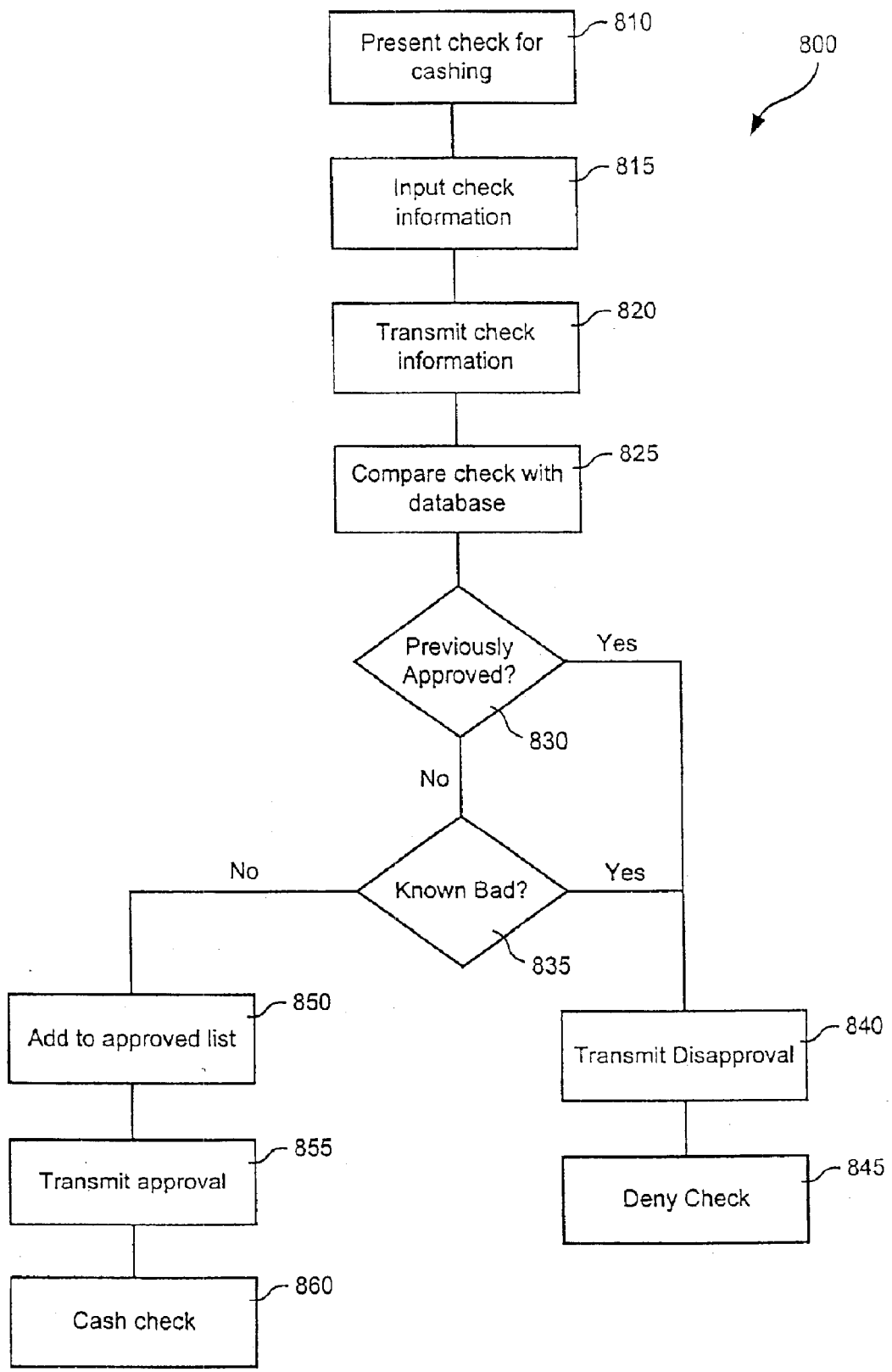
FIG. 9 illustrates a method in accordance with the present invention for utilizing the encashment system of FIG. 8 in relation to a point-of-sale device.

FIG. 9 illustrates a flow diagram 800 of one embodiment of an encashment method used in accordance with the present invention. Following flow diagram 800, a customer presents a check to a merchant for cashing (block 810). The check can be a money order, a personal check, a cashiers check, or any number of like negotiable instruments. The merchant takes the check and enters the information about the check including, but not limited to, payer, payee, and/or various associated account numbers (block 815). In some embodiments, the merchant enters this information manually via keyboard interface 242, while in other embodiments the merchant enters this information by using MICR 234 to automatically read the check. In yet other embodiments, the merchant does not even handle the check, but rather, the information about the check is entered via keyboard reader interface 266 or a MICR (not shown), both associated with peripheral device 140.

In some embodiments, communication between POS device 130 and function center control 110 is initiated in the background as the check information is entered. In some embodiments a variety of function center controls 110 are accessible to complete a transaction. For example, if a Company A money order is presented for encashment, a function central control 110 maintained and updated by Company A may be accessed. In other cases where a traveler's check from Company B is presented, a function central control maintained and updated by Company B may be accessed. In yet other alternatives, information about both Company A and Company B checks are maintained on the same function central control 110, in which case the same function central control is used when checks from either company are presented.

In particular embodiments of the present invention, POS device 130 automatically routes check information to the proper function central control 110. This can be done based on the routing numbers or other information provided on a presented check. Thus, as the check information is entered into POS device 130, POS device 130 automatically determines the associated function central control 110, and initiates communication with the selected function central control 110. If a function central control cannot be identified for the presented check, POS device 130 can present an error message via display 210 and/or display 252. In such a case, the transaction can be denied and the check returned to the customer.

The information about the check is transferred from POS device 130 to function central control 110 via communication network 120 (block 820). The received check information is compared against the contents of database 720 (block 825). The comparison first determines if the presented check has previously been approved for payment (block 830), or is known to be a bad or stolen check (block 835). Checks that have been previously approved have also been negotiated. Thus, where information about the presented check matches information on approved check list 721, encashment system 700 avoids providing payment for a previously negotiated check by transmitting a payment disapproval to POS device 130 (block 840). Upon receiving a payment disapproval, the customer and/or merchant are informed of the disapproval via display 210 and/or display 252 (block 845). In some embodiments, the customer is further provided with a hard copy of the disapproval via printer interface 232 and/or printer interface 256.

Alternatively, if the check information does not match information on approved list 721, the presented check information is compared against information on bad check list 722 (block 835). If the presented information indicates that the check is bad, a disapproval is transmitted to POS device 130 (block 840) and the transaction is denied (block 845).

Where information about the presented check does not match either information on approved check list 721 or bad check list 722, the check information is added to approved check list 721, as the check will then be approved for negotiation and the transaction consummated (block 850). An approval is transmitted from function central control 110 to POS device 130 via communication network 120 (block 855). Upon receiving the approval, it is displayed on display 210 and/or display 252 and the value associated with the check is provided to the customer (block 860). Providing such value can include having the merchant disperse the value from an available cash register or other source, or in some embodiments, providing the value directly from POS device 130 via a cash dispersal mechanism (not shown). Alternatively, the value can be dispersed as a stored value card 224 via card issuer 226, or as another negotiable instrument printed using printer interface 232 or printer interface 256.

In instances where the transaction is not completed, POS device 130 can transmit the failure to complete to function central control 110. In turn, function central control 110 can remove the incomplete check from approved check list 721 on database 720. Thus, the next time the check is presented, it will be approved.

D. A Loyalty Program System

Another such function central control 110 can be a loyalty program system as disclosed in U.S. patent application Ser. No. 10/079,927, entitled "Systems and Methods For Operating Loyalty Programs", and filed Feb. 19, 2002, the entirety of which is incorporated herein by reference for all purposes. Such a loyalty program system provides various equipment and techniques for administering loyalty programs offered by retailers and the like. Included within such loyalty program systems is the use of various input and output systems to track customer purchases and allow customer access to loyalty program value. In accordance with embodiments of the present invention, these input and output systems can be POS devices 130 and/or POS peripherals 140.

Figure 10:
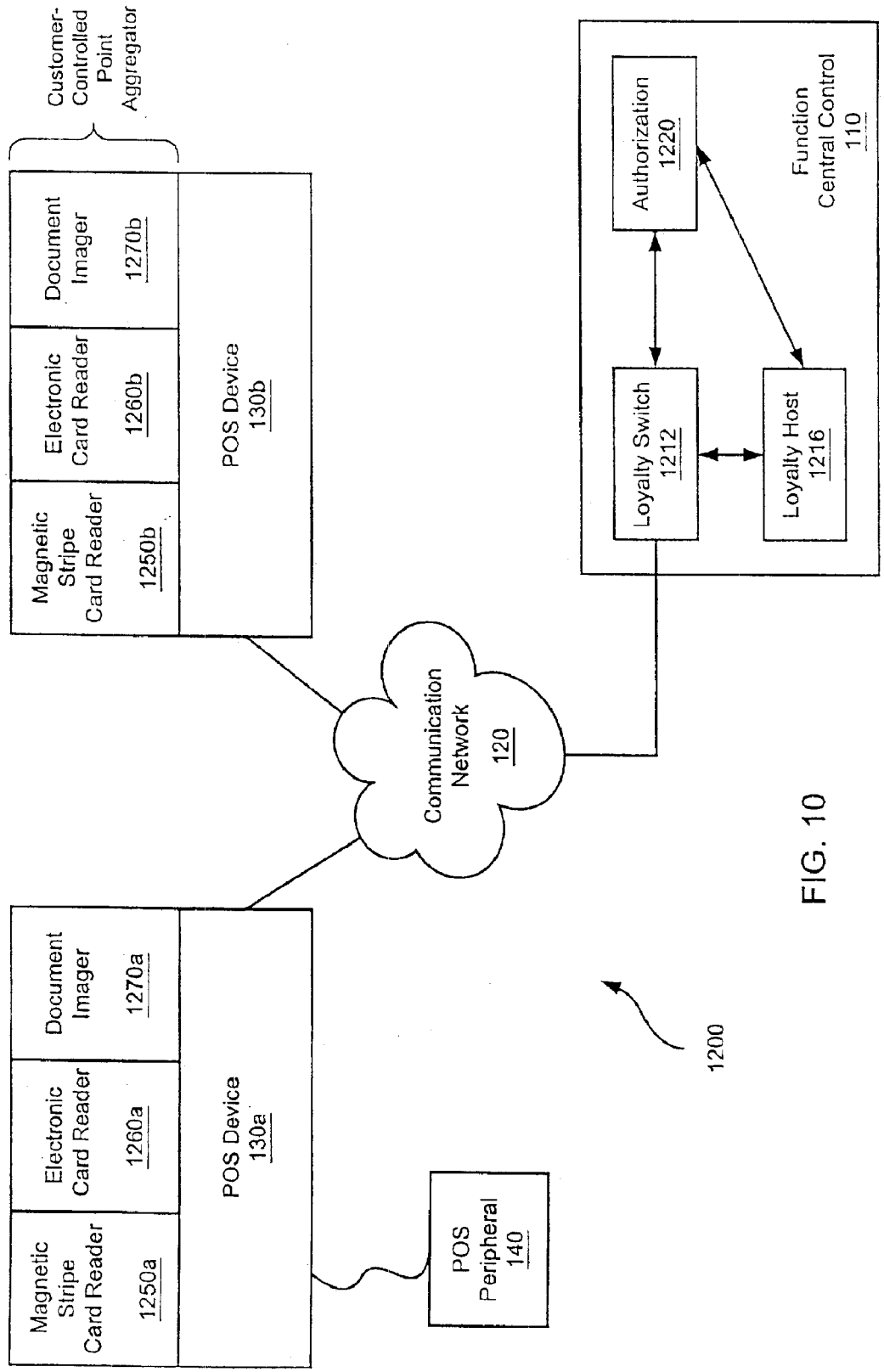
FIG. 10 illustrates a loyalty system operated in relation to a point-of-sale device in accordance with an embodiment of the present invention.

FIG. 10 provides a schematic overview 1200 of how a loyalty system structured as a function central control 110 can be integrated for operation in relation to one or more POS devices 130 and/or POS peripherals 140 in accordance with various embodiments of the present invention. In the illustrated embodiment, each of a plurality of POS devices 130 are communicably coupled to function central control 110 via communication network 120. Function central control 110 includes a loyalty switch 1212, an authorization 1220, and a loyalty host 1216.

The various POS devices 130 and POS peripherals 140 may be widely distributed geographically and associated with a variety of different merchants and/or organizations, including different retail outlets, service outlets, and the like. Each POS device 130 may be configured to accept one or more different types of payment options including, but not limited to, a credit or debit card readable by a magnetic-stripe reader 1250 integrated with POS device 130, a smart card readable by electronic card reader 1260 integrated with POS device 130, and a document imager 1270 similarly integrated with POS device 130. Customers may individually control POS device 130 via a merchant operating the device, or directly via POS peripheral 140.

When a transaction is executed using POS device 130, an electronic packet identifying the terms of the transaction and including an identification of the payment instrument is forwarded to loyalty switch 1212 of function central control 110, which makes a determination whether the merchant and customer who are parties to the transaction are registered within the loyalty system. Such a comparison is performed by comparing the identification of the parties included within the electronic packet with a database listing of registered participants. If either party is not registered, loyalty switch 1212 forwards the electronic packet to an appropriate authorization authority 1220.

As more fully described in the aforementioned U.S. Patent Application, the authorization authority will generally comprise an issuer and/or an issuer organization. Such an issuer can be a party that issues identifications associated with a particular loyalty program. Thus, for example, an airline may be an issuer related to a frequent flyer program. Similarly, an issuer organization can be a group of parties that issue identifications for a common loyalty program. Thus, for example, a credit card company offering frequent flyer miles may be part of an issuer organization that includes an airline that also offers frequent flyer miles, and in addition honors such frequent flyer miles. Such issuers can provide instruments, such as, for example, a magnetic-stripe card to identify individual customers and their participation within the loyalty system 1200.

Upon receiving the electronic packet from loyalty switch 1212, Authorizing authority 1220 determines whether to authorize the transaction in accordance with its own standards and communicates its decision via loyalty switch 1212 to the originating POS device 130. If authorization authority 1220 indicates that the parties to the transaction are registered participants in the loyalty program, loyalty switch 1212 further forwards the electronic packet a loyalty host 1216. Loyalty host 1216 will generally be comprised of an aggregator as more fully discussed in the aforementioned U.S. Patent Application. In short, an aggregator acts as an intermediary between an issuer association and a plurality of merchants. The aggregator can also act as a direct intermediary between an issuer and merchants, in which case it functions in a manner similar to the aforementioned issuer association.

Loyalty host 1216 stores administration criteria for the loyalty programs, which together may form part of a more comprehensive loyalty system. These administration criteria may be applied in accordance with a variety of different schemes for such a loyalty system, some of which are described below. Various advantages, including increased flexibility of administration, result from the remote character of Loyalty host 1216 and in some embodiments permit greater integration of loyalty programs within the loyalty system.

Loyalty switch 1212 may be configured also to forward the electronic packet to the authorization authority 1220 to approve the transaction, although in some embodiments that function will be performed directly by loyalty host 1216 to ensure that loyalty credit is given only if the transaction is properly authorized and satisfactorily executed.

Figure 11:
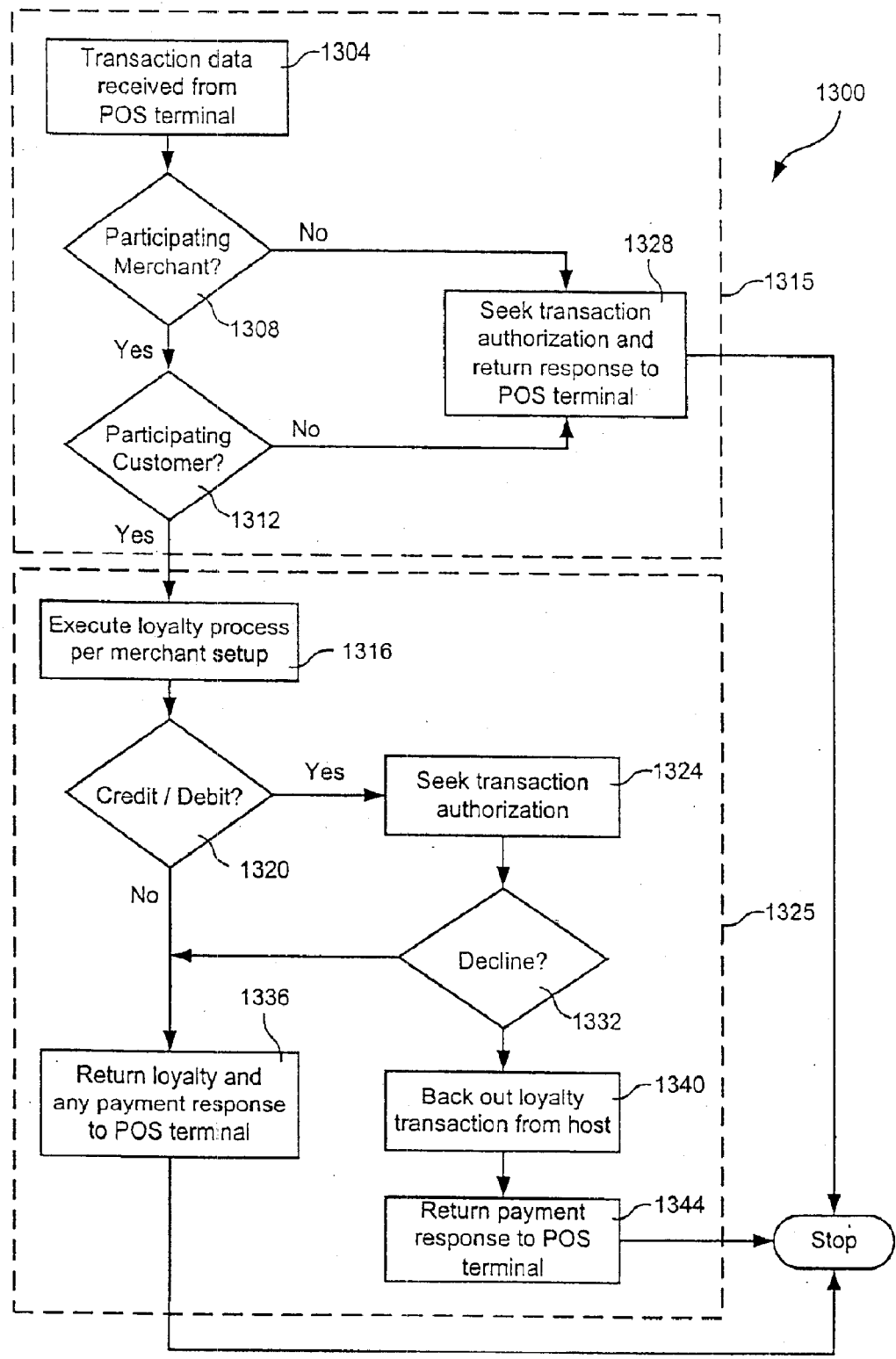
FIG. 11 is a flow diagram of the loyalty system of FIG. 10.

The coordinated operation of loyalty switch 1212, loyalty host 1216, and authorization authority 1220 with respect to a transaction is illustrated with a flow diagram 1300 of FIG. 11 for one embodiment. Those functions performed by loyalty switch 1212 are denoted generally by block 1315 and those functions performed by loyalty host 1216 are denoted generally by block 1325. At block 1304, transaction data are received from POS device 130 via communication network 120 as an electronic packet by loyalty switch 1212. Loyalty switch 1212 compares the identity of the merchant at block 1308 and the identity of the customer at block 1312 with a database identifying all participating merchants and customers. If either the customer or the merchant is not a participant in the loyalty program, authority for the transaction is sought at block 1328. The response is communicated back to POS device 130 where the transaction is executed or declined in accordance with the authorization response.

If both the customer and merchant participate in any loyalty program operated by loyalty system 1200, the appropriate loyalty process is executed at block 1316 in accordance with the arrangements for that particular merchant and/or that particular customer. Such execution may include making a decision to provide a reward to the customer immediately at the point of sale, and in some instances by printing a receipt of the reward via a printer (not shown) integrated with POS device 130. A determination is made at block 1320 whether the transaction requires authorization from authorization authority 1220. Examples of transaction types that require authorization include credit and debit transactions; examples of transaction types that do not require authorization include use of a stored-value card or coupon, and payment by cash with presentment of a dedicated loyalty card. If necessary, authorization for the transaction is sought at block 1324 and an evaluation of the response is made at 1332. If the transaction is declined, the loyalty transaction is backed out at block 1340 and the payment response is returned to the POS device 130 at block 1344.

In this arrangement, execution of the loyalty process is generally initiated before authorization for the transaction is received. This is preferred primarily for reasons of efficiency so that the transaction authorization may be sought at the same time as the loyalty process is being executed. It is expected that a large majority of transactions will be authorized so that the need to back out of the loyalty transaction will be exceptional. In an alternative embodiment, authorization may be sought before initiating the loyalty process. This has the advantage of avoiding the need to back out of a transaction at block 1340, but is expected to be less efficient overall.

At block 1336, whether reached through the flow diagram because no authorization is needed for the transaction or because the transaction was authorized, a response is returned to POS device 130. This response includes the loyalty characteristics, such as a change in points or the availability of an award, as well as an indication that the transaction has been authorized.

Figure 12A:
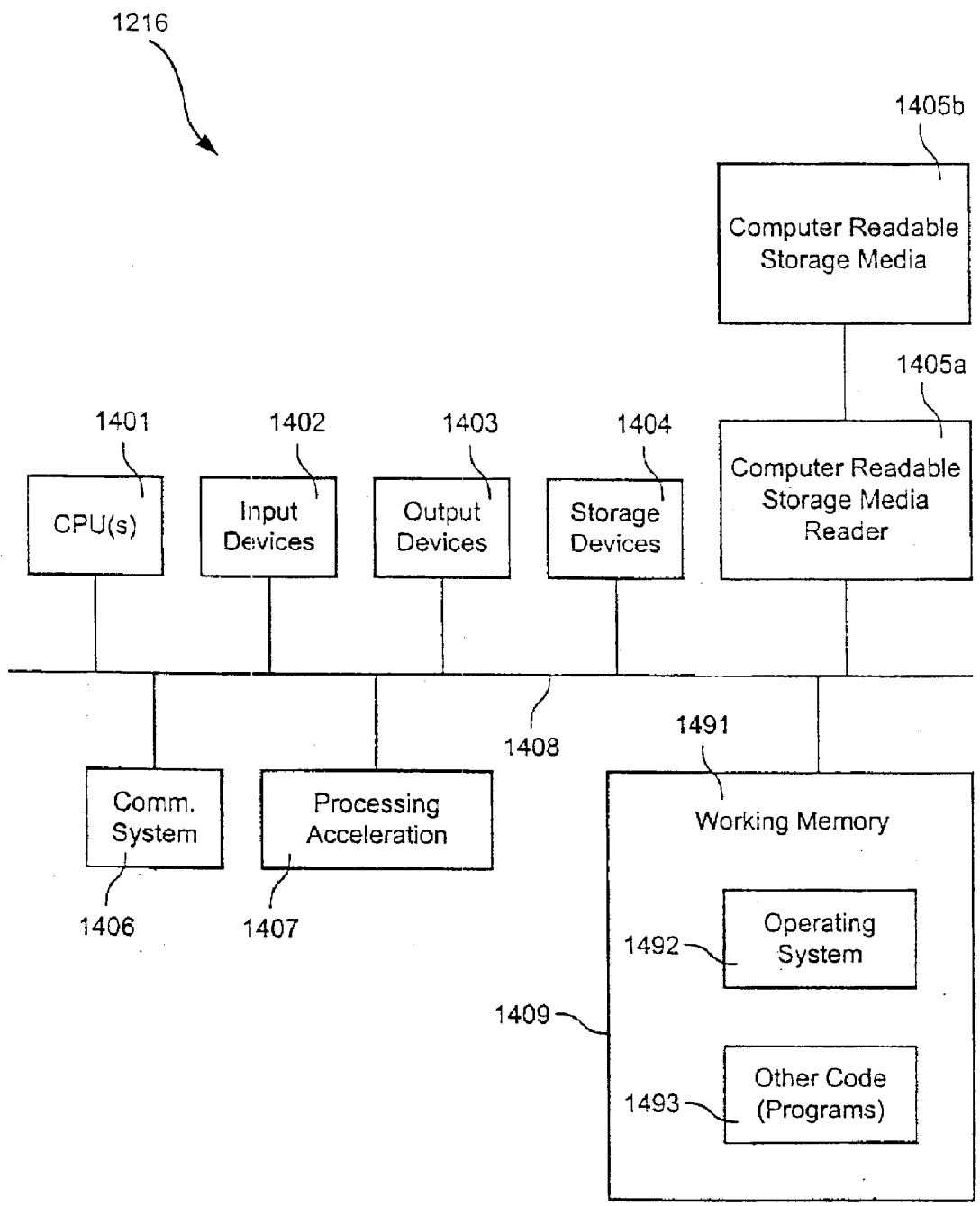
FIG. 12A is a block diagram of a loyalty host as illustrated in FIG. 10.

Loyalty host 1216 may be configured in a variety of different ways to effect the functions described with respect to FIGS. 12 and 13. In one embodiment, a computer system is used, one example of which is shown schematically in FIG. 12A. This figure broadly illustrates how individual system elements for loyalty host 1216 may be implemented in a separated or more integrated manner. Loyalty host 1216 is shown comprised of hardware elements that are electrically coupled via a bus 1408, including a processor 1401, one or more input devices 1402, one or more output devices 1403, one or more storage devices 1404, a computer-readable storage media reader 1405a, a communications system 1406, a processing acceleration unit 1407 such as a DSP or special-purpose processor, and a memory 1409. The computer-readable storage media reader 1405a is further connected to a computer-readable storage medium 1405b, the combination comprehensively representing remote, local, fixed, and/or removable storage devices plus storage media for temporarily and/or more permanently containing computer-readable information.

The database information regarding merchants, issuers, and/or individual customers is generally stored on storage devices 1404. The database information stored on storage devices 1404 is sometimes referred to herein as defining a "central database," although there is no requirement that such a central database be stored on any single storage device. For example, the central database may comprise a distributed database by being stored across multiple storage devices 1404. A central database excludes, however, the storage of database information only on instruments local with individual customers and/or merchants. For example, in embodiments where transactions are initiated with chip cards that identify the customers that hold them, the use of a central database permits customer records to be stored remotely from the individual smart cards.

The communications system 406 is configured to effect communications as needed with merchants and issuers. It thus receives the electronic packet from POS device 130 and transmits any loyalty or payment authorizations as needed back to POS device 130. In addition to providing such infrastructure communications links internal to the system, the communications system 406 may also provide a connection to other networks such as the internet and may comprise a wired, wireless, modem, and/or other type of interfacing connection. Such additional connections may be useful for support functions that may be assisted by loyalty host 1216 described below and provided for merchants, issuers, and customers.

The loyalty host 1216 also comprises software elements, shown as being currently located within working memory 1491, including an operating system 1492 and other code 1493, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 12B:
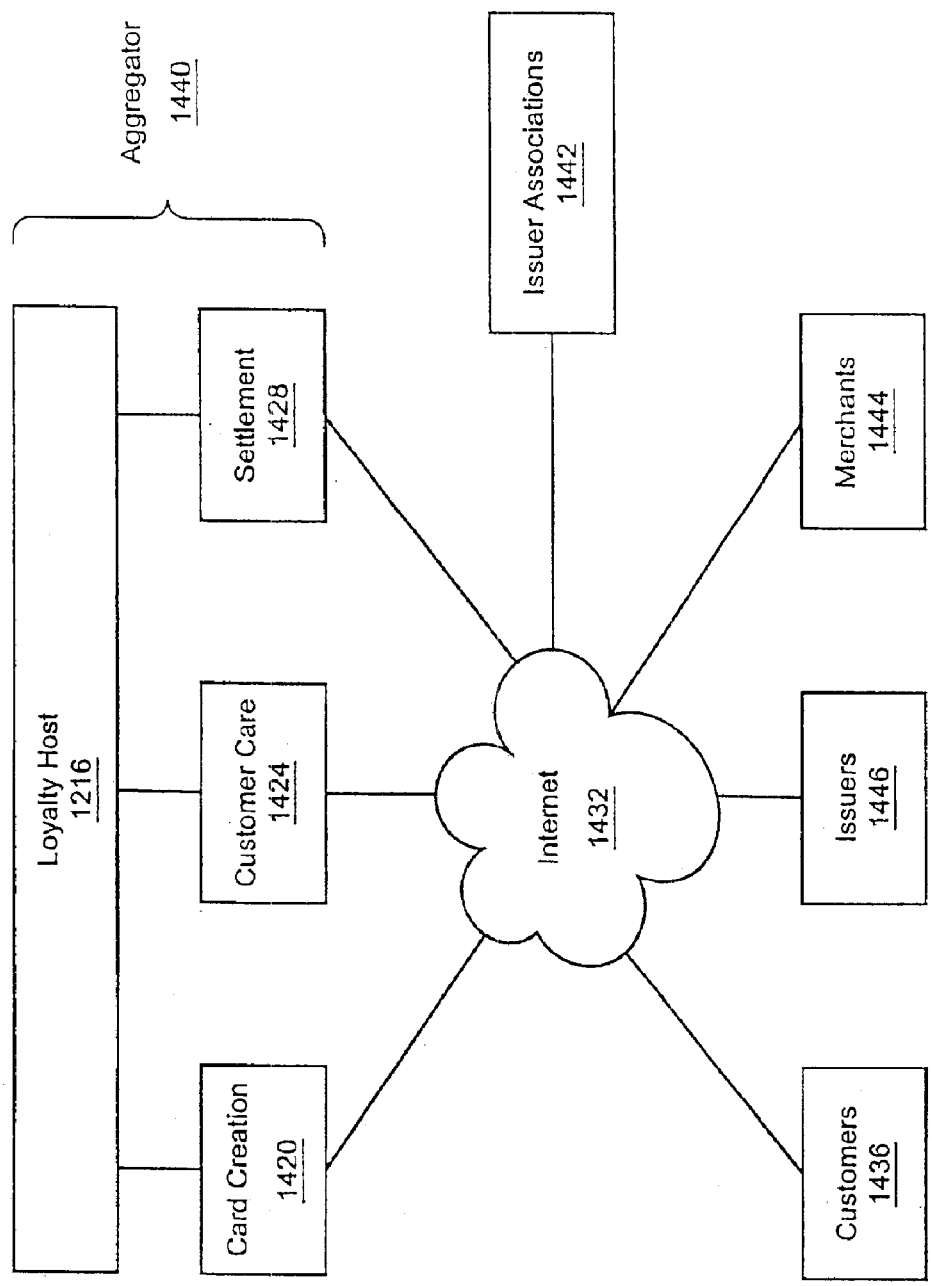
FIG. 12B is a functional diagram of the loyalty system of FIG. 10.

FIG. 12B provides a schematic illustration of one embodiment in which loyalty host 1216 is connected with the internet 1432 to provide support services to merchants 1444, issuers 1446, issuer associations 1442, and/or customers 1436. In addition to managing transactions eligible for loyalty credit, loyalty host 1216 may be configured to assist in supplementary service functions able to exploit the fact that loyalty host 1216 is equipped to maintain database information for the participating merchants 1444, issuers 1446, issuer associations 1442, and/or customers 1436. Accommodation of such support services over an internet connection is in addition to the use of infrastructure connections described with respect to FIG. 3 and intended for services that are not as time critical as the loyalty process and authorization decisions needed at the time of a transaction.

FIG. 12B shows three examples of support services that may be configured in this way, although it will be appreciated that additional support services may be similarly provided. Specific elements of aggregator 1440 are configured in communication with loyalty host 1216, examples of which include a card creation element 1420, a customer care element 1424, and a settlement element 1428. Such elements may be provided as functions comprised by loyalty host 1216 or may be provided as functions operating separately but with access to loyalty host 1216. Each of the support service elements includes a communication with the internet 1432 so that their functions may be accessed as necessary or desirable by merchants 1444, issuers 1446, issuer aggregators 1442, and/or customers 1436.

The systems described above are suitable for accommodating a large variety of different types of loyalty programs. Such loyalty systems are more fully described in the aforementioned U.S. patent application and include loyalty programs that are specific to an individual store or organization or other programs that span across multiple otherwise unrelated organizations as part of a more comprehensive loyalty system.

Figure 13A:
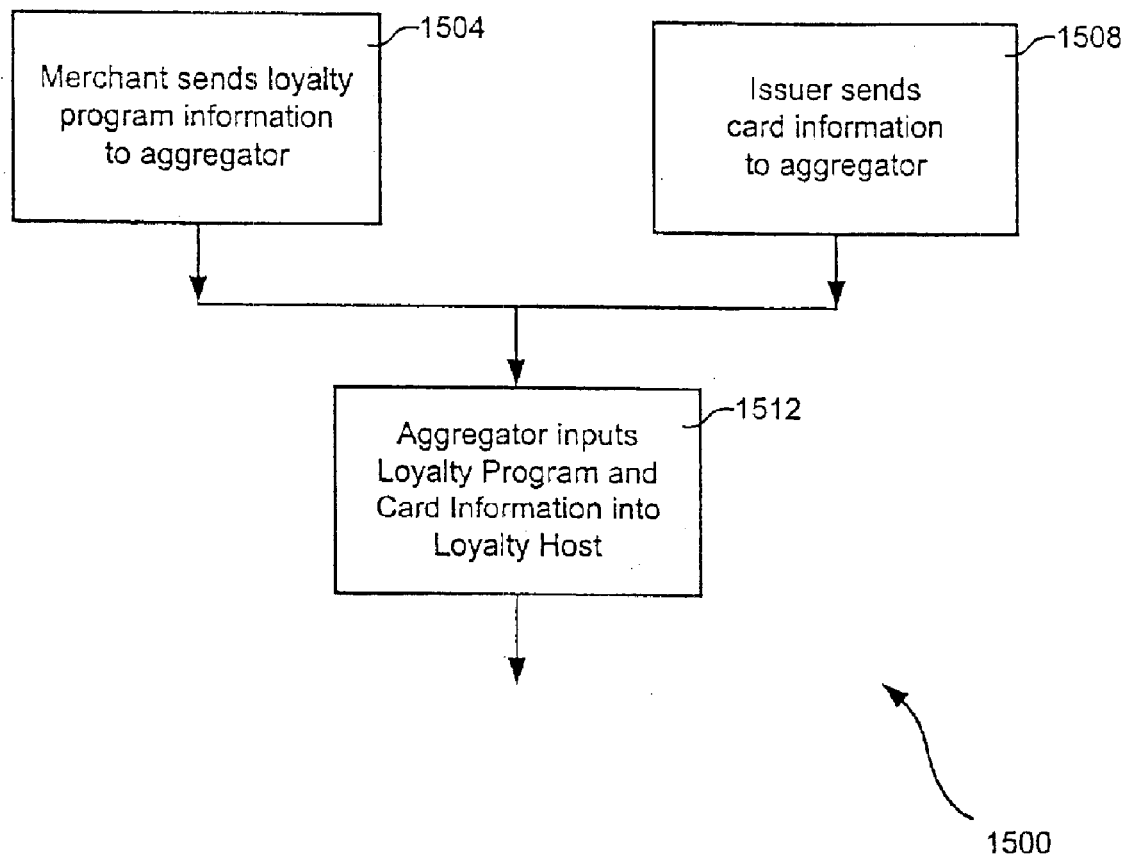
FIGS. 13A–13D are flow diagrams of methods used in relation to the loyalty system of FIG. 10.

FIGS. 13A–13D provide illustrative examples of support functions that may be performed by loyalty host 1216. For example, FIG. 13A is a flow diagram 1500 illustrating card-creation functions that may be aided by interaction with loyalty host 1216. At block 1504, one or more merchants 1444 who wish to provide a loyalty program such as those described above to its customers transmits information describing the loyalty program to aggregator 1440. Such a loyalty program may be specific to a given store, may apply more broadly to all stores for a given organization, or may even span across multiple merchants and organizations. At block 1508, issuer 1446 transmits card information to aggregator 1440. Such information will generally be sufficient to identify a customer 1436 who participates in the loyalty program from whatever instrument has been designated to act as point aggregator for the program. In some embodiments, the information includes a password issued to the customer 1436 for use by the customer in accessing other support functions described below. At block 1512, the information received from both the merchant(s) 1444 and issuer 1446 is stored on storage device(s) 1404 of loyalty host 1216. This permits later accessing of the information in administering the loyalty program.

Figure 13B:
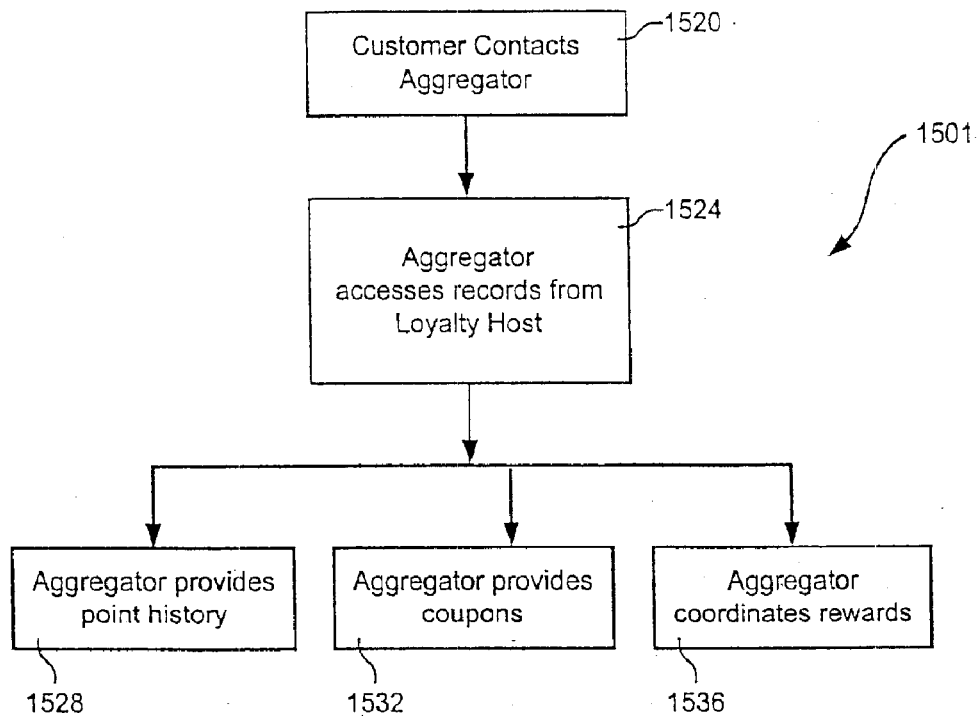

FIG. 13B is a flow diagram 1501 illustrating certain customer-care functions that may be aided by interaction with loyalty host 1216. At block 1520, a customer 1436 contacts aggregator 1440. This may occur in a variety of fashions as determined by customer 1436, including through the internet, by telephone, by fax, or by mail. Internet contact will usually be accompanied by a greeting interface in which customer 1436 identifies himself by supplying his password. Upon providing suitable identification verification, a menu is displayed to permit the customer 1436 to select desired customer-care functions. Similarly, telephone contact will generally use an automated menu system in which the customer 1436 will be asked to supply his password to verify his identity and to select desired functions, although an option will generally be available to speak directly with a customer service representative. Mail and fax communications will typically be handled by customer service representatives, and will usually not supply as fast a response as internet or telephone communications.

At block 1524, aggregator 1440 accesses records from storage device(s) 1404 of loyalty host 1216 as necessary to respond to a request from customer 1436. Three examples of the types of request are shown in the figure, although many other types of customer care services may also be provided with the information stored by loyalty host 1216. For example, at block 1528, aggregator 1440 may access storage device(s) 1404 to provide an activity summary for the customer 1436, including such information as total number and type of loyalty points, when those points were acquired, and the number needed to reach certain target levels for awards.

At block 1532, aggregator 1440 may access the storage device(s) 1404 to provide rewards for a customer 1436 who has accumulated the requisite number of loyalty points. Such activity comprises verifying the number and type of accumulated loyalty points for a particular customer and performing a comparison with the requirements of the loyalty program. In one embodiment, one or more coupons, such as electronic coupons over the internet, may be provided to the customer 1436 as the reward.

The activity denoted at block 1536 is similar, but the reward is coordinated by the aggregator 1440 instead of being provided in the form of a coupon. For example, with a loyalty program that permits the customer to redeem points for rewards with different types of merchants, aggregator 1440 may record a reward selection for that merchant and arrange for it to be automatically redeemed when the customer next visits the merchant. More specifically, suppose a loyalty program permits, and a customer chooses, to redeem points for ten percent off any purchase at Store X. Aggregator 1440 accepts the selection of customer 1436 to choose such a reward and records that choice in storage device(s) 1404. The next time the customer visits Store X, the record of his reward selection is applied by loyalty host 1216 at block 1336 of FIG. 11 so that ten percent is automatically deducted by POS device 130 upon presentation of his identification instrument.

Figure 13C:
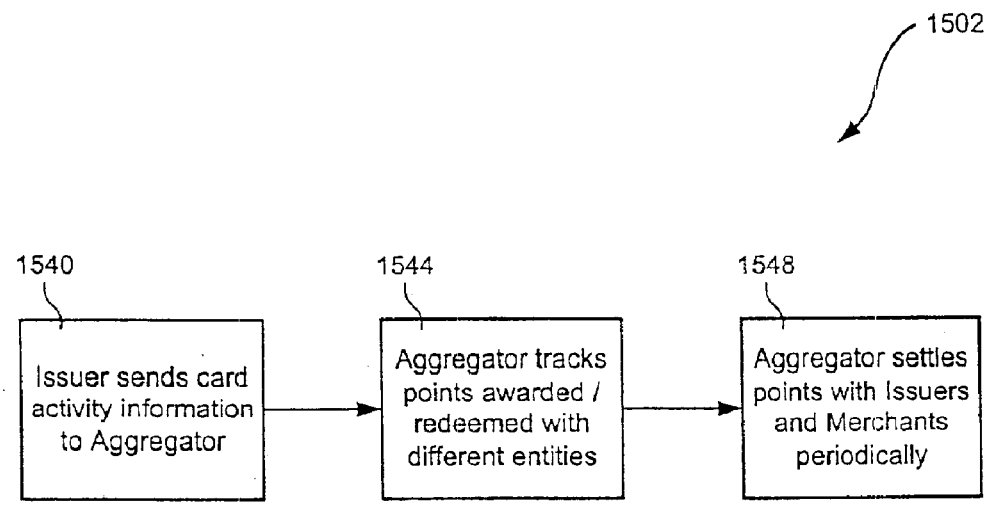

FIG. 13C is a flow diagram 1502 illustrating one embodiment in which settlement functions are aided by loyalty host 1216. The settlement system is particularly well suited for embodiments in which different merchants and organizations participate in a common loyalty system. The settlement system permits settling the respective value of points issued or redeemed between various parties to the loyalty system, some of which assign different correlation rates for the point values. Thus, at block 1540, issuer 1446 sends card-activity information to aggregator 1440 and the aggregator tracks points as they are issued or redeemed within the system at block 1548. Aggregator 1440 periodically settles the points with issuers 1446 and merchants 1444, thereby acting as an independent auditor of their participation in the loyalty system (block 1548). Such settlement functions are typically performed at a time when loyalty host 1216 is least likely to be occupied handling transactions, such as during early morning hours.

Figure 13D:
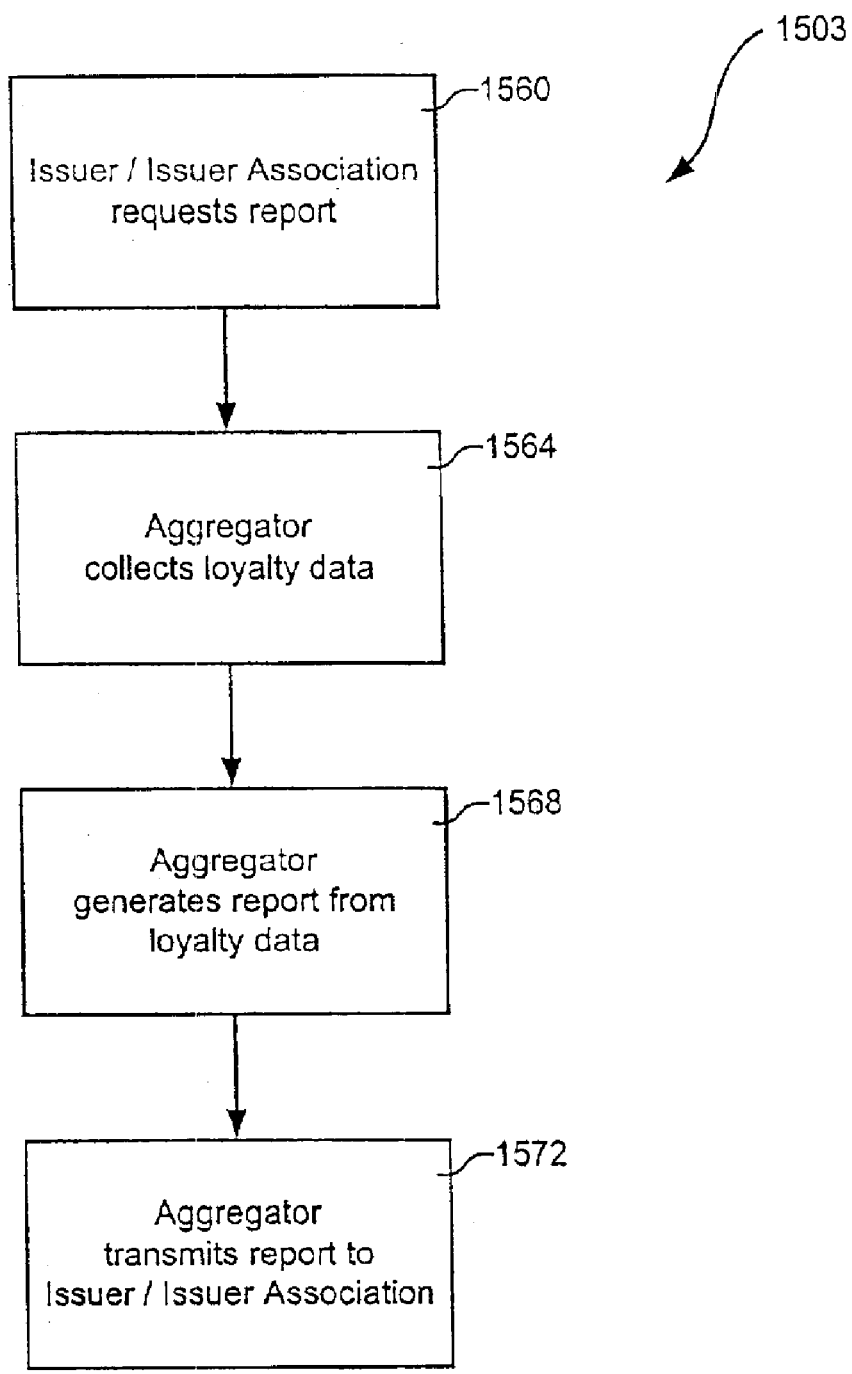

In addition to such functions, it is also desirable for loyalty host 1216 to perform reporting functions. A flow diagram 1503 of FIG. 13D illustrates one embodiment in which such reporting functions are included. At block 1560, issuer 1446 or issuer association 1442 initiates the creation of a report by sending a request for a report to aggregator 1440. In alternative embodiments, report requests may be initiated automatically on a periodic basis such as daily, weekly, or monthly. Loyalty data to be used in generating the report is collected by the aggregator at block 1564, and the report is generated at block 1568. Aggregator then transmits the report to the issuer (block 1572).

E. A Fraud Detection System

Another such function central control 110 can be a fraud detection system as disclosed in U.S. patent application Ser. No. 10/091,000, entitled "Money Transfer Evaluation Systems And Methods", and filed Mar. 4, 2001, the entirety of which is incorporated herein by reference for all purposes. Among other things, such a fraud detection system can provide various equipment and techniques for detecting fraudulent activity in relation to transferring money, value, purchasing and using stored value cards, and the like. The fraud detection system can be coupled to POS devices and thereby monitor activities occurring in relation to the POS devices. Further, such a fraud detection system can flag suspicious activity and report the suspicious activity directly to POS device 130. In some embodiments, the fraud detection system can void an ongoing transaction occurring at POS device 130 to avoid allowing a potentially fraudulent activity to complete. Access to the fraud detection system can be had via another function central control 110, such as, for example, via the value transfer systems as previously discussed. Alternatively, or in addition, access to such fraud detection systems can be provided directly to POS device 130 via communication network 120. In such cases, access can be enabled using methods similar to those previously discussed in relation to FIG. 5D.

F. A Check Acceptance System

Figure 14:
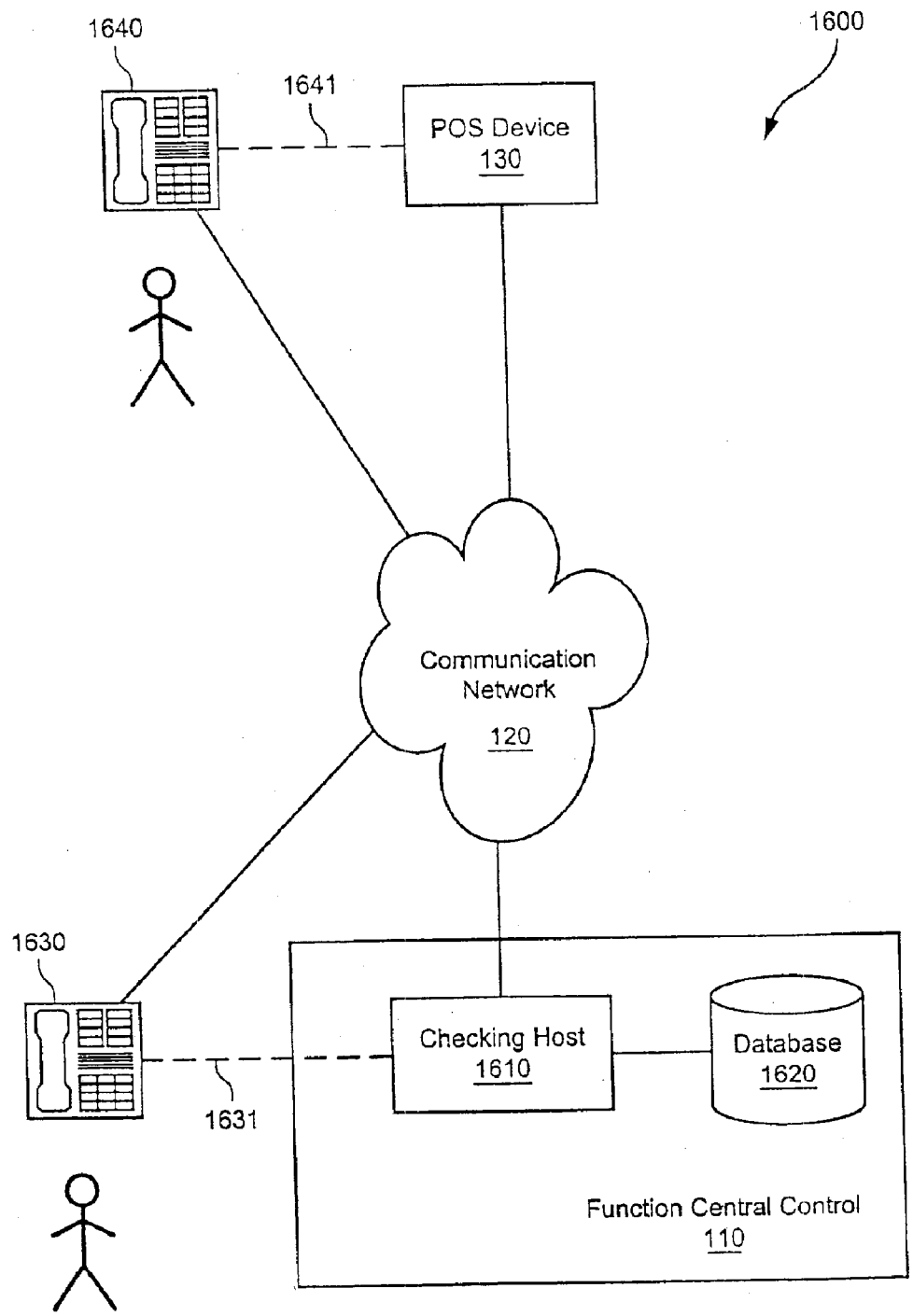
FIG. 14 illustrates a check acceptance system operated in relation to a point-of-sale device and in accordance with embodiments of the present invention.

With reference to FIGS. 14 and 15, one embodiment of a check transaction scenario using a POS device 130 interacting with a checking system 1600 is described. In the embodiment, check cashing system 1600 utilizes the following components of POS device 130: a MICR reader, a roll printer, a slip printer, a document imager, a magnetic-stripe reader, and a modem. It should be recognized that other embodiments using either more or fewer components can be similarly used in accordance with the present invention. Checking system 1600 is controlled by function central control 110, where function central control 110 includes a checking host 1610 and a database 1620. In addition, checking system 1600 includes a telephone 1640 used by a merchant associated with POS device 130 as indicated by dashed line 1641, and a telephone 1630 used by management personnel associated with function central control 110 as indicated by a dashed line 1631.

In some embodiments, access to checking system 1600 is pre-programmed as part of POS device 130. In such embodiments, the components necessary to complete transactions associated with checking system 1600 are enabled as part of manufacturing POS device 130.

Figure 15A:
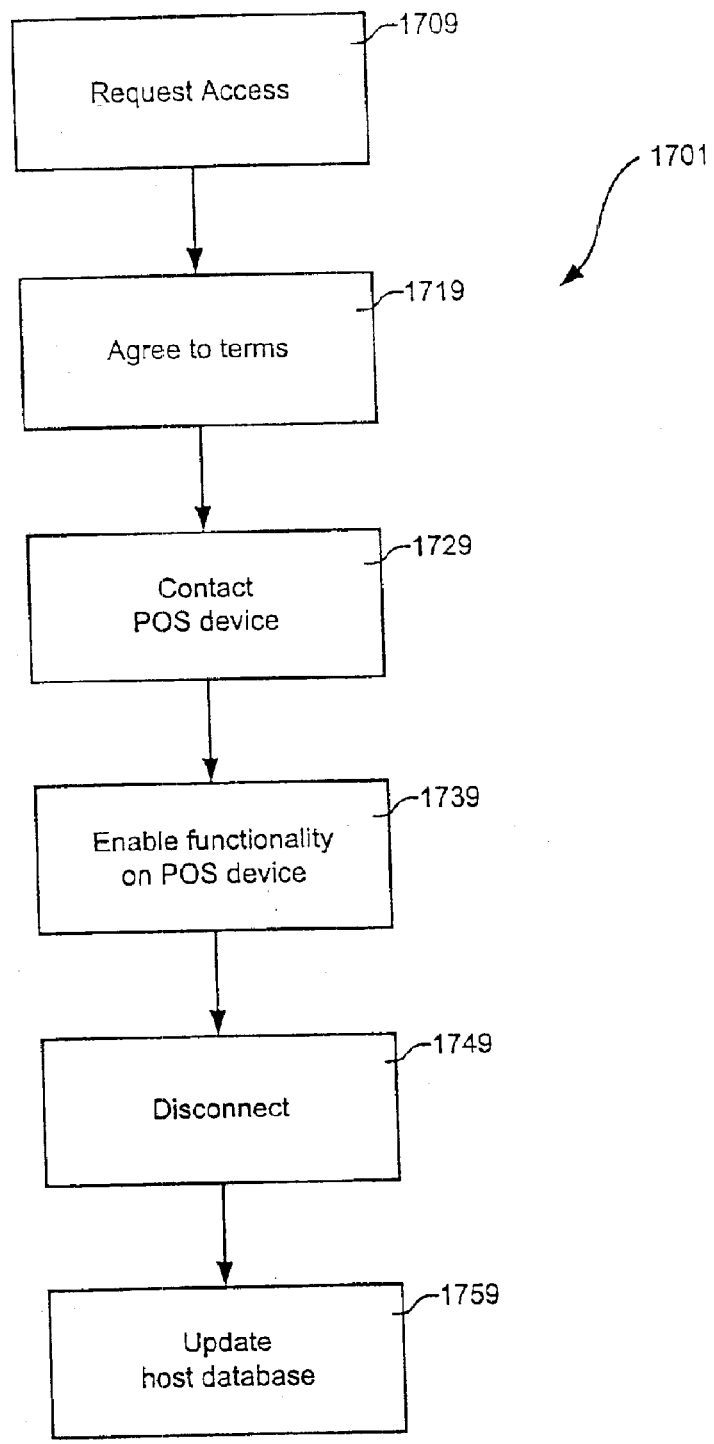
FIG. 15A illustrates a method in accordance with embodiments of the present invention for enabling access to the check acceptance system of FIG. 14 via a point-of-sale device.

However, in other embodiments, POS device 130 must be dynamically configured for operation with checking system 1600 some time after installation at a merchant location. Referring to FIG. 15A, a flow diagram 1701 illustrating enablement of POS device 130 in accordance with embodiments of the present invention is described. Initially, a merchant associated with POS device 130 contacts a management person associated with checking system 1600 to request use of the system (block 1709). In some embodiments, this is accomplished by voice communication using telephones 1630 and 1640 communicating via communication network 120. In other embodiments, the request for access is accomplished using POS device 130 communicating with function central control 110 via communication network 120.

Upon requesting access (block 1709), the merchant is presented with terms that govern access and use of checking system 1600 (block 1719). In some instances the terms are very simple and do not require anything of the merchant. In other instances, the terms require payment from the merchant on a one time and/or transactional basis. For example, the terms may require a merchant to share a small percentage of profits reaped through the merchants access to checking system 1600. In light of this disclosure, one of ordinary skill in the art will recognize a number of different business relationships that can be entered into before allowing the merchant to access checking system 1600. For example, in exchange for allowing use of checking system 1600, the merchant may agree to allow promotional graphics provided by function central control 110 to be displayed on POS device 130 and/or an associated POS peripheral, at times when checking system 1600 is performing transactions related to POS device 130.

After the merchant has agreed to the terms for accessing checking system 1600, checking host 1610 contacts POS device 130 via communication network 120 (block 1729). In one particular embodiment, such contact is accomplished using the Internet comprising a portion of communication network 120 via a dial-up modem. After contact with POS device 130 is established, checking host 1610 writes memory 114 of POS device 114, such that checking system 1600 is identified to POS device 130 as an additionally accessible function central control (block 1739). Further, checking host 1610 indicates the components within POS device 130 and/or POS peripheral 140 that should be enabled whenever checking system 1600 is accessed by POS device 130. Such information is used by function control matrix 116 to permit access to and from the various components of POS device 130. In some embodiments, enablement of a component by any function central control 110 causes the component to be functional regardless which function central control 110 is being accessed. In other embodiments, components are only enabled when a function central control 110 that enabled the component is being accessed.

In addition, a software application for execution on CPU 218 can be downloaded to POS device 130 from checking host 1610. This function can also be performed at later dates when POS device 130 accesses checking system 1600 using outdated software. In this way, checking system 1600 can assure that POS device 130 always maintains a copy of the most recent software.

After checking system 1600 is identified to POS device 130 and components necessary to complete transactions with checking system 1600 are enabled (block 1739), function central control 110 disconnects from POS device 130 (block 1749) and updates information associated with the merchant and newly configured POS device 130 to database 1620 (block 1759). Such information can be used to allow future access by POS device 130, control billing for access where the terms of access provide for billing, statistically monitor the use of POS device 130 to determine which promotional materials to be delivered verses POS device and the like.

With POS device 130 configured to access checking system 1600, it need not be done again, unless for some reason access to checking system 1600 is later discontinued. In some embodiments, where POS device is configured to allow access to a particular function central control 110, such as in this case, checking system 1600, the access is automatic when a particular transaction is requested via POS device 130. Thus, for example, when a check is presented for cashing as discussed below, POS device 130 automatically accesses function central control 110 via communication network 120 to complete the transaction.

Figure 15B:
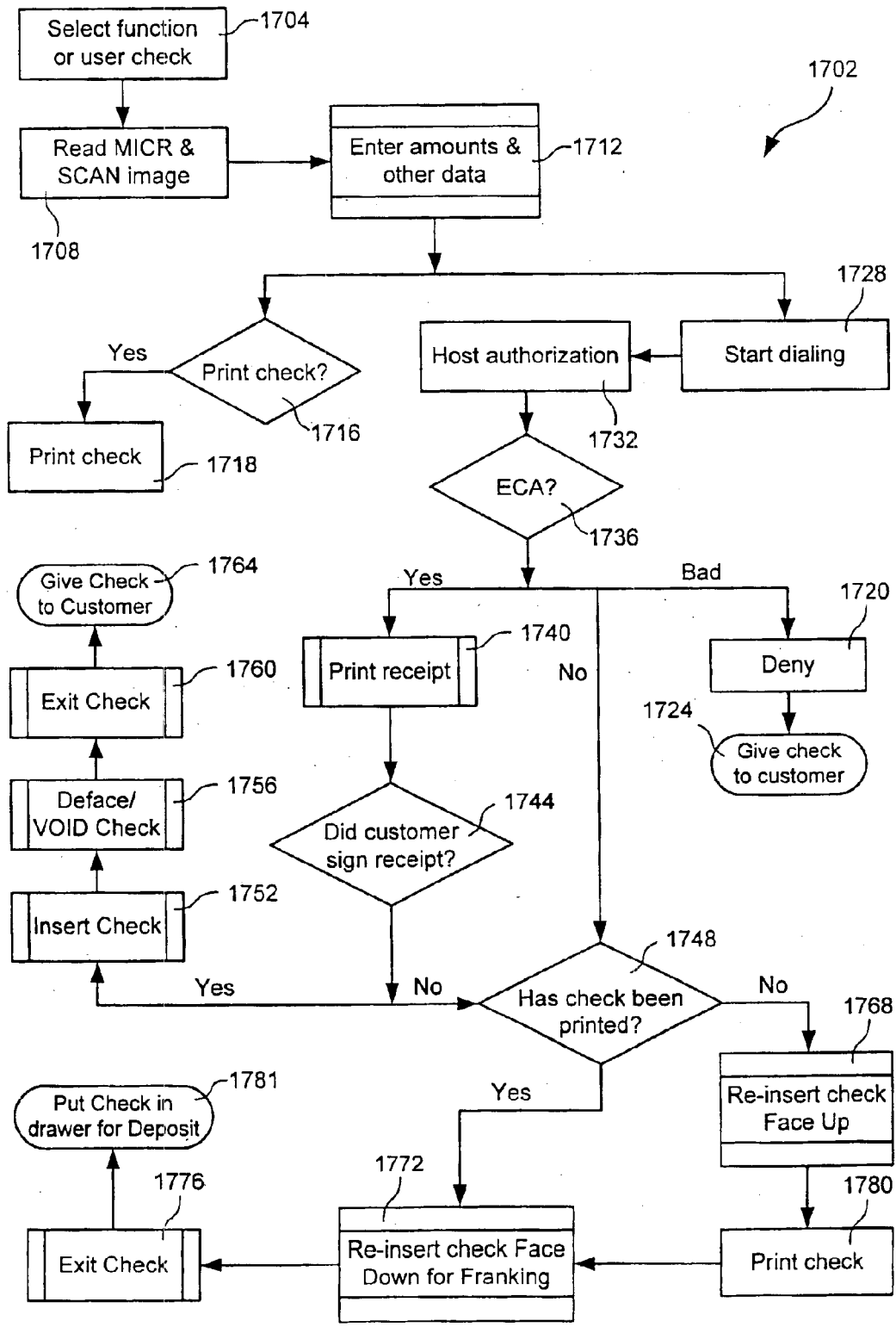
FIG. 15B illustrates operation of the check acceptance system of FIG. 14 in relation with a point-of-sale device, and in accordance with embodiments of the present invention.

Referring now to FIG. 15*b*, a flow diagram 1702 illustrates an embodiment of a method of using POS device 130 in relation to checking system 1600. Use of checking system 1600 begins by insertion of a check by either a merchant or a customer into POS device 130 or POS peripheral 140 (block 1704). In some embodiments, the insertion is accomplished contemporary to selecting a check processing function via the touch-screen of POS device 130. In other embodiments, selection of check processing is not necessary as the insertion of the check into POS device 130 automatically causes the POS device to select the check processing function provided by checking system 1600.

The MICR line and/or terminal images on the inserted check are read by the MICR reader and/or document imager of POS device 130 (block 1708). The MICR line may be read both magnetically and optically and then exit the check through the paper path in the top back of POS device 130. An alternative method is to have POS device 130 read the MICR line twice (forward and backward) then exit the check through the front of POS device 130. In some embodiments, the check does not completely exit. Rather, the check may partially exit so that the merchant does not need to re-insert the check for de-facing/void or to print payee, amount, text amount, and the like.

With the check read and the function selected, POS device 130 begins access to checking host 1610 via the modem associated with POS device 130 (block 1728). Contemporary to the access, the merchant enters the amount of the check and any other pertinent data either via the keyboard or touch-screen associated with POS device 130 (block 1712). Also contemporary to accessing checking system 1600, POS device 130 determines if amounts and other information are to be printed on the inserted check by POS device 130 (block 1716). If the check is not complete and it is to be printed by POS device 130, the various fields of the check are printed using the slip printer of POS device 130 (block 1718).

Once checking host 1610 is accessed, the authorization process is performed (block 1732) as part of the authorization process, checking host 1610 determines if POS device 130 is authorized to access checking system 1600 to perform the requested transaction. Such a process can include receiving an identification from POS device 130 and checking the identification against a list of registered identifications maintained on database 1620. In various embodiments, the image of the document is transferred from POS device 130 to function central control 110 for additional analysis.

Further, the authorization process includes authorizing the actual transaction based on the information read from the check that was inserted into POS device 130 (block 1736). In some embodiments, account information, and institution information derived by the MICR reader from the check is transferred from POS device 130 to checking host 1610. In turn, checking host 1610 compares the account and institution information against a list of known bad and/or suspicious accounts. Thus, where comparison of the information indicates that the check is either bad, or possible bad, authorization can be denied.

In some cases, the comparison does not indicate that the check is bad, or otherwise suspicious. In such cases, it is determined if the institution will accept Electronic Check Authorization ("ECA") from checking system 1600. As used herein, such ECA can be electronic check conversion, check acceptance, and/or check truncation. ECA is determined based in part on the information read by the MICR reader from the inserted check and comparison with a list of institutions known to support ECA. Where ECA is supported, the amount of the check can be automatically debited from the customer's account and credited to the merchants account. Where ECA is not supported, the check can be accepted by the merchant and processed by depositing the check into the merchant's account.

The three mentioned processing approaches are more fully discussed with respect to the following blocks. First, if it is determined that the check is bad, otherwise suspicious, or where insufficient funds exist (block 1736), the transaction can be denied (block 1720) and the check returned to the customer (block 1724). In some instances, void can also be printed on the check before being returned to the customer.

Alternatively, if it is determined that the institution associated with the check does support ECA via checking system 1600 (block 1736), then a receipt similar to a credit card receipt is printed using the roll printer and presented to the customer for the customer's signature (block 1740). Next, it is determined if the customer signed the receipt (block 1744). This can be done automatically where POS device 130 or POS peripheral 140 includes a stylus and a touch-screen allowing for the customer to sign on the touch-screen. Alternatively, this can be done by having the customer sign the printed receipt, and then having the merchant indicate that the receipt has been signed. Such an indication can be done by the merchant via the touch-screen or the key pad associated with POS device 130. As yet another alternative, a biometrics interface associated with POS device 130 can accept the customer's finger-print or similar metric as a signature like indication of acceptance.

Where the customer does sign the receipt, the check is inserted into POS device 130 (block 1752) and voided or otherwise defaced (block 1756). Such voiding can be done by the slip printer in POS device 130 printing the word VOID across the face of the check. Then, the defaced check is exited from POS device 130 using the paper transport mechanism (block 1760) and returned to the customer (block 1764). The check is no longer needed by the merchant because an automatic debit from the customer's account has already occurred. The defaced check serves as a receipt for the transaction similar to the way a voided check serves when returned from the customer's bank.

In some embodiments, POS device 130 even prints the customer's check (see e.g., blocks 1716, 1718), based on account and routing information provided by the customer to POS device 130. This avoids requiring the customer to actually purchase and use checks to complete the various transactions.

Where ECA is possible (block 1736), but where the customer does not sign the receipt, direct debit of the customer's account is not performed, but rather, the actual check is retained by the merchant for deposit in the merchant's account. More particularly, it is determined if the check has been fully printed including the customer's signature (block 1748). If the check is not complete, it is inserted in POS device 130 face up (block 1768) and the incomplete portions of the check are printed using the slip printer (block 1780).

Where the check is complete, it is inserted into POS device 130 face down for franking according to the merchant's requirements (block 1772). After the franking is completed, the check is removed from POS device 130 (block 1776) and placed in the merchant's cash register (block 1781) for later deposit by the merchant in the merchant's account.

Alternatively, where ECA is not possible (block 1736) for whatever reason (e.g., institution is not known or cooperative with checking system 1600, or the institution access is down), the actual check is retained by the merchant for deposit in the merchant's account. More particularly, it is determined if the check has been fully printed including the customer's signature (block 1748). If the check is not complete, it is inserted in POS device 130 face up (block 1768) and the incomplete portions of the check are printed using the slip printer (block 1780).

Where the check is complete, it is inserted into POS device 130 face down for franking according to the merchant's requirements (block 1772). After the franking is completed, the check is removed from POS device 130 (block 1776) and placed in the merchant's cash register (block 1781) for later deposit by the merchant in the merchant's account.

In some instances, software for operating POS device 130 is downloaded to POS device 130 by checking system 1600. Such software makes POS device 130 capable of printing the date, payee, text amount and numeric amount onto the check to speed the transaction at the point of sale. If this option is desired, the merchant inserts the unsigned blank check into the terminal for printing. The printed check is then returned to the customer. Under a common conversion model, it is not important for the customer to actually sign the check, as the customer signs a receipt to complete the transaction and the funds are automatically withdrawn. In particular embodiments, the software further provides for printing an entire check including account number, routing information, and MICR information such that a customer need not even have a check to complete a transaction.

G. Other Examples

It should be recognized that POS device 130 and POS peripheral 140, as well as the methods and components associated therewith, can be utilized in relation to a number of other systems and/or methods to effectuate a variety of functions. For example, such systems, methods and components can be used in relation to the systems and methods disclosed in U.S. patent application Ser. No. 09/613,615, entitled "Method and System for Processing Person-to Person Payments and Money Requests Using the Internet", filed on Jul. 11, 2000, U.S. patent application Ser. No. 10/045,633, entitled "Automated Group Payment", filed on Oct. 26, 2001, U.S. patent application Ser. No. 10/046,654, entitled "Automated Transfer With Stored Value Fund", filed on Oct. 26, 2001, U.S. patent application Ser. No. 10/045,632, entitled "Money Order Debit From Stored Value Fund", filed on Oct. 26, 2001, and U.S. patent application Ser. No. 10/021,292, entitled "Subscription-Based Payment", filed on Oct. 29, 2001, the entirety of each patent application being incorporated herein by reference for all purposes.

In some of the aforementioned patent applications, a user effectuates a money transfer using the Internet. In turn, the recipient can collect the transferred money in any of a number of ways. In particular embodiments of the present invention, a sender can initiate a money transfer using the Internet and a recipient can obtain the transferred money by interacting with POS device 130 and/or POS peripheral 140.

In accordance with other embodiments of the present invention, systems, methods and components as disclosed herein can be used in relation to the systems and methods disclosed in U.S. patent application Ser. No. 09/955,747, entitled "Methods and Systems for Transferring Stored Value", filed on Sep. 18, 2001, the entirety of which is incorporated herein by reference for all purposes. POS devices 130 and/or POS peripherals 14 can be used to accept value for transfer and/or provide transferred value.

In yet other embodiments of the present invention, systems, methods and components as disclosed herein can also be used in relation to the systems and methods disclosed in U.S. patent application Ser. No. 10/010,068, entitled "Electronic Gift Greeting", filed on Dec. 6, 2001, U.S. patent application Ser. No. 09/737,912, entitled "Online Method and System for Ordering and Having a Paper Greeting Message and Payment Instrument", filed on Dec. 15, 2000, the entirety of both being herein incorporated by reference for all purposes. POS devices 130 and/or POS peripherals 140 can be used to either accept and/or send messages as discussed in the aforementioned patent applications.

In yet further embodiments of the present invention, systems, methods and components as disclosed herein can also be used in relation to the systems and methods disclosed in U.S. patent application Ser. No. 09/516,209, entitled "Electronic Purchase Method and Funds Transfer Apparatus", filed on Feb. 29, 2000, and U.S. patent application Ser. No. 09/991,379 of the same title and filed on Nov. 15, 2001, the entirety of both being herein incorporated by reference for all purposes. POS devices 130 and/or POS peripherals 140 can be used to either accept and/or send funds as discussed in the aforementioned patent applications.

Other embodiments of the present invention include use of systems, methods and components as disclosed herein in relation to the systems and methods disclosed in U.S. patent application Ser. No. 09/307,485, entitled "Internet-Based Monetary Payment System", filed on May 10, 1999, and U.S. patent application Ser. No. 10/045,313 of the same title and filed on Oct. 23, 2001, the entirety of both being herein incorporated by reference for all purposes. POS devices 130 and/or POS peripherals 140 can be used to either accept and/or send funds as discussed in the aforementioned patent applications.

Yet further embodiments of the present invention include use of systems, methods and components as disclosed herein in relation to the systems and methods disclosed in U.S. patent application Ser. No. 09/965,667, entitled "Systems and Methods to Facilitate Payment of Shipped Goods", filed on Sep. 26, 2001, and U.S. patent application Ser. No. 09/971,726, entitled "Methods and Systems for Processing Financial Instruments", filed on Oct. 4, 2001 the entirety of both being herein incorporated by reference for all purposes. POS devices 130 and/or POS peripherals 140 can be used to either accept and/or send funds as discussed in the aforementioned patent applications.

Other additional embodiments include a payment and/or enrollment systems and methods as disclosed in U.S. patent application Ser. No. 10/112,440, entitled "Systems And Methods For Enrolling Consumers In Goods And Services" and filed on Mar. 29, 2002, and U.S. patent application Ser. No. 10/112,258, entitled "Electronic Identifier Payment Systems And Methods" and filed on Mar. 29, 2002, both of which are incorporated herein by reference for all purposes.

IV. Conclusion

The invention has now been described in detail for purposes of clarity and understanding. However, it will be appreciated that certain changes and modifications may be practiced within the scope of the appended claims. For example, any number of function central controls 110 can be used in relation to any number of POS devices 130 and/or POS peripherals 140. Further, the functions of the systems and methods of using such are merely exemplary. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A system for effectuating a value transfer, the system comprising:

a point-of-sale device, wherein the point-of-sale device is in communication with a money transfer system to transfer monetary values from senders to recipients via a first communication network, wherein senders provide monetary value that is to be provided to a designated recipient, with the monetary value and designated recipient information being input into the point-of-sale device and transmitted to the money transfer system via the first communication network, and wherein recipients may receive monetary values using the point-of-sale device, with recipient identifying information being input into the point-of-sale device and transmitted to the money transfer system via the first communication network for verification, wherein the point-of-sale device is in communication with a remote transaction system via a second communication network; and wherein the remote transaction system is physically distinct from the money transfer system.

2. The system of claim 1, wherein the point-of-sale device comprises a base unit and a peripheral unit.

3. The system of claim 2, wherein the base unit comprises a first touch-screen display, and wherein the peripheral unit comprises a second touch-screen display.

4. The system of claim 1, wherein the point-of-sale device comprises a document imager.

5. The system of claim 1, wherein the point-of-sale device comprises a magnetic ink character recognition reader.

6. The system of claim 1, wherein the point-of-sale device comprises both a sup printer and a roll printer, and wherein the slip printer and the roll printer utilize a common paper transport mechanism.

7. The system of claim 1, wherein the remote transaction system comprises a function central control.

8. The system of claim 1, wherein the first communication network is a telephone network.

9. The system of claim 1, wherein the remote transaction system is a stored value card system to credit and debit stored value accounts, and wherein the point-of-sale device is in communication with the stored value card system to transmit transaction details for stored value accounts to the stored value card system.

10. The system of claim 9, wherein the second communication network is a telephone network.

11. The system of claim 10, wherein the first communication network is the Internet.

12. The system of claim 11, wherein at least one of the money transfer system and remote transaction systems provides a function that is accessed upon agreement between a merchant operating the point-of-sale device and a supplier unrelated to either the merchant or a supplier of the point-of-sale device.

13. The system of claim 1, wherein the first communication network and the second communication network are the same communication network.

14. The system of claim 1, wherein the system further comprises:
   a second remote transaction system in communication with a third communication network; and
   wherein the point-of-sale device is in communication with the second remote transaction system via the third communication network.

15. The system of claim 14, wherein the second remote transaction system is a check acceptance system.

16. The system of claim 14, wherein at least two of the money transfer system, the remote transaction system, and the second remote transaction system are maintained by separate entities.

17. The system of claim 14, wherein:
   the remote transaction system is a stored value card system to credit and debit stored value accounts;
   the third remote transaction system is a check acceptance system; and
   wherein the point-of-sale device is in communication with the stored value card system to transmit an amount and a stored value card received at an interface associated with the point-of-sale device to the stored value card system via the second communication network, receive an approvals from the stored value system to charge the amount to the stored value card and to transmit a monetary value and a second stored value card received at the interface associated with the point-of-sale device to the stored value card system to load the monetary value into the second stored value card.

18. The system of claim 14, wherein the remote transaction system is a fraud detection system to detect potential fraud in relation to at least one of money transfers and stored value account usage.

19. The method of claim 1, wherein the remote transaction system is a check acceptance system.

20. The method of claim 1, wherein the remote transaction system is a fraud detection system to detect potential fraud in money transfer transactions.

21. A system for effectuating a value transfer from one or more point-of-sale devices, the system comprising:
   a plurality of point-of-sale devices in communication with a point-of-sale control system, wherein a first set of the plurality of point-of-sale devices are in communication with a stored value card system to credit and debit stored value accounts, the point-of-sale device to communicate with the stored value card system to transmit transaction details for transactions involving stored value accounts to the stored value card system and to receive authorization to charge amounts to stored value cards, the transaction details for a first transaction including an amount and a stored value card received at an interface associated with the point-of-sale device, the amount to be charged to the stored value card, and the transaction details for a second transaction including a load amount and a second stored value card, the load amount to be loaded into the second stored value card by the stored value card system, wherein a subset of the first set of the plurality of point-of-sale devices are in communication with a remote transaction system; and wherein the stored value card system is physically distinct from second remote transaction system.

22. The system of claim 21, wherein each of the point-of-sale control system, the stored value card system, and the remote transaction system are capable of configuring one or more of the plurality of point-of-sale devices to enable the one or more of the plurality of point-of-sale devices to access at least one of the stored value card system and the second remote transaction system.

23. The system of claim 21, wherein:
   a second subset of the plurality of point-of-sale devices is in communication with the stored value card system, but not the remote transaction system.

24. The system of claim 23, wherein an integrated value transfer is completed involving communication between a first point-of-sale device in the subset and both the stored value card system and the remote transaction systems, and a second point-of-sale device in the second subset and the stored value card system.

25. The system of claim 24, wherein the remote transaction system is a check acceptance system to authorize checks received to add monetary value to stored value accounts.

26. The system of claim 21, wherein the remote transaction system is a money transfer system to transfer monetary values from senders to recipients, and wherein senders provide monetary value that is to be provided to a designated recipient, with the monetary values and designated recipient information being input into point-of-sale devices of the first set and transmitted to the money transfer system, and wherein recipients may receive monetary values using point-of-sale devices of the first set, with recipient identifying information being input into the point-of-sale devices of the first set and transmitted to the money transfer system for verification.

27. The system of claim 21, wherein the remote transaction system is a fraud detection system to detect potential fraud in relation to stored value account usage.

28. A system for effectuating a value transfer, the system comprising:
   a first point-of-sale device in communication with a first communication network;
   a second point-of-sale device in communication with the first communication network;
   a check acceptance system in communication with the first point-of-sale device and second point-of-sale device via a dial-up communication network; and a money transfer system to transfer a monetary value from senders to recipients, in communication with the first point-of-sale device and the second point-of-sale device via a second communication network, the first and second point-of-sale devices to communicate with the money transfer system to transmit monetary values and designated recipient information received at the first and second point of sale devices from senders of monetary values and to transmit recipient identifying information, received at the first and second point of sale devices from recipients of monetary values, to the money transfer system for verification.

29. The system of claim 27, further comprising a fraud detection system to detect potential fraud in relation to money transfer transactions.

30. The system of claim 29, wherein the second communication network is the Internet.

31. The system of claim 28, wherein the first point-of-sale device is identical to the second point-of-sale device.

32. The system of claim 28, wherein the first point-of-sale device includes the same components as the second point-of-sale device, and wherein the first point-of-sale device is configured different from the second point-of-sale device.

33. The system of claim 28, wherein the first point-of-sale device comprises a document imager.

34. The system of claim 33, wherein the document imager images a document, and wherein information from an image of the document is transferred to the check acceptance system via the dial-up communication network.

35. The system of claim 33, wherein the first point-of-sale device further comprises a slip printer.

36. The system of claim 35, wherein the first point-of-sale device further comprises a paper transport mechanism, and wherein the paper transport mechanism is shared between the document imager and the slip printer.

37. The system of claim 28, wherein the first point-of-sale device further comprises a roll printer.

38. The system of claim 28, where the first point-of-sale device further comprises a base unit and a peripheral unit.

39. The system of claim 38, wherein the peripheral unit comprises a touch-screen for accepting an electronic signature.

40. The system of claim 38, wherein the base unit comprises a document feed, a document imager, and a slip printer.

41. The system of claim 40, wherein a document is inserted into the document feed, imaged using the document imager, information associated with the document transferred to the check acceptance system via the dial up network, and a response is received from the check acceptance system via the dial-up network.

42. The system claim 40, wherein the document is further defaced by the slip printer upon completion of a transaction using the check acceptance system.

* * * * *